United States Patent
Lewis

(10) Patent No.: US 7,200,150 B2
(45) Date of Patent: Apr. 3, 2007

(54) SYSTEM AND METHOD FOR BYPASSING DATA FROM EGRESS FACILITIES

(75) Inventor: Shawn M. Lewis, Southboro, MA (US)

(73) Assignee: Level 3 Communications, Inc., Broomfield, CO (US)

( * ) Notice: Subject to any disclaimer, the term of this patent is extended or adjusted under 35 U.S.C. 154(b) by 820 days.

(21) Appl. No.: 10/179,613

(22) Filed: Jun. 24, 2002

(65) Prior Publication Data

US 2003/0198216 A1    Oct. 23, 2003

Related U.S. Application Data

(63) Continuation of application No. 09/196,756, filed on Nov. 20, 1998, now Pat. No. 6,442,169.

(51) Int. Cl.
*H04L 12/56* (2006.01)
*H04L 12/66* (2006.01)
*H04J 3/12* (2006.01)

(52) U.S. Cl. .................. 370/401; 370/352; 370/522

(58) Field of Classification Search ........ 370/230–237, 370/347–354, 401–466; 709/202–227; 455/349–414, 455/433–548
See application file for complete search history.

(56) References Cited

U.S. PATENT DOCUMENTS 4,100,377 A    7/1978   Flanagan ................ 179/15 AS (Continued)

FOREIGN PATENT DOCUMENTS

EP        0 789 470 A2    8/1997

(Continued)

OTHER PUBLICATIONS

*The Adax Advanced Protocol Controllers APC0VMEX—VMEbus* (visited Mar. 7, 1997) <html document under http://www.adax.com/products/>.

(Continued)

*Primary Examiner*—Man U. Phan
(74) *Attorney, Agent, or Firm*—Faegre & Benson LLP

(57) ABSTRACT

An open architecture platform bypasses data from the facilities of a telecommunications carrier, e.g. an incumbent local exchange carrier, by distinguishing between voice and data traffic, and handling voice and data traffic separately. An SS7 gateway receives and transmits SS7 signaling messages with the platform. When signaling for a call arrives, the SS7 gateway informs a control server on the platform. The control server manages the platform resources, including the SS7 gateway, tandem network access servers (NASs) and modem NASs. A tandem NAS receives the call over bearer channels. The control server determines whether the incoming call is voice traffic or data traffic, by the dialed number, and instructs the tandem NAS how to handle the call. Voiced traffic is transmitted to a switch for transmission from the platform. Data traffic is terminated at a modem NAS, where it is converted into a form suitable for a data network, such as a private data network or an Internet services provider (ISP). The converted data is sent by routers to the data network. The data network need not convert the data, as the function has already been provided by the platform. In lieu of a conversion, the modems can create a tunnel (a virtual private network) between a remote server and the data network.

28 Claims, 24 Drawing Sheets

U.S. PATENT DOCUMENTS

| | | | |
|---|---|---|---|
| 4,238,851 A | 12/1980 | Takahashi et al. | 370/94 |
| 4,569,041 A | 2/1986 | Takeuchi et al. | 370/60 |
| 4,608,685 A | 8/1986 | Jain et al. | 370/85 |
| 4,630,260 A | 12/1986 | Toy et al. | 370/60 |
| 4,630,262 A | 12/1986 | Callens et al. | 370/81 |
| 4,661,947 A | 4/1987 | Lea et al. | 370/60 |
| 4,674,082 A | 6/1987 | Flanagin et al. | 370/60 |
| 4,679,190 A | 7/1987 | Dias et al. | 370/60 |
| 4,679,191 A | 7/1987 | Nelson et al. | 370/84 |
| 4,707,831 A | 11/1987 | Weir, deceased et al. | 370/94 |
| 4,715,026 A | 12/1987 | Eberspaecher | 370/1 |
| 4,723,238 A | 2/1988 | Isreal et al. | 370/60 |
| 4,757,497 A | 7/1988 | Beierle et al. | 370/89 |
| 4,761,779 A | 8/1988 | Nara et al. | 370/58 |
| 4,771,425 A | 9/1988 | Baran et al. | 370/85 |
| 4,782,485 A | 11/1988 | Gollub | |
| 4,815,071 A | 3/1989 | Shimizu | 370/60 |
| 4,819,228 A | 4/1989 | Baran et al. | 370/85 |
| 4,862,451 A | 8/1989 | Closs et al. | 370/60 |
| 4,866,704 A | 9/1989 | Bergman | 370/85.4 |
| 4,872,159 A | 10/1989 | Hemmady et al. | 370/60 |
| 4,872,160 A | 10/1989 | Hemmady et al. | 370/60 |
| 4,885,739 A | 12/1989 | Read et al. | 370/58.1 |
| 4,903,261 A | 2/1990 | Baran et al. | 370/94.2 |
| 4,926,416 A | 5/1990 | Weik | 370/60.1 |
| 4,932,022 A | 6/1990 | Keeney et al. | 370/60 |
| 4,933,931 A | 6/1990 | Kokubo | 370/60 |
| 4,953,158 A | 8/1990 | Schreur | 370/60.1 |
| 4,958,341 A | 9/1990 | Hemmady et al. | 370/60.1 |
| 4,962,497 A | 10/1990 | Ferenc et al. | 370/60.1 |
| 4,969,184 A | 11/1990 | Gordon et al. | 379/100 |
| 4,970,721 A | 11/1990 | Aczel et al. | 370/92 |
| 4,975,695 A | 12/1990 | Almond et al. | 370/825.79 |
| 4,996,685 A | 2/1991 | Farese et al. | 370/58.1 |
| 5,008,929 A | 4/1991 | Olsen et al. | 379/112 |
| 5,014,266 A | 5/1991 | Bales et al. | 370/60.1 |
| 5,018,136 A | 5/1991 | Gollub | 370/60.1 |
| 5,020,058 A | 5/1991 | Holden et al. | 370/109 |
| 5,022,071 A * | 6/1991 | Mozer et al. | 379/93.09 |
| 5,048,081 A | 9/1991 | Gavaras et al. | 379/221 |
| 5,051,983 A | 9/1991 | Kammerl | 370/60 |
| 5,093,827 A | 3/1992 | Franklin et al. | 370/60.1 |
| 5,115,431 A | 5/1992 | Williams et al. | 370/94.1 |
| 5,150,357 A | 9/1992 | Hopner et al. | 370/68.1 |
| 5,157,662 A | 10/1992 | Tadamura et al. | 370/110.1 |
| 5,197,067 A | 3/1993 | Fujijoto et al. | 370/94.1 |
| 5,208,806 A | 5/1993 | Hasegawa | 370/60.1 |
| 5,218,602 A | 6/1993 | Grant et al. | 370/58.2 |
| 5,231,633 A | 7/1993 | Hluchyj et al. | 370/94.1 |
| 5,241,588 A | 8/1993 | Babson, III et al. | 379/201 |
| 5,247,571 A | 9/1993 | Kay et al. | 379/207 |
| 5,268,900 A | 12/1993 | Hluchyj et al. | 370/94.1 |
| 5,274,635 A | 12/1993 | Rahman et al. | 370/60.1 |
| 5,291,489 A | 3/1994 | Morgan et al. | 370/85.1 |
| 5,301,189 A | 4/1994 | Schmidt et al. | 370/60.1 |
| 5,305,308 A | 4/1994 | English et al. | 370/32.1 |
| 5,327,428 A | 7/1994 | Van As et al. | 370/94.2 |
| 5,341,374 A * | 8/1994 | Lewen et al. | 370/450 |
| 5,351,276 A | 9/1994 | Doll, Jr. et al. | 379/67 |
| 5,351,286 A | 9/1994 | Nici | 379/94 |
| 5,353,283 A | 10/1994 | Tsuchiya | 370/60 |
| 5,359,598 A | 10/1994 | Steagall et al. | 370/58.1 |
| 5,365,521 A | 11/1994 | Ohnishi et al. | 370/60 |
| 5,379,293 A | 1/1995 | Kanno et al. | 370/94.1 |
| 5,381,405 A | 1/1995 | Daugherty et al. | 370/54 |
| 5,381,466 A | 1/1995 | Shibayama et al. | 379/88 |
| 5,383,183 A | 1/1995 | Yoshida | 370/60.1 |
| 5,384,840 A | 1/1995 | Blatchford et al. | 379/229 |
| 5,390,184 A | 2/1995 | Morris | 370/94.2 |
| 5,396,491 A | 3/1995 | Newman | 370/60 |
| 5,420,858 A | 5/1995 | Marshall et al. | 370/60.1 |
| 5,422,882 A | 6/1995 | Hiller et al. | 370/60.1 |
| 5,423,003 A | 6/1995 | Berteau | 395/200 |
| 5,426,636 A | 6/1995 | Hiller et al. | 370/60.1 |
| 5,428,607 A | 6/1995 | Hiller et al. | 370/60.1 |
| 5,428,616 A | 6/1995 | Field et al. | 370/94.1 |
| 5,430,719 A | 7/1995 | Weisser, Jr. | 370/58.2 |
| 5,434,913 A | 7/1995 | Tung et al. | 379/202 |
| 5,436,898 A | 7/1995 | Bowen et al. | 370/79 |
| 5,438,614 A | 8/1995 | Rozman et al. | 379/93 |
| 5,444,707 A | 8/1995 | Cerna et al. | |
| 5,444,709 A | 8/1995 | Riddle | 370/94.1 |
| 5,452,289 A | 9/1995 | Sharma et al. | 370/32.1 |
| 5,453,986 A | 9/1995 | Davis et al. | 370/62 |
| 5,457,684 A | 10/1995 | Bharucha et al. | 370/60.1 |
| 5,463,616 A | 10/1995 | Kruse et al. | 370/24 |
| 5,471,470 A | 11/1995 | Sharma et al. | 370/81 |
| 5,479,411 A | 12/1995 | Klein | 370/110.1 |
| 5,485,457 A | 1/1996 | Aramaki | 370/60 |
| 5,521,914 A | 5/1996 | Mavraganis et al. | 370/60 |
| 5,526,353 A | 6/1996 | Henley et al. | 370/60.1 |
| 5,537,403 A | 7/1996 | Cloonan et al. | 370/60.1 |
| 5,541,917 A | 7/1996 | Farris | 370/60.1 |
| 5,544,161 A | 8/1996 | Bigham et al. | 370/58.1 |
| 5,544,163 A | 8/1996 | Madonna | 370/60.1 |
| 5,544,164 A | 8/1996 | Baran | 370/60.1 |
| 5,544,168 A | 8/1996 | Jeffrey et al. | 370/60.1 |
| 5,553,063 A | 9/1996 | Dickson | 370/29 |
| 5,568,475 A | 10/1996 | Doshi et al. | 370/58.2 |
| 5,570,355 A | 10/1996 | Dail et al. | 370/60.1 |
| 5,572,583 A | 11/1996 | Wheeler, Jr. et al. | 379/207 |
| 5,577,038 A | 11/1996 | Miyahara | 370/60.1 |
| 5,577,041 A | 11/1996 | Sharma et al. | 370/79 |
| 5,579,308 A | 11/1996 | Humpleman | 370/58.1 |
| 5,590,181 A | 12/1996 | Hogan et al. | 379/114 |
| 5,592,477 A | 1/1997 | Farris et al. | 370/396 |
| 5,592,538 A | 1/1997 | Kosowsky et al. | 379/93 |
| 5,594,732 A | 1/1997 | Bell et al. | 370/401 |
| 5,600,643 A | 2/1997 | Robrock, II | 370/399 |
| 5,600,649 A | 2/1997 | Sharma et al. | 370/435 |
| 5,602,991 A | 2/1997 | Berteau | 395/200.01 |
| 5,604,737 A | 2/1997 | Iwami et al. | 370/352 |
| 5,608,786 A | 3/1997 | Gordon | 379/100 |
| 5,613,069 A | 3/1997 | Walker | 395/200.15 |
| H1641 H | 4/1997 | Sharman | 379/60 |
| 5,621,727 A | 4/1997 | Vaudreuil | 370/60 |
| 5,625,677 A | 4/1997 | Feiertag et al. | 379/93 |
| 5,631,897 A | 5/1997 | Pacheco et al. | 370/237 |
| 5,640,446 A | 6/1997 | Everett et al. | 379/115 |
| 5,650,999 A | 7/1997 | Dickson | 370/231 |
| 5,654,957 A | 8/1997 | Koyama | 370/355 |
| 5,659,541 A | 8/1997 | Chan | 370/236 |
| 5,659,542 A | 8/1997 | Bell et al. | 370/496 |
| 5,680,437 A | 10/1997 | Segal | 379/10 |
| 5,684,799 A | 11/1997 | Bigham et al. | 370/397 |
| 5,689,553 A | 11/1997 | Ahuja et al. | 379/202 |
| 5,692,126 A | 11/1997 | Templeton et al. | 395/200.02 |
| 5,701,301 A | 12/1997 | Weisser, Jr. | 370/428 |
| 5,706,286 A | 1/1998 | Reiman et al. | 370/401 |
| 5,710,769 A | 1/1998 | Anderson et al. | 370/355 |
| 5,712,903 A | 1/1998 | Bartholomew et al. | 379/89 |
| 5,712,908 A | 1/1998 | Brinkman et al. | 379/119 |
| 5,724,412 A | 3/1998 | Srinivasan | 379/93.23 |
| 5,729,544 A | 3/1998 | Lev et al. | 370/352 |
| 5,732,078 A | 3/1998 | Arango | 370/355 |
| 5,737,320 A | 4/1998 | Madonna | 370/258 |
| 5,737,331 A | 4/1998 | Hoppal et al. | 370/349 |
| 5,737,333 A | 4/1998 | Civanlar et al. | 370/352 |
| 5,740,164 A | 4/1998 | Liron | 370/316 |
| 5,740,231 A | 4/1998 | Cohn et al. | 379/89 |
| 5,742,596 A | 4/1998 | Baratz et al. | 370/356 |
| 5,751,706 A | 5/1998 | Land et al. | 370/352 |
| 5,751,968 A | 5/1998 | Cohen | 395/200.61 |
| 5,754,641 A | 5/1998 | Voit et al. | 379/354 |

| | | | |
|---|---|---|---|
| 5,764,628 A | 6/1998 | Davis et al. ............... 370/271 |
| 5,764,736 A | 6/1998 | Shachar et al. ........ 379/903.09 |
| 5,764,750 A | 6/1998 | Chau et al. ............... 379/229 |
| 5,764,756 A | 6/1998 | Onweller .................... 379/242 |
| 5,777,991 A | 7/1998 | Adachi et al. .............. 370/352 |
| 5,790,538 A | 8/1998 | Sugar ........................ 370/352 |
| 5,793,762 A | 8/1998 | Penners et al. ............ 370/389 |
| 5,793,771 A | 8/1998 | Darland et al. ............. 370/467 |
| 5,799,154 A | 8/1998 | Kuriyan ................ 395/200.53 |
| 5,805,587 A | 9/1998 | Norris et al. ............... 370/352 |
| 5,805,588 A | 9/1998 | Petersen .................... 370/356 |
| 5,809,022 A | 9/1998 | Byers et al. ............... 370/395 |
| 5,809,128 A * | 9/1998 | McMullin ............. 379/215.01 |
| 5,812,534 A | 9/1998 | Davis et al. ............... 370/260 |
| 5,815,505 A | 9/1998 | Mills ......................... 370/522 |
| 5,818,912 A | 10/1998 | Hammond .............. 379/94.05 |
| 5,825,771 A | 10/1998 | Cohen et al. ............... 370/394 |
| 5,828,666 A | 10/1998 | Focsaneanu et al. ........ 370/389 |
| 5,838,665 A | 11/1998 | Kahn et al. ................. 370/260 |
| 5,867,494 A | 2/1999 | Krishnaswamy et al. ... 370/352 |
| 5,867,495 A | 2/1999 | Elliott et al. ................ 370/352 |
| 5,881,060 A | 3/1999 | Morrow et al. ............. 370/337 |
| 5,881,131 A * | 3/1999 | Farris et al. ............. 379/15.03 |
| 5,889,774 A | 3/1999 | Mirashrafi et al. .......... 370/352 |
| 5,915,008 A | 6/1999 | Dulman ...................... 379/201 |
| 5,922,047 A | 7/1999 | Newlin et al. .............. 709/217 |
| 5,963,551 A | 10/1999 | Minko ........................ 370/356 |
| 6,009,469 A | 12/1999 | Mattaway et al. .......... 709/227 |
| 6,026,083 A | 2/2000 | Albrow et al. .............. 370/347 |
| 6,035,020 A * | 3/2000 | Weinstein et al. ........ 379/93.09 |
| 6,049,602 A | 4/2000 | Foladare et al. ............ 379/265 |
| 6,061,502 A | 5/2000 | Ho et al. .................... 395/114 |
| 6,070,192 A * | 5/2000 | Holt et al. .................. 709/227 |
| 6,072,780 A | 6/2000 | Johnson, Jr. et al. |
| 6,084,873 A | 7/2000 | Russell et al. .............. 370/352 |
| 6,084,956 A * | 7/2000 | Turner et al. ............... 379/230 |
| 6,091,722 A | 7/2000 | Russell et al. .............. 370/352 |
| 6,112,084 A * | 8/2000 | Sicher et al. ............... 370/337 |
| 6,125,113 A | 9/2000 | Farris et al. ................ 370/389 |
| 6,134,235 A | 10/2000 | Goldman et al. ........... 370/352 |
| 6,208,657 B1 * | 3/2001 | Dendi et al. ................ 370/401 |
| 6,243,373 B1 | 6/2001 | Turock |
| 6,266,328 B1 | 7/2001 | Johnson, Jr. et al. |
| 6,278,707 B1 | 8/2001 | MacMillan et al. ......... 370/352 |
| 6,324,173 B1 * | 11/2001 | Deschaine et al. .......... 370/352 |
| 6,324,183 B1 | 11/2001 | Miller et al. ................ 370/467 |
| 6,327,258 B1 | 12/2001 | Deschaine et al. .......... 370/356 |
| 6,339,594 B1 | 1/2002 | Civanlar et al. ............ 370/352 |
| 6,415,024 B1 * | 7/2002 | Dunn et al. ............ 379/114.05 |
| 6,459,697 B1 * | 10/2002 | Neyman ..................... 370/352 |
| 6,480,474 B2 | 11/2002 | Johnson, Jr. et al. |
| 6,614,781 B1 * | 9/2003 | Elliott et al. ................ 370/352 |
| 6,661,779 B2 | 12/2003 | Johnson, Jr. et al. |

FOREIGN PATENT DOCUMENTS

| | | |
|---|---|---|
| EP | 0 794 650 A2 | 9/1997 |
| EP | 0 797 373 A2 | 9/1997 |
| EP | 0 824 2998 A2 | 2/1998 |
| EP | 0 829 995 A2 | 3/1998 |
| EP | 0 841 831 A2 | 5/1998 |
| EP | 0 847 176 A2 | 6/1998 |
| EP | 0 866 596 A2 | 9/1998 |
| EP | 0 872 998 A1 | 10/1998 |
| GB | 2 315 190 A | 1/1998 |
| JP | 10-51453 | 2/1998 |
| JP | 10-164135 | 6/1998 |
| WO | WO 98/37665 A1 | 8/1988 |
| WO | WO 96/08935 A1 | 3/1996 |
| WO | WO 96/15598 A1 | 5/1996 |
| WO | WO 97/14238 A1 | 4/1997 |
| WO | WO 97/14244 A2 | 4/1997 |
| WO | WO 97/14244 A3 | 4/1997 |
| WO | WO 97/16007 A1 | 5/1997 |
| WO | WO 97/22216 A1 | 6/1997 |
| WO | WO 97/23078 A1 | 6/1997 |
| WO | WO 97/27692 A1 | 7/1997 |
| WO | WO 97/28628 A1 | 8/1997 |
| WO | WO 97.29581 A1 | 8/1997 |
| WO | WO 97/31492 A1 | 8/1997 |
| WO | WO 97/33412 A1 | 9/1997 |
| WO | WO 97/38511 A2 | 10/1997 |
| WO | WO 97/38511 A3 | 10/1997 |
| WO | WO 97/38551 A2 | 10/1997 |
| WO | WO 97/39560 A1 | 10/1997 |
| WO | WO 97/46073 A2 | 12/1997 |
| WO | WO 97/46073 A3 | 12/1997 |
| WO | WO 97/47118 A1 | 12/1997 |
| WO | WO 97/50217 A1 | 12/1997 |
| WO | WO 97/50271 A1 | 12/1997 |
| WO | WO 97/50277 A2 | 12/1997 |
| WO | WO 97/50277 A3 | 12/1997 |
| WO | WO 98/04989 A1 | 2/1998 |
| WO | WO 98/11704 A2 | 3/1998 |
| WO | WO 98/12860 A1 | 3/1998 |
| WO | WO 98/18238 A1 | 4/1998 |
| WO | WO 98/18289 A1 | 4/1998 |
| WO | WO 98/23974 A1 | 4/1998 |
| WO | WO 98/19425 A1 | 5/1998 |
| WO | WO 98/19445 A1 | 5/1998 |
| WO | WO 98/20701 A1 | 5/1998 |
| WO | WO 98/23067 A1 | 5/1998 |
| WO | WO 98/23080 A2 | 5/1998 |
| WO | WO 98/26543 A1 | 6/1998 |
| WO | 0 851 653 A2 | 7/1998 |
| WO | 0 853 411 A2 | 7/1998 |
| WO | 0 853 411 A3 | 7/1998 |
| WO | WO 98/28885 A1 | 7/1998 |
| WO | WO 98/300007 A1 | 7/1998 |
| WO | WO 98/300008 A1 | 7/1998 |
| WO | WO 98/34391 A2 | 8/1998 |
| WO | WO 98/34399 A1 | 8/1998 |
| WO | WO 98/36543 A1 | 8/1998 |
| WO | WO 98/37688 A2 | 8/1998 |
| WO | WO 98/37688 A3 | 8/1998 |
| WO | WO 98/39897 A1 | 9/1998 |
| WO | WO 98/42104 A1 | 9/1998 |
| WO | WO 98/42107 A1 | 9/1998 |
| WO | WO 98/42146 A2 | 9/1998 |
| WO | WO 98/47256 A2 | 10/1998 |
| WO | WO 98/47256 A3 | 10/1998 |
| WO | WO 98/51063 A1 | 11/1998 |

OTHER PUBLICATIONS

*The Adax Advanced Protocol Controllers APC—PCX00PC bus* (visited Mar. 7, 1997) <html document under http://www.adax.com/products/>.

*Adax Advanced Protocol Controllers APC-EIX —EISbus* (visited Mar. 7, 1997) <http://www.adax.com/products/apc/eix.htm>.

*The Adax Sbus Advanced Protocol Controllers APC-SBX—Sbus* (visited Mar. 7, 1997) <http://www.adax.com/products/apc.sbx..htm>.

Kristi An and David Powers, *XCOM Technologies Creates Carrier-Class Data Network with Ascend Products* (Nov. 18m, 1997) <http://www.ascend.com/2495.html>.

*Ascend DSLTNT Product Information* (Ascend Communications, Inc. 1997).

*Ascend IDSL Product Information* (Ascend Communications, Inc. 1996).

*Ascend RADSL Product Information* (Ascend Communications, inc. 1997).

*Ascend SDSL Product Information* (Ascend Communications, Inc. 1997).

*DSC Signs Agreement With Unisys For Intelligent Network Measurement And Monitoring Systems* (Jul. 15, 1997) <http://www.dsccc.com/pro071597.htm>.
*GeoProbe: The Service Provider's Competitive Advantage* (Inet, Inc. 1997).
Tim Greene, *XVOM Marks The Spot*, Network World (Nov. 3, 1997) <http://www.engbooks.com/news/press11-3.html>.
*MicroLegend MS7 SS7 Mediation System* (Hewlett-Packard Company 1995).
*New Telecommunications Protocols Published* (Aug. 5, 1998) <http://www.13.com/press_releases>.
Oliver L. Picher, *Harnessing The Untapped Information Resources Within The Telephone Network* (visited Nov. 25, 1998) <http://corp2.Unisys.com/AboutUnisys/PressReleases/1996/jan/01085957.html>.
David Powers et al., *XCOM Technologies, Inc., "The Data Phone Company," Recieves First Round Funding From Battery Ventures & Matrix Partners* , (XCOM News Release, Sep. 8, 1997).
Salvatore Salamone, *CLEC Seeks ISP Alliances To Expand Coverage*, InternetWeek, Nov. 17, 1997, at 18.
Richard Sekar, *DSL Modems Fail to Deliver Data Privacy*,Electronic Engineering Times, Jun. 23, 1997, at 1.
*Selsius System—Home of the IP PBX* (last modified Jul. 16, 1998) <http://www.selsius.com/>.
*Spectra: The Multi-Protocol Analyzer* (Inet, Inc. 1997).
*Too Much Of A Good Thing?* (1996) <http://www.bellcore.com/BC.dynjava?GoodThingEAGeneral-ExchangeArticle>.
*Trillium™ SS7 Product Group ISDN User Part (ISUP) Portable Software 100029* (visited Mar. 14, 1997) <http://www.trillium.com/1078029.html>.
*Trillium™ SS7 Product Group Telephone User Part (TUP) Portable Software 100042* (visited Mar. 14, 1997) <http://www.trillium.com/1078042.html>.
*Trillium™ SS7 Product Group Signaling Connection Control Part (SCCP) Portable Software 1000030* (visited Mar. 14, 1997) <http://www.trillium.com/1078030.html>.
U.S. Appl. No. 09/197,203, filed Nov. 20, 1998; Specification and Figures 1-71E from Voice Over Data Telecommunications Network Architecture, Isaac K. Elliott et al., along with Preliminary Amendment filed at the U.S. Patent and Trademark Office on Sep. 17, 1999.
Yang, C.; INETPhone: Telephone Services and Servers on Internet; Apr. 1995, pp. 1-6; Network Working Group, RFC#1789.
"VocalTec Introduces Full Duplex in Revolutionary Internet Phone," *PR Newswire* , Jun. 5, 1995, 2 pages.
"New Vendor Alliance targets Frame Relay Over ISDN," *ISDN News* , vol. 8, Issue 6, Mar. 14, 1995, 3 pages.
"Cascade sweeps the Internet market, creating a new Internet infrastructure core for the world's largest commercial Internet providers; PSINet, UUNET and NETCOM select Cascade B-STDX 9000 switches to overcome the scalability, capacity, Quality of Service and management concerns of exploding Internet growth, " *Business Wire*, Oct. 30, 1995, 5 pages.
"Internet Telephone Companies Racing to Market," *Voice Technology & Services News* , Oct. 3, 1995, 4 pages.
"Company Develops Telephone/Internet Gateway for International Callers," *Advanced Intelligent Network News*, Oct. 18, 1995, 2 pages.
"IDT Connects Internet Phone Calls to the PSTN, " *Network Briefing.*Nov. 3, 1995, 2 pages.
*Voice Over IP (VOIP)* (Copyright 1998) <http://www.neetrix.com/whatsnew/voip.htm>, 2 pages.
*VocalTec Ensemble Architect—VocalTech Telephony Gateway Series 120* (visited Oct. 26, 1998) >http://www.vocaltec.com/products/vtg/vtg_overview.htm>, 1 page.
*VocalTech Ensemble Architect—VocalTec Network Manager* (visited Oct. 26, 1998) <http://www.vocaltec.com/products/vnm/vnm_overview.htm>, 2 pages.
*VocalTec Ensemble Architect—VocalTec Gatekeeper* (visited Oct. 26, 1998) <http://vocaltec.com/products/vgk/vgk_overview.htm>, 2 pages.
*VocalTec Ensemble Architect—VocalTec Internet Phone Lite* (visited Oct. 26, 1998) http://vocaltec.com/productsveaiplite/iplite_overview.htm>, 2 pages.

*NextGen Telcos—By pulver.com* (Copyright 1997) http://www.pulver.com/nextgen/>, 4 pages.
*Global Carrier Services—Overview* (Copyright 1996, 1997) <http://www.alphanet.net/combine.cgi?content=gcs/gcs>, 4 pages.
*Press Release—AlphaNet telecom Achieves a New Traffic Milestone and Provides a Status Update on its Telecommunications Business* (Oct. 23, 1998) <http://www.alphanet.net/combine.cgi?content=pr/981023>, 2 pages.
*The Global Gateway Group Press* (Copyright 1997) <http://www.gcubed.com/g3press.htm>, 7 pages.
*AT&T Products and Services* (Copyright 1998) http://www.attjens.co.jp/products/phohe/phone.html>, 2 pages.
*About Delta Three* (visited Oct. 29, 1998) http://www.deltathree.com/company/company-body1.asp>, 2 pages.
*Internet Telephone* (visited Oct. 29, 1998) http://deltathree.com/company/company_body7.asp>, 3 pages.
*TeleMatrix* (Copyright 1997) http://www.telematrix.com.jp/iphone.html>, 2 pages.
*How VIP Calling Works* (visited Oct. 19, 1998) <http://www.vipcalling.com/how.html, 1 page.
*About VIP Calling* (visted Oct. 29, 2998) <http://www.vipcalling/com/about.html, 1 page.
*VIP Calling First Internet Telephone Company to Deploy DS-3* (Mar. 30, 1998) <http://www.vipcalling.com/PR_VIP-DS30330.html>, 2 pages.
Gareiss, R., *Voice Over IP Services: The Sound Decision* (Copyright 1998) http://www.poptel.com/newpop/eng/pages/press/data.html>, 7 pages.
*Phone Via Internet —and Forget the Computer* (visited Oct. 29, 1998) <http://www.poptel.com/newpop/eng/pages/press/heraldtrib.html>, 4 pages.
*Interline Telephone Services* (Copyright 198) http://www.interline.aust.com/prodserv.htm>, 2 pages.
*What is IP Telephony?* (Copyright 1998) <http://www.networkstelephony.com/whatistelephony.html>, 2 pages.
*Products (EXICOM)* (Copyright 1998) http://www.exicom.com/products.html, 2 pages.
*Voice/Fax Over IP: Internet, and Extranet: Technology Overview*, MICOM Communications Corporaotion, 52 pages (white paper downloaded from www.micom.com).
*Voice Over Packet (VOP) White Paper* (Copyright 1997) <http://www.telogy.com/our_products?golden_gateway/VOPwhite.html>, 12 pages.
*Net2Phone Product Information* (Copyright 1998) <http://www.net2phone.com/2/English/geninfo.html>, 2 pages.
*Lucent Technologies and VocalTec Demonstrate Industry's First Interoperable Internet Telephony Gateways over ITXC Network* (Sep. 14, 1998) <http://www.vocaltec.com/about/press/pr_Lucent091498.htn>, 3 pages.
Gates, D., *Voice Phone Over the Internet* (Copyright 1998) <http://www.pretext.com/mar98/shorts/shortl.htm>, 4 pages.
Aras, C.M. et al., "Real-Time Communication in Packet-Switched Networks," *Proceedings of the IEEE*, vol. 82, No. 1, Jan. 1994, pp. 122-139.
Weinstein, C.J. and Forgie, J.W., "Experience wth Speech Communication in Packet Networks," *IEEE Journal on Selected Areas in Communication*, vol. SAC-1, No. 6, Dec. 1993, pp. 963-980.
*A Fundamental Shift in Telephony Networks*, Selsius Systems, Inc., Mar. 1998, Version 1.0, 28 pages.
*MicroLegend Internet Telephony Tutorial* (last updated May 16, 1998) <http://www.microlegend.com/what-it.htm>, 2 pages.
*Ascend Product Overview: Multivoice for the MAX—Release 1.0*, Copyright 1998, Ascend Communications, Inc., 18 pages.
Electronic mail message from 'srctran' to 'prd' regarding "Internet and telephone review document", 1995, 10 pages.
Schmit, J., "Talk is cheap in high tech's fledgling market," *USA Today*, Jan. 19, 1996, pp. 18-28.
Gordon, J., "Overview of Internet Congestion on the Public Switched Telephone Network", *GR-303 Integrated Access Symposium*, Jul. 30, 1998, 13 pages.
Gracanin, D., "Implementation of the Voice Transfer Over TCP/IP," *ITA*, 1993, pp. 543-549.

Atai, A., Gordon, J., "Architectural Solutions to Internet Congestion Based on SS7 and Intelligent Network Capabilities," Copyright 1997, Bellcore, 18 pages.

DIALOG File 347 (JAPIO) English Language Patent Abstract for JP 10-51453, published Feb. 20, 1998, 1 page.

DIALOG File 347 (JAPIO) English Language Patent Abstract for JP 10-164135, published Jun. 19, 1998, 1 page.

DIALOG File 347 (JAPIO) English Language Patent Abstract for JP 10-164257, published Jun. 19, 1998, 1 page.

DIALOG File 347 (JAPIO) English Language Patent Abstract for JP 10-23067, published Jan. 23, 1998, 1 page.

Limb et al.; A Distributed Local Area Network Packet Protocol for Combined Voice and Data Transmission; IEEE Journal on Selected Areas in Communications; Nov. 1983; pp. 926-934; V. Sac-1, No. 5; IEEE.

Nakhla et al.; Analysis of a TASI System Employing Speech Storage; IEEE Transactions on Communications; Apr. 1982; pp. 780-785; vol. Com-30, No. 4; IEEE.

Kou et al.; Computations of DSI (TASI) Overload as a Function of the Traffic Offered; IEEE Transactions on Communications; Feb. 1985; vol. Com-33; IEEE.

Kimbleton et al.; Computer Communication Networks: Approaches, Objectives, and Performance Considerations; Computing Surveys; Sep. 1976; pp. 129-173; vol. 7, No. 3, Association for Computing Machinery, Inc.

John G. Gruber; Delay Related Issues in Integrated Voice and Data Transmission: A Review and Some Experimental Work; CH; 1979; pp. 166-180; 1405-0; IEEE.

Daniel Minoli; Digital Voice Communication Over Digital Radio Links; pp. 6-22; Bell Telephone Laboratories; Holmdel, NJ.

Danny Cohen; Flow Control for Real-Time Communication; pp. 41-47; USC/Information Sciences Institute; Marina del Rey, California.

Danny Cohen: Issues in Transnet Packetized Voice Communication; pp. 6-10-6-13; USC/Information Sciences Institute; Marina del Rey, California.

Cox et al.; Multiple User Variable Rate Coding for TASI and Packet Transmission Systems; IEEE Transactions on Communications; Mar. 1980; pp. 334-344; vol. Com-28, No. 3, IEEE.

Galand et al.; Multirate Sub-Band Coder with Embedded Bit Stream: Application to Digital TASI; CH; 1983; pp. 1284-1287; 1841-6; IEEE; Boston.

Cohen et al.; On Protocol Multiplexing; Information Sciences Institute; 1979; pp. 75-81; 1405-0; IEEE.

Vicente Casares-Giner; On the Cutoff Fraction Distribution for TASI Systems with FIFO Discipline; IEEE Transactions on Communications; Nov. 1997; pp. 1367-1370; vol. 45, No. 11; IEEE.

McPherson, Jr. et al.; PCM Speech Compression Via ADPCM/TASI; pp. 184-187; Electrical Engineering Department; North Carolina State University; Raleigh, North Carolina.

Townes et al.; Performance of an ADPCM/TASI System for PCM Speech Compression; IEEE Transactions on Acoustics, Speech, and Signal Processing; Apr. 1981; pp. 302-310; vol. ASSP-29, No. 2; IEEE.

David H. A. Black; PLC-1: A TASI System for Small Trunk Groups; IEEE Transactions on Communications; Apr. 1982; pp. 786-791; vol. Com-30, No. 4, IEEE.

Danny Cohen; Real-time Packet Video Over Satellite Channels; ACM; 1983; pp. 40-47; ACM.

Danny Cohen; Specifications for the Network Voice Protocol (NVP) and Appendix 1: The Definition of Tables-Set-#1 (for LPC) and Appendix 2: Implementation Recommendations; NWG/RFC 741; Jan. 1976; pp. 1-35; Internet.

Sciulli et al.; A Speech Predictive Encoding Communication System for Multichannel Telephony; IEEE Transactions on Communications; Jul. 1973; pp. 827-835; Col. Com-21, No. 7; IEEE.

Easton et al.; TASI-E Communications System; IEEE Transactions on Communications; Apr. 1982; pp. 803-807; vol. Com-30, No. 4; IEEE.

Dorgelo et al.; Variable Length Coding for Increasing Traffic Capacity in PCM Transmission Systems; IEEE Transactions on Communications; Dec. 1973; pp. 1422-1430; IEEE.

Dubnowski et al.; Variable Rate Coding; CH; 1979; pp. 445-448; 1379-7; IEEE.

* cited by examiner

SYSTEM AND METHOD FOR BYPASSING DATA FROM EGRESS FACILITIES

CROSS-REFERENCE TO RELATED APPLICATIONS

This application is a continuation of application Ser. No. 09/196,756, filed Nov. 20, 1998 now U.S. Pat. No. 6,442,169, which application is incorporated herein by reference.

BACKGROUND OF THE INVENTION

1. Field of the Invention

The present invention relates generally to telecommunications networks and, more particularly, to a system and method for the signaling, routing and other manipulation of voice and data calls within the public switched telephone network.

2. Related Art

Telecommunication networks were originally designed to connect one device, such as a telephone, to another device using switching services. Circuit-switched networks provide a dedicated, fixed amount of capacity (a "circuit") between two devices for the entire duration of a transmission session.

Originally, a circuit was created manually, i.e., by a direct connection from a calling party to a human operator (a "ring down") along with human cross-connection by the operator to a called party.

More recently, a circuit is set up between an originating switch and a destination switch using a process known as signaling. Signaling sets up, monitors, and releases connections in a circuit-switched system. Different signaling methods have been devised. Telephone systems formerly used in-band signaling to set up and "tear down" calls. Signals of an in-band signaling system are passed through the same channels as the information being transmitted. Early electromechanical switches used analog or multi-frequency (MF) in-band signaling. Thereafter, conventional residential telephones used in-band dual-tone multiple frequency (DTMF) signaling to connect to an end office switch. Here, the same wires (and frequencies on the wires) were used to dial a number (using pulses or tones), as are used to transmit voice information. However, in-band signaling permitted unscrupulous callers to use a device such as a whistle to mimic signaling sounds to commit fraud (e.g., to prematurely discontinue billing by an interexchange carrier (IXC), also known as long distance telephone company).

More recently, to prevent such fraud, out-of-band signaling systems were introduced that use, for example, a packet network for signaling that is separate from the circuit switched network used for carrying information. For example, integrated services digital network (ISDN) uses a separate channel, a data (D) channel, to pass signaling information out-of-band. Common Channel Interoffice Signaling (CCIS) is a network architecture for out-of-band signaling. A popular version of CCIS signaling is Signaling System 7 (SS7). SS7 is an internationally recognized system optimized for use in digital telecommunications networks.

SS7 out-of-band signaling provided additional benefits beyond fraud prevention. For example, out-of-band signaling eased quick adoption of advanced features (e.g., caller-id) by permitting modifications to the separate signaling network. In addition, the SS7 network enabled long distance "Equal Access" (i.e., 1+ dialing for access to any long distance carrier) as required under the terms of the modified final judgment (MFJ) requiring divestiture of the Regional Bell Operating Companies (RBOCs) from their parent company, AT&T.

While SS7 and other out-of-band signaling systems have advantages over in-band systems, they still have deficiencies. For example, the SS7 network is still more like X.25 rather than a broadband network. Also, SS7 is a limited protocol in that it only addresses setup, teardown, and monitoring of calls.

An SS7 network includes a variety of components. Service Switch Points (SSPs) are telephone offices which are directly connected to an SS7 network. All calls must originate in or be routed through an SSP switch. Calls are passed through connections between SSPs within the telecommunications network. A Signal Transfer Point (STP) is a component which passes signals between SSPs, other STPs, and Service Control Points (SCPs) for processing. An STP is a special application packet switch which operates to pass signaling information. Two STPs may be used together to provide redundancy.

An SCP is a special application computer which maintains information in a database required by users of the network. SCP databases may include, for example, a credit card database for verifying charge information or an "800" database for processing toll-free calls. The components in the SS7 network are connected by links. Typically, links between SSPs and STPs can be, for example, A, B, C, D, E or F links. Typically, redundant links are also used for connecting an SSP and its corresponding STPs. Customer premises equipment (CPE), such as a telephone, are connected to an SSP or an end office (EO).

To initiate a call in an SS7 telecommunications network, a calling party using a telephone connected to an originating end office (EO) switch, dials a telephone number of a called party. The telephone number is passed from the telephone to the SSP at the originating end office (referred to as the "ingress EO") of the calling party's local exchange carrier (LEC). A LEC is commonly referred to as a local telephone company. First, the SSP will process triggers and internal route rules based on satisfaction of certain criteria. Second, the SSP will initiate further signals to another EO or access tandem (AT), for example, if necessary. The signaling information can be passed from the SSP to STPs, which route the signals for communication between the ingress EO and the terminating end office, or egress EO. The egress EO has a port designated by the telephone number of the called party. The call is set up as a direct connection between the EOs through tandem switches if no direct trunking exists or if direct trunking is full. If the call is a long distance call, i.e., between a calling party and a called party located in different local access transport areas (LATAs), then the call is connected through an inter exchange carrier (IXC) switch of any of a number of long distance companies. Such a long distance call is commonly referred to as an inter-LATA call. LECs and IXCs are collectively referred to as the public switched telephone network (PSTN).

Emergence of a competitive LEC (CLEC) was facilitated by passage of the Telecommunications Act of 1996, which authorized competition in the local phone service market. Traditional LECs or RBOCs are now also known as incumbent LECs (ILECs). Thus, CLECs compete with ILECs in providing local exchange services. A large cost associated with setting up and operating a CLEC is the equipment needed to circuit switch data and voice calls.

Since the LECs handle both voice and data communications, large amounts of information are communicated. Bandwidth concerns are always present. The PSTN still has deficiencies, particularly with regard to data communications, for such problems as network congestion and bottlenecks.

The PSTN is ill-equipped to handle the integration of data and voice communications. Today, data and voice calls are sent through the same network. Data communications are presently layered on top of voice switching.

Circuit switching is the process of setting up and keeping a circuit open between two or more users, such that the users have exclusive and full use of the circuit until the connection is released. Packet switching is like circuit switching in that it can also switch information between users. Unlike circuit switching, packet switching does not leave a circuit open on a dedicated basis. Packet switching has conventionally been a data switching technique. Packet switching separates a communication into pieces called packets. A packet can contain addressing information, such as, for example, a destination address. In packet switching, the addresses of a packet are read by a switch and the packet is then routed down a path toward a switch associated with the destination address. Different packets can take diverse paths to reach the eventual destination. Typically, in the last switching office before the packets reach the destination user, the packets can be assembled and sequenced.

A channel, also known as a circuit, is a 64 (Kbps) building block of T1 series. A circuit is derived from the digitization and coding of analog signals. Digitization involves taking 8000 samples per second (i.e., twice the highest voice frequency of 4,000 Hz) for voice traffic. When coded in 8 bit words a 64 Kbps building block is yielded. This circuit is termed a Level 0 Signal and is represented by DS-0 (Digital Signal at Level 0). Combining 24 of these channels into a serial bit stream using time division multiplexing (TDM) is performed on a frame-by-frame basis. A frame is a sample of all 24 channels (i.e., the multiplicative product of 24 and 8 bits is 192 bits) plus a synchronization bit called a framing bit, which yields a block of 193 bits. Frames are transmitted at a rate of 8,000 per second (corresponding to the sampling rate), thus creating a 1.544 Mbps (i.e., the product of 8,000 and 193 is 1.544 Mbps) transmission rate, which is the standard T1 rate. This rate is termed DS-1.

Queuing refers to the act of stacking or holding calls to be handled by a specific person, trunk or trunk group. Queuing theory deals with the study of the behavior of a system that uses queuing, such as a telephone system. Queuing is very important to the design of packet networks where speed of transmission more than offsets the delay of waiting for a transmission facility to become available.

Telephone call traffic is measured in terms of centi call seconds (CCS) (i.e., one hundred call seconds of telephone conversations). One hour of calling traffic, also known as an Erlang (named after a queuing theory engineer), is equal to 36 CCS (i.e., the product of 60 minutes per hour and 60 seconds per minute divided by 100, the theoretical limit of a trunk). An Erlang is used to forecast trunking and TDM switching matrix capacity. A "non-blocking" matrix (i.e., the same number of lines and trunks) can theoretically switch 36 CCS of traffic. Numerically, traffic on a trunk group, when measured in Erlangs, is equal to the average number of trunks in use during the hour in question. For example, if a group of trunks carries 20.25 Erlangs during an hour, a little more than 20 trunks were busy.

At times of high data traffic, the internal CCS of call traffic of the tandem and egress switches climbs, resulting in such problems as network blocking and busy signals. Data calls traditionally pass through tandem and egress switches before being switched to a Wide Area Network (WAN) access device. The tandem and egress switches have become bottlenecks.

Growth of the Internet has led to increased data communications traffic that has exacerbated the problem. Corporations that provide remote modem access to data networks provide dial-up and direct connections. One important example of such corporations are Internet Service Providers (ISPs) provide dial-up and direct connection access to Internet subscribers. Dial-up access is based on transmission using the serial line interface protocol (SLIP) or point-to-point protocol (PPP) to the ISP's network access device. An ISP's network access device can include a communications server. A communications server represents one of several devices connected to a local area network (LAN) or wide area network (WAN). A network router can be connected to the LAN. A network router can be, for example, a computer running routing software, or a dedicated routing device. The router's serial port is used to provide a high-speed communications connection from the ISP to an Internet network service provider (NSP).

Many ISPs are small, start-up companies that face challenges in obtaining the startup capital required to fund large capital expenditures required to purchase the data termination and protocol conversion equipment, including routers, communications servers, and racks filled with modems. ISPs must also expend significant sums of money to the ILEC for large numbers of access lines required to pass data calls through tandem and egress switches before being switched to WAN access devices. ISPs must pass on these costs to their subscribers.

Similarly, a business entity must also invest substantial capital to purchase communications equipment, when, for example, the entity needs to provide employees remote access to a private data network.

The attributes of modem or Internet-type data traffic are very different from those of voice traffic. First, the traffic is qualitatively different. The duration of data traffic (e.g., 20 minutes, 12 hours, or more) is typically longer than voice traffic (e.g., 3 minutes) and therefore requires different queuing theory. Ironically, a data call often does not even need access to the line all the time since an Internet call can contain "bursty traffic", i.e., intermittent bursts of upstream and downstream traffic. Because voice and modem traffic are structurally different, the probability distribution must be adjusted accordingly. The statistical distribution for voice calls is an "exponential distribution," i.e., most calls are 3 minutes or less in duration, and there is a rapidly decreasing number of calls lasting longer than 3 minutes. Data calls (e.g., modem, fax, internet, etc.) have a mean holding time on the order of 20 minutes, and the distribution of holding times instead of having an exponential distribution, has a "power law distribution," meaning it is not extraordinary to encounter calls of very long duration such as, e.g., 12 hours, a day, or even longer.

Second, modem internet traffic is also quantitatively different from voice traffic. The Internet modem traffic generates much higher loads. Residential lines have been engineered expecting to generate loads of 3 or 4 CCS, and business lines, 5 or 6 CCS. If the same customer begins using the same line for Internet traffic, the load can easily double or triple.

Today, the public network is optimized for voice. However, modem traffic has overtaken voice in the local exchange. Queuing theory has not been adjusted for this occurrence, resulting in public network dysfunction. For example, growth in popularity of fixed rate, unlimited access services from ISPs has excessively burdened the PSTN circuit-switch infrastructure. Each unlimited access connection can tie up a dedicated circuit through a tandem switch and/or an egress end office (EO) switch. What is needed then is an improved system for handling data communications, which would allow data to bypass the local exchange's egress switches and the associated costs from local telephone companies.

SUMMARY OF THE INVENTION

The present invention includes a system implementation and a method implementation. The system implementation is directed to a system for bypassing the egress facilities of a telecommunications system. The system comprises a gateway, a network access server and a control server. The gateway communicates with a telecommunications carrier by receiving and transmitting signaling messages. The network access server terminates data calls for termination processing and/or for re-originating said data calls. The control server communicates with the gateway for distinguishing between voice calls and data calls received from the telecommunications carrier and for sending the data calls to the network access server.

The gateway communicates with a switch facility in the telecommunications carrier via the signaling messages. The switch can be, for example, a class 3/4 access tandem switch or a class 5 end office switch.

The gateway can be, for example, a first application program running on a host computer; and the control server can be a second application program running on the host computer or on a second host computer. The first application program and the second application program intercommunicate.

In one embodiment, the control server has a communications portion for communicating with the gateway. The communications portion of the control server and the gateway communicate, for example, via an X.25 protocol format, a transmission control program, internet protocol (TCP/IP) packet format, a user datagram protocol, internet protocol (UDP/IP) packet format. Many other formats are available as well.

In one embodiment, the control server has a communications portion for communicating with a communications portion of the network access server. The communications portion of the control server and the communications portion of the network access server communicate via a protocol such as the network access server (NAS) messaging interface (NMI) protocol (described below) and/or an IPDC protocol (provided in a publically available document, as noted below)."

In one embodiment, the network access server extends a first network to a second network by establishing a protocol tunnel for the data calls. For example, the first network is a virtual private network and the second network is a data network. The tunnel is established using a point-to-point tunneling protocol (PPTP).

In an alternative embodiment to the latter, the network access server converts the data calls from a first digitized format into a second digitized format for delivery of the data calls to a destination data network. The network access server comprises a first device, this first device terminating the data calls on at least one modem. For example, this first device is a modem network access server bay.

In a preferred embodiment, the first digitized format can be a transmission control program, internet protocol (TCP/IP) packet format, or a user datagram protocol, internet protocol (UDP/IP) packet format, an asynchronous transfer mode (ATM) cell packet format, a point-to-point tunneling protocol (PPTP) format, a NETBIOS extended user interface (NETBEUI) protocol format, an Appletalk protocol format, a DECnet, BANYAN/VINES, an internet packet exchange (IPX) protocol format, and an internet control message protocol (ICMP) protocol format. The second format can be, for example, a serial line interface protocol (SLIP) protocol format, or a point-to-point (PPP) protocol format. However, the list of formats that can be used for the first format and the second format can be the same.

The network access server can comprise a second device for time division multiplexing the data calls onto the network access server. The second device can be a tandem network access server bay.

The system can further include a database for distinguishing between voice calls and data calls. The database includes a table comprising called party numbers and the terminating points corresponding to the called party numbers. If the control server determines that a called party number corresponds to a data modem, then the call is a data call.

In one embodiment, the system further includes a voice switch for switching the voice calls and for transmitting the voice calls from the system.

The system can be implemented as an open architecture platform that is leased by or owned by an incumbent local exchange carrier (ILEC), an interexchange carrier (IXC), a competitive local exchange carrier (CLEC), or an enhanced services provider. In one embodiment, the gateway, control server, network access server, and the voice switch are collocated. In another embodiment, the gateway, control server, network access server, and the voice switch are in different geographical regions.

The method implementation of the invention is directed to a method for bypassing data from egress facilities of a telecommunications carrier. The method includes establishing a call with the open architecture telecommunications system, determining whether the call is a voice call or a data call, and terminating the call onto a network access server for termination processing if the call is a data call.

The step of establishing a call with the telecommunications system includes receiving signaling information to set up a call coming into the open architecture telecommunications system, informing a control server that a call has arrived on the open architecture telecommunications system, and receiving the call at the open architecture telecommunications system. The step of receiving signaling information comprises receiving signaling information at a gateway. In one embodiment, signaling system 7 (SS7) signaling information is received at the gateway.

The step of determining whether the call is a voice call or a data call includes using a telephone number of a called party to determine whether the call is a voice call or a data call. The telephone number can be, for example, a number used to access at least one network device of an Internet Services Provider (ISP), at least one network device of a competitive local exchange (CLEC) carrier, or a customer premises equipment (CPE).

In one embodiment, the step of terminating the call onto a network access server for termination processing includes converting the call from a first protocol to a second protocol. The first protocol can include, for example, a transmission control program, internet protocol (TCP/IP) packet format, or a user datagram protocol, internet protocol (UDP/IP)

packet format. The second protocol can be the same formats as well, though the second format is preferably different than the first protocol format.

In another embodiment, the step of terminating the call onto a network access server for termination processing includes providing a protocol tunnel from a first network to a second network. Here, it is possible to use a virtual private network protocol to extend the first network to the second network. The virtual private network protocol can be, for example, a point-to-point tunneling (PPTP) protocol. The first network can be a virtual private network, whereas the second network can be a data network.

The terminating step can further include terminating the call to a voice switch if the call is a voice call. The voice switch will switch and transmit the call.

The present invention provides a number of important features and advantages. First, the open architecture telecommunications system (or platform), employing SS7 signaling and open architecture protocol messaging, uses application logic to identify-and direct incoming data calls straight to a terminal server. This permits the bypassing of a voice switch entirely. This results in significant cost savings for an entity (such as an ISP, an ILEC, or a CLEC) providing service, as compared to the conventional means of delivering data calls through the ILEC. This decrease in cost results partially from bypass of the egress ILEC end office switch for data traffic.

A further advantage for ISPs is that they are provided data in the digital form used by data networks (e.g., IP data packets), rather than the digital signals conventionally used by switched voice networks (e.g., PPP signals). Consequently, they need not perform costly modem conversion processes that would otherwise be necessary. The elimination of many telecommunications processes frees up the functions that ISPs, themselves, would have to perform to provide Internet access.

By separating voice and data traffic, and circuit-switching only the voice traffic through a traditional switch (e.g., a NORTEL DMS 500), the CLEC can use a smaller voice switch, decreasing the capital expense it must pass on to its customers (including ISPs). Thus, it becomes less expensive for the ISPs to route data traffic through a CLEC.

By differentiating between or separating the voice and data traffic on a single platform, different types of traffic can be optimally routed. Thus, for example, video traffic being transported over a modem, can be more efficiently routed over an appropriate carrier rather than through a dedicated circuit switched line.

The open architecture telecommunications system can virtually handle an infinite number of data modem traffic destined for Internet service providers (ISPs). This system is scalable by using fewer intelligent network access devices than conventionally used. The present invention obviates the need to purchase additional circuit switching hardware to support switching of data traffic.

The open architecture telecommunications system also enables the use of a modem pool at, for example, a CLEC. This is advantageous to the ISPs, or business entities owning private data networks, because it offloads complex functions from ISPs to a specialized platform (also known as a Network Service Provider (NSP)) and redistributes capital expenditures to the CLEC NSP. The CLEC NSP often has better access to investment capital than would an ISP. The CLEC NSP also benefits from economies of scale by servicing multiple ISPs with a large pool of modems.

BRIEF DESCRIPTION OF THE FIGURES

The present invention will be described with reference to the accompanying figures, wherein.

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

---

Table of Contents

Figure 1:
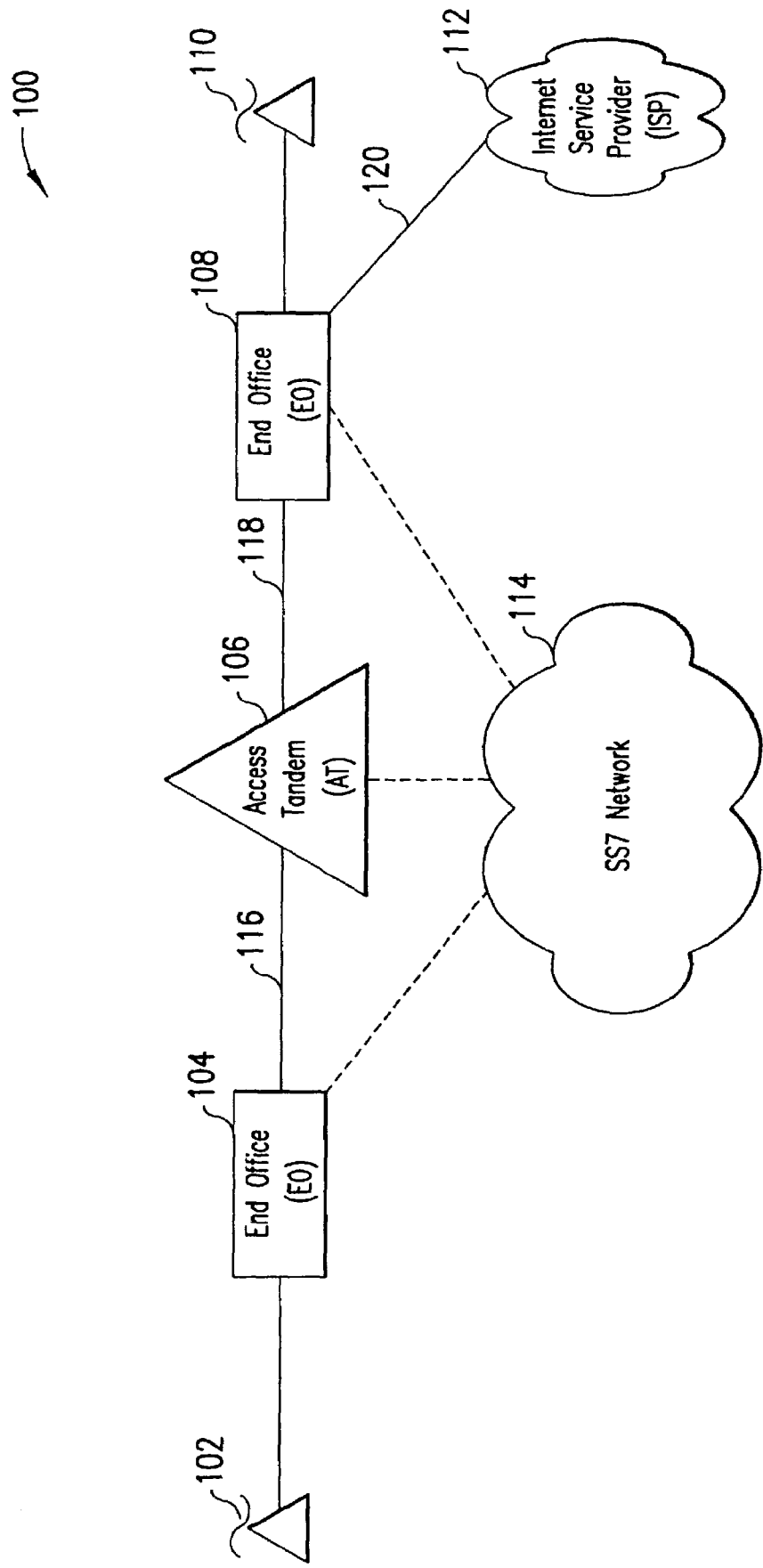
FIG. 1 is a block diagram providing an overview of a standard telecommunications network.

I. An Example Environment
II. Definitions
III. Introduction
  A. An Overview of a Telecommunications Network
  B. The Signaling Network
IV. The Present Invention
  A. Overview of Data Bypass
  B. Detailed Description of Data Bypass
  1. The Open Architecture Platform
  2. Data Bypass Operations
  3. NAS Bay to GW Communications
  4. Control Messages -continued Table of Contents 5. A Detailed View of the Control Messages
    a. Startup Messages
    b. Protocol Error Messages
    c. System Configuration Messages
    d. Telco Interface Configuration Messages
    e. Gateway Configuration Messages
    f. Maintenance-Status (State) Messages
    g. Continuity Test Messages
    h. Keepalive Test Messages
    i. LAN Test Messages
    j. DTMF Function Messages
    k. Inbound Call Handling Messages
    l. Outbound Call Handling Messages
    m. Pass-through Call Handling Messages
    n. Call Clearing Messages
6. Control Message Parameters
7. A Detailed View of the Control Messages
    a. Startup Flow
    b. Module Status Notification
    c. Line Status Notification Flow
    d. Blocking of Channels Flow
    e. Unblocking of Channels Flow
    f. Inbound Call Flow (Without Loopback Continuity Testing)
    g. Inbound Call Flow (With Loopback Continuity Testing)
    h. Outbound Call Flow (Starting from the NAS)
    i. Outbound Call Flow (Starting from the GW)
    j. Outbound Call Flow (Starting from the NAS, with Continuity Testing)
    k. TDM Pass-through Call Request Flow (Inter-switch Connection)
    l. Call Releasing Flow (from NAS)
    m. Call Releasing Flow (from GW)
    n. Complex Outbound Call Request Flow Example
    o. Continuity Test Flow
    p. Keep-alive Test Flow
    q. Reset Request Flow
V. Conclusion I. An Example Environment{TC\l1"}

The present invention is described in terms of an example environment. The example environment uses an open architecture platform for transmission of voice and data information received from a telecommunications carrier. As used herein, a telecommunications carrier can include domestic entities such as ILECs, CLECs, IXCs and Enhanced Service Providers (ESPs), as well as global entities recognized by those skilled in the art. In addition, as used herein a telecommunications system includes domestic systems used by such entities as ILECs, CLECs, IXCs and Enhanced Service Providers (ESPs), as well as global systems recognized by those skilled in the art.

In the preferred embodiment, the open architecture platform is implemented on a SUN Workstation model 450, available from Sun Microsystems, Inc., Palo Alto, Calif. The Sun workstation is interconnected with tandem network access service (NAS) bays and modem NAS bays and provides signaling and control functions. The tandem NAS bays and modem NAS bays can be ASCEND Access Concentrators, model TNT, available from Ascend Communications, Inc., Alameda, Calif. Voice traffic is received at the tandem NAS bays and routed to a NORTEL DMS switch, model DMS 500, available from NORTEL, Richardson, Tex. for routing to a called party.

Data traffic is received at the tandem NAS bays, and is routed to a modem NAS bay for modem termination, where the data traffic is modulated from, for example, the point-to-point protocol (PPP) to an auxiliary protocol such as, for example, the internet protocol (IP) for reorigination and transmission to a data network.

In the alternative, a virtual private networking protocol, such as the point-to-point tunneling protocol (PPTP), can be used to create a "tunnel" between a remote user and a data network. A tunnel permits a network administrator to extend a virtual private network from a server (e.g., a Windows NT server) to a data network (e.g., the Internet).

Where a conversion does take place, the converted data traffic is routed, for example, over an Ethernet/WAN (e.g., an Ethernet switch) connection to an internal backbone on the network, and sent to network routers for transmission to a data network, such as for example the network of an Internet Service Provider (ISP). Network routers can include, for example, a computer, such as the SUN workstation running routing software or a dedicated routing device such as various models from CISCO of San Jose, Calif., ASCEND of Alameda, Calif., NETOPIA of Alameda, Calif., or 3COM of Santa Clara, Calif.

Although the invention is described in terms of this example environment, it is important to note that description in these terms is provided for purposes of illustration only. It is not intended that the invention be limited to this example environment or to the precise inter-operations between the above-noted devices. In fact, after reading the following description, it will become apparent to a person skilled in the relevant art how to implement the invention in alternative environments.

The invention provides two functions which those skilled in the art will recognize can be implemented in many ways. The first function is that the invention bypasses data from the egress facilities used to complete a call. This includes, for example, the network nodes or systems used to terminate a switched voice call to a called party or to terminate a data connection with a data network.

The second function is that the invention provides for termination and reorigination of the call. In one embodiment, data is converted from a first digital form (e.g., in a point-to-point (PPP) digital format) used by the ingress telecommunications services provider (telecommunications carriers including enhanced service providers) to a second form used by a destination data network (e.g., IP data packets). This function is traditionally performed by the entities controlling the destination data network (e.g., ISPs).

In another embodiment, a virtual private networking protocol (e.g., a point-to-point tunneling protocol (PPTP)), can be used to create a "tunnel" between a remote user and a data network. The call terminates at the modem and reoriginates from that destination to another point.

After having the benefit of reading this disclosure, those skilled in the art will recognize that many types of resources, whether collocated or geographically separated, may be used to perform these functions.

II. Definitions{TC\l1"}

Table 1 below defines common telecommunications terminology. These terms are used throughout the remainder of the description of the invention.

TABLE 1

| Term | Definition |
| --- | --- |
| local exchange carrier (LEC) | LECs are providers of local telecommunications services. |
| inter-exchange carrier (IXC) | IXCs are providers of US domestic long distance telecommunications services. AT&T, Sprint and MCI are example IXCs. |

TABLE 1-continued

| Term | Definition |
|---|---|
| incumbent LEC (ILEC) competitive LEC (CLEC) | ILECs are the traditional LECs, which include the Regional Bell Operating Companies (RBOCs). CLECs are telecommunications services providers capable of providing local services that compete with ILECS. A CLEC may or may not handle IXC services as well. |
| local access and transport area (LATA) | A LATA is a region in which a LEC offers services. There are 161 LATAs of these local geographical areas within the United States. |
| end office (EO) | An EO is a class 5 switch used to switch local calls within a LATA. Subscribers of the LEC are connected ("homed") to EOs, meaning that EOs are the last switches to which the subscribers are connected. |
| central office (CO) | A CO is a facility that houses an EO homed. EOs are often called COs. |
| access tandem (AT) | An AT is a class 3/4 switch used to switch calls between EOs in a LATA. An AT provides subscribers access to the IXCs, to provide long distance calling services. An access tandem is a network node. Other network nodes include, for example, a CLEC, or other enhanced service provider (ESP), an international gateway or global point-of-presence (GPOP), or an intelligent peripheral(IP). |
| switching hierarchy or office classification | An office class is a functional ranking of a telephone central office switch depending on transmission requirements and hierarchical relationship to other switching centers. Prior to divestiture, an office classification was the number assigned to offices according to their hierarchical function in the U.S. public switched network (PSTN). The following class numbers are used: class 1 - Regional Center (RC), class 2 - Sectional Center (SC), class 3 - Primary Center (PC), class 4 - Toll Center (TC) if operators are present or else Toll Point (TP), class 5 - End Office (EO) a local central office. Any one center handles traffic from one to two or more centers lower in the hierarchy. Since divestiture and with more intelligent software in switching offices, these designations have become less firm. The class 5 switch was the closest to the end subscriber. Technology has distributed technology closer to the end user, diffusing traditional definitions of network switching hierarchies and the class of switches. |
| class 5 switch | A class 5 switching office is an end office (EO) or the lowest level of local and long distance switching, a local central office. The switch closest to the end subscriber. |
| class 4 switch | A class 4 switching office was a Toll Center (TC) if operators were present or else a Toll Point (TP); an access tandem (AT) has class 4 functionality. |
| class 3 switch | A class 3 switching office was a Primary Center (PC); an access tandem (AT) has class 3 functionality. |
| class 1 switch | A class 1 switching office, the Regional Center(RC), is the highest level of local and long distance switching, or "office of last resort" to complete a call. |
| transmission control protocol/ internet protocol (TCP/IP) | TCP/IP is a protocol that provides communications between interconnected networks. The TCP/IP protocol is widely used on the Internet, which is a network comprising several large networks connected by high-speed connections. |
| internet protocol (IP) | IP is part of the TCP/IP protocols. It is used to recognize incoming messages, route outgoing messages, and keep track of Internet node addresses (using a number to specify a TCP/IP host on the Internet). IP corresponds to network layer of OSI. |
| transmission control protocol (TCP) | TCP is an end-to-end protocol that operates at the transport and sessions layers of OSI, providing delivery of data bytes between processes running in host computers via separation and sequencing of IP packets. |

TABLE 1-continued

| Term | Definition |
|---|---|
| point-to-point (PPP) protocol | PPP is a protocol permitting a computer to establish a connection with the Internet using a modem. PPP supports high-quality graphical front ends, like Netscape. |
| point-to-point tunneling protocol (PPTP) | A virtual private networking protocol, point-to-point tunneling protocol (PPTP), can be used to create a "tunnel" between a remote user and a data network. A runnel permits a network administrator to extend a virtual private network (VPN) from a server (e.g., a Windows NT server) to a data network (e.g., the Internet). |
| point of presence (POP) | A POP refers to the location within a LATA where the IXC and LEC facilities interface. |
| global point of presence (GPOP) | A GPOP refers to the location where international telecommunications facilities and domestic facilities interface, an international gateway POP. |
| bearer (B) channels | Bearer (B) channels are digital channels used to carry both digital voice and digital data information. An ISDN bearer channel is 64,000 bits per second, which can carry PCM-digitized voice or data. |
| Internet service provider (ISP) | An ISP is a company that provides Internet access to subscribers. |
| integrated services digital network (ISDN) | ISDN is a network that provides a standard for communications (voice, data and signaling), end-to-end digital transmission circuits, out-of-band signaling, and a features significant amount of bandwidth. |
| local area network (LAN) | A LAN is a communications network providing connections between computers and peripheral devices (e.g., printers and modems) over a relatively short distance (e.g., within a building) under standardized control. |
| private branch exchange (PBX) | A PBX is a private switch located on the premises of a user. The user is typically a private company which desires to provide switching locally. |
| customer premises equipment (CPE) | CPE refers to devices residing on the premises of a customer and used to connect to a telephone network, including ordinary telephones, key telephone systems, PBXs, video conferencing devices and modems. |
| wide area network (WAN) | A WAN is a data network that extends a LAN over the circuits of a telecommunications carrier. The carrier is typically a common carrier. A bridging switch or a router is used to connect the LAN to the WAN. |
| public switched telephone network (PSTN) | The PSTN is the worldwide switched voice network. |
| packetized voice or voice over a backbone | One example of packetized voice is voice over internet protocol (VOIP). Voice over packet refers to the carrying of telephony or voice traffic over a data network, e.g. voice over frame, voice over ATM, voice over Internet Protocol (IP), over virtual private networks (VPNs), voice over a backbone, etc. |
| digitized data (or digital data) | Digitized data refers to analog data that has been sampled into a binary representation (i.e., comprising sequences of 0's and 1's). Digitized data is less susceptible to noise and attenuation distortions because it is more easily regenerated to reconstruct the original signal. |
| number planning area (NPA); NXX | NPA is an area code. NXX is an exchange, identifying the EO homed to the subscriber. (The homed EO is typically called a central office (CO).) |
| digital access and cross- connect system (DACS) | A DACS is a device providing digital routing and switching functions for T1 lines, as well as DS0 portions of lines, for a multiple of T1 ports. |
| modified final judgment (MFJ) | Modified final judgment (MFJ) was the decision requiring divestiture of the Regional Bell Operating Companies (RBOCs) from their parent company, AT&T. |

TABLE 1-continued

| Term | Definition |
|---|---|
| equal access | 1+ dialing as used in US domestic calling for access to any long distance carrier as required under the terms of the modified final judgment (MFJ) requiring divestiture of the Regional Bell Operating Companies (RBOCs) from their parent company, AT&T. |
| regional Bell operating companies (RBOCs) | RBOCs are the Bell operating companies providing LEC services after being divested from AT&T. |
| inter machine trunk (IMT) | An IMT is a circuit between two commonly-connected switches. |
| network node | A network node is a generic term for the resources in a telecommunications network, including switches, DACS, regenerators, etc. Network nodes essentially include all non-circuit (transport) devices. Other network nodes can include, for example, equipment of a CLEC, or other enhanced service provider (ESP), a point-of-presence (POP), an international gateway or global point-of-presence (GPOP). |
| intelligent peripheral | An intelligent peripheral is a network system (e.g. a general purpose computer running application logic) in the Advanced Intelligent Network Release 1 (AIN) architecture. It contains a resource control execution environment (RCEE) functional group that enables flexible information interactions between a user and a network. An intelligent peripheral provides resource management of devices such as voice response units, voice announcers, and dual tone multiple frequency (DTMF) sensors for caller-activated services. The intelligent peripheral is accessed by the service control point (SCP) when services demand its interaction. Intelligent peripherals provide an intelligent network with the functionality to allow customers to define their network needs themselves, without the use of telephone company personnel. An intelligent peripheral can provide a routing decision that it can terminate, but perhaps cannot regenerate. |
| tele-communications carrier | A LEC, a CLEC, an IXC, an Enhanced Service Provider (ESP), an intelligent peripheral (IP), an international/global point-of-presence (GPOP), i.e., any provider of telecommunications services. |
| calling party | The calling party is the caller placing a call over any kind of network from the origination end. |
| called party | The called party is the caller receiving a call sent over a network at the destination or termination end. |
| ingress | Ingress refers to the connection from a calling party or origination. |
| egress | Egress refers to the connection from a called party or termination at the destination end of a network, to the serving wire center (SWC). |
| ingress EO | The ingress EO is the node or serving wire center (SVC) with a direct connection to the calling party, the origination point. The calling party is "homed" to the ingress EO. |
| egress EO | The egress EO is the node or destination EO with a direct connection to the called party, the termination point. The called party is "homed" to the egress EO. |
| signaling system 7 (SS7) | SS7 is a type of common channel interoffice signaling (CCIS) used widely throughout the world. The SS7 network provides the signaling functions of indicating the arrival of calls, transmitting routing and destination signals, and monitoring line and circuit status. |
| centum call seconds (CCS) | Telephone call traffic is measured in terms of centum call seconds (CCS) (i.e., one hundred call seconds of telephone conversations). 1/36 of an Erlang. |
| Erlang | An Erlang (named after a queuing theory engineer) is one hour of calling traffic, i.e. it is equal to 36 CCS (i.e., the product of 60 minutes per hour and 60 seconds per minute divided by 100). An Erlang is used to forecast trunking and TDM switching matrix capacity. A "non-blocking" matrix (i.e., the same number of lines and trunks) can theoretically switch 36 CCS of traffic. Numerically, traffic on a trunk group, when measured in Erlangs, is equal to the average number of trunks in use during the hour in question. Thus, if a group of trunks carries 20.25 Erlangs during an hour, a little more than 20 trunks were busy. |
| Enhanced Service Provider (ESP) trunk | A network services provider. A trunk connects an access tandem (AT) to an end office (EO). |
| inter machine trunk (IMT) | An inter-machine trunk (IMT) is a circuit between two commonly-connected switches. |
| Private Line with a dial tone | A private line is a direct channel specifically dedicated to a customer's use between two specificed points. A private line with a dial tone can connect a PBX or an ISP's access concentrator to an end office (e.g. a channelized T1 or PRI). A private line can also be known as a leased line. |
| plain old telephone system (POTS) | The plain old telephone system (POTS) line provides basic service supplying standard single line telephones, telephone lines and access to the public switched telephone network (PSTN). All POTS lines work on loop start signaling. One "starts" (seizes) a phone line ortrunk by giving a supervisory signal (e.g. taking the phone off hook). Loop start signaling involves seizing a line by bridging through a resistance the tip and ring (both wires) of a telephone line. |
| integrated service digital network (ISDN) basic rate interface (BRI) line | An ISDN Basic Rate Interface (BRI) line provides 2 bearer B channels and 1 data D line (known as "2B + D" over one or two pairs) to a subscriber. |
| ISDN primary rate interface (PRI) | An ISDN Primary Rate Interface (PRI) line provides the ISDN equivalent of a T1 circuit. The PRI delivered to a customer's premises can provide 23B + D (in North America) or 30B + D (in Europe) channels running at 1.544 megabits per second and 2.048 megabits per second, respectively. |
| Pipe or dedicated communications facility | A pipe or dedicated communications facility connects an ISP to the internet. |

III. Introduction{TC\l1"}

A. An Overview of a Telecommunications Network{TC\l2"}

FIG. 1 is a block diagram providing an overview of a standard telecommunications network 100 providing local exchange carrier (LEC) services within a local access and transport area (LATA). Telecommunications network 100 provides a switched voice connection from a calling party 102 to a called party 110, as well as a data connection from calling party 102 to, for example, an Internet service provider (ISP) 112. Calling party 102 and called party 110 can be ordinary telephone equipment, key telephone systems, private branch exchanges (PBXs), or applications running on a host computer. ISP 112 can in the alternative be, for example, a private data network. For example, calling party 102 can be an employee working on a notebook computer at a remote location who is accessing his employer's private data network through, for example, a dial-up modem connection.

FIG. 1 also includes end offices (EOs) 104 and 108. EO 104 is called an ingress EO because it provides a connection from calling party 102 to public switched telephone network (PSTN) facilities. EO 108 is called an egress EO because it provides a connection from the PSTN facilities to a called party 110. In addition to ingress EO 104 and egress EO 108, the PSTN facilities associated with telecommunications network 100 include an access tandem (AT) 106 that provides access to one or more inter-exchange carriers (IXCs) for long distance traffic. Alternatively, it would be apparent to a person having ordinary skill in the art that AT 106 could also be, for example, a CLEC, or other enhanced service provider (ESP), an international gateway or global point-of-presence (GPOP), or an intelligent peripheral.

EO 104 and AT 106 are part of a switching hierarchy. EO 104 is known as a class 5 office and AT 106 is a class 3/4 office switch. Prior to the divestiture of the RBOCs from AT&T, an office classification was the number assigned to offices according to their hierarchical function in the U.S. public switched network (PSTN). An office class is a functional ranking of a telephone central office switch depending on transmission requirements and hierarchical relationship to other switching centers. A class 1 office was known as a Regional Center (RC), the highest level office, or the "office of last resort" to complete a call. A class 2 office was known as a Sectional Center (SC). A class 3 office was known as a Primary Center (PC). A class 4 office was known as either a Toll Center (TC) if operators were present, or otherwise as a Toll Point (TP). A class 5 office was an End Office (EO), i.e., a local central office, the lowest level for local and long distance switching, and was the closest to the end subscriber. Any one center handles traffic from one or more centers lower in the hierarchy. Since divestiture and with more intelligent software in switching offices, these designations have become less firm. Technology has distributed functionality closer to the end user, diffusing traditional definitions of network hierarchies and the class of switches.

Network 100 includes an Internet service provider (ISP) 112. The Internet is a well-known, worldwide network comprising several large networks connected together by data links. These links include, for example, Integrated Digital Services Network (ISDN), T1, T3, FDDI and SONET links. Alternatively, an internet can be a private network interconnecting a plurality of LANs and WANs, such as, for example, an intranet. ISP 112 provides Internet services for subscribers such as calling party 102.

To establish a connection with ISP 112, calling party 102 can use a host computer connected to a modem (modulator/demodulator). The modem will modulate data from the host computer into a form (traditionally an analog form) for transmission to the LEC facilities. Typically, the LEC facilities convert the incoming analog signal into a digital form. In one embodiment, the data is converted into the point-to-point protocol (PPP) format. (PPP is a well-known protocol that permits a computer to establish a connection with the Internet using a standard modem. It supports high-quality, graphical user-interfaces, such as Netscape.) As those skilled in the art will recognize, other formats are available, including a transmission control program, internet protocol (TCP/IP) packet format, a user datagram protocol, internet protocol (UDP/IP) packet format, an asynchronous transfer mode (ATM) cell packet format, a serial line interface protocol (SLIP) protocol format, a point-to-point (PPP) protocol format, a point-to-point tunneling protocol (PPTP) format, a NETBIOS extended user interface (NETBEUI) protocol format, an Appletalk protocol format, a DECnet, BANYAN/VINES, an internet packet exchange (IPX) protocol format, and an internet control message protocol (ICMP) protocol format.

Note that FIG. 1 and other figures described herein include lines which may refer to communications lines or which may refer to logical connections between network nodes, or systems, which are physically implemented by telecommunications carrier devices. These carrier devices include circuits and network nodes between the circuits including, for example, digital access and cross-connect system (DACS), regenerators, tandems, copper wires, and fiber optic cable. It would be apparent to persons of ordinary skill that alternative communications lines can be used to connect one or more telecommunications systems devices. Also, a telecommunications carrier as defined here, can include, for example, a LEC, a CLEC, an IXC, an Enhanced Service Provider (ESP), a global or international services provider such as a global point-of-presence (GPOP), and an intelligent peripheral.

EO 104 and AT 106 are connected by trunk 116. A trunk connects an AT to an EO. Trunk 116 can be called an inter machine trunk (IMT).

AT 106 and EO 108 are connected by a trunk 118 which can be an IMT. EO 108 and ISP 112 can be connected by a private line 120 with a dial tone. Private line 120 with a dial tone can be connected to a modem bay or access converter equipment at ISP 112. Private line 120 can also connect a PBX (not shown) to EO 108, for example. Examples of a private line are a channelized T1 or PRI. ISP 112 can also attach to the Internet by means of a pipe or dedicated communications facility. A pipe can be a dedicated communications facility. Private line 120 can handle data modem traffic to and from ISP 112.

Trunks 116 and 118 can handle switched voice traffic and data traffic. For example, trunks 116-118 can include digital signals DS1-DS4 transmitted over T1–T4 carriers. Table 2 provides typical carriers, along with their respective digital signals, number of channels, and bandwidth capacities.

TABLE 2

| Digital signal | Number of channels | Designation of carrier | Bandwidth in Megabits per second (Mbps) |
|---|---|---|---|
| DS0 | 1 | None | 0.064 |
| DS1 | 24 | T1 | 1.544 |
| DS2 | 96 | T2 | 6.312 |
| DS3 | 672 | T3 | 44.736 |
| DS4 | 4032 | T4 | 274.176 |

Alternatively, trunks 116 and 118 can include optical carriers (OCs), such as OC-1, OC-3, etc. Table 3 provides typical optical carriers, along with their respective synchronous transport signals (STSs), ITU designations, and bandwidth capacities.

TABLE 3

| Optical carrier (OC) signal | Electrical signal, or synchronous transport signal (STS) | International Telecommunications Union (ITU) terminology | Bandwidth in Megabits per second (Mbps) |
|---|---|---|---|
| OC-1 | STS-1 | | 51.84 |
| OC-3 | STS-3 | STM-1 | 155.52 |
| OC-9 | STS-9 | STM-3 | 466.56 |
| OC-12 | STS-12 | STM-4 | 622.08 |
| OC-18 | STS-18 | STM-6 | 933.12 |
| OC-24 | STS-24 | STM-8 | 1244.16 |
| OC-36 | STS-36 | STM-12 | 1866.24 |
| OC-48 | STS-48 | STM-16 | 2488.32 |

As noted, private line 120 is a connection that can carry data modem traffic. A private line is a direct channel specifically dedicated to a customer's use between two specificed points. A private line can also be known as a leased line. In one embodiment, private line 120 is an ISDN/primary rate interface (ISDN PRI) connection. An ISDN PRI connection includes a single signal channel (called a data or D channel) on a T1, with the remaining 23 channels being used as bearer or B channels. (Bearer channels are digital channels that bear voice and data information.) If multiple ISDN PRI lines are used, the signaling for all of the lines can be carried over a single D channel, freeing up the remaining lines to carry only bearer channels.

Network 100 also includes a CCIS network for call setup and call tear down. Specifically, FIG. 1 includes a Signaling System 7 (SS7) network 114. This SS7 network is described more fully below with reference to FIG. 3 below.

Figure 2:
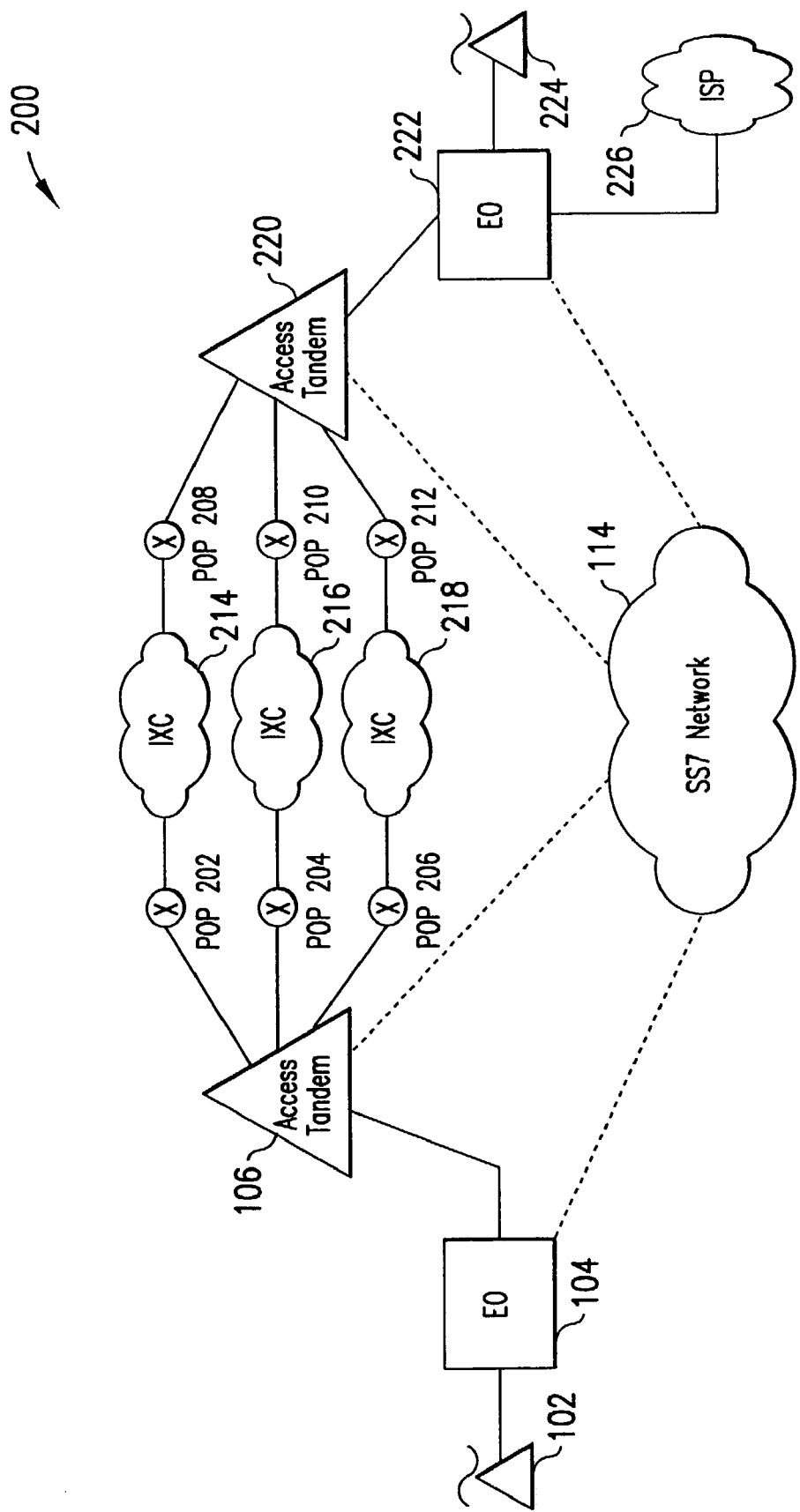
FIG. 2 is a block diagram illustrating an overview of a standard telecommunications network.

FIG. 2 is a block diagram illustrating an overview of a standard telecommunications network 200, providing both LEC and IXC carrier services between subscribers located in different LATAs. Telecommunications network 200 is similar to telecommunications network 100, except that calling party 102 and a called party 224 are located in different LATAs. In other words, calling party 102 is homed to ingress EO 104 in a first LATA, whereas called party 224 is homed to an egress EO 222 in a second LATA. Calls between subscribers in different LATAs are long distance calls that are typically routed to IXCs. Sample IXCs in the United States include AT&T, MCI and Sprint.

AT 106 provides connection to points of presence (POPs) 202, 204 and 206. IXCs 214, 216 and 218 provide connection between POPs 202, 204 and 206 (in the first LATA) and POPs 208, 210 and 212 (in the second LATA). POPs 208, 210 and 212, in turn, are connected to AT 220, which provides connection to egress EO 222. Called party 224 receives calls from EO 222, which is its homed EO. Alternatively, it would be apparent to a person having ordinary skill in the art that an AT 106 can also be, for example, a CLEC, or other enhanced service provider (ESP), an international gateway or global point-of-presence (GPOP), or an intelligent peripheral.

In addition to providing a voice connection from calling party 102 to called party 224, the PSTN provides calling party 102 a data connection to an ISP 226. ISP 226 is similar to ISP 112.

B. The Signaling Network{TC\l2"}

Figure 3:
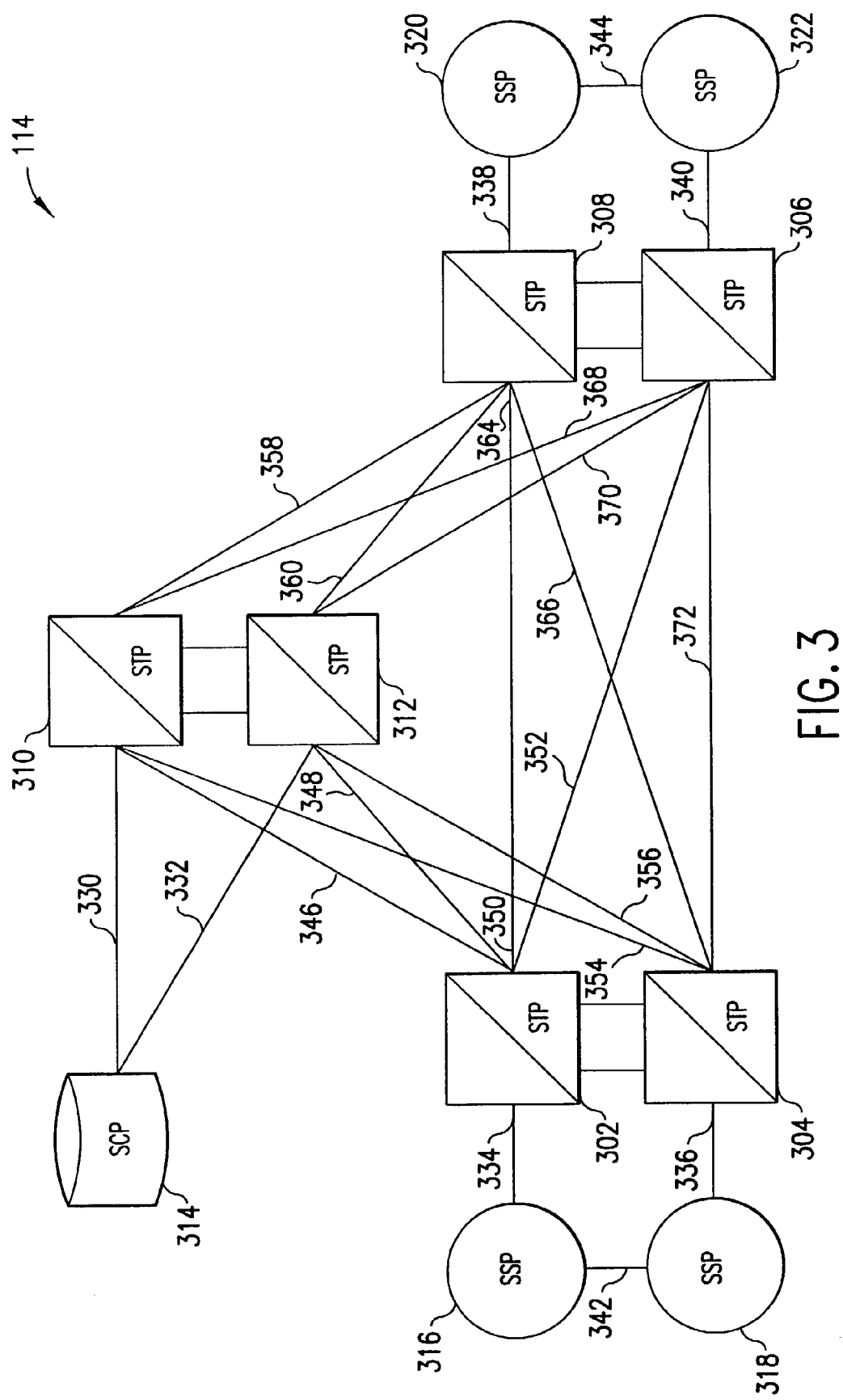
FIG. 3 illustrates a signaling network in greater detail.

FIG. 3 illustrates SS7 network 114 in greater detail. SS7 network 114 is a separate network used to handle the set up, tear down, and supervision of calls between calling party 102 called party 110 (or ISP 226). SS7 network 114 includes service switching points (SSPs) 316, 318, 320 and 322, signal transfer points (STPs) 302, 304, 306, 308, 310 and 312, and service control point (SCP) 314.

In the SS7 network, the SSPs are the portions of the backbone switches providing SS7 functions. The SSPs can be, for example, a combination of a voice switch and an SS7 switch, or a computer connected to a voice switch. The SSPs communicate with the switches using primitives, and create packets for transmission over the SS7 network.

EOs 104, 222 and ATs 106, 220 can be respectively represented in SS7 network 114 as SSPs 316, 318, 320 and 322. Accordingly, the connections between EOs 104, 222 and ATs 106, 220 (presented as dashed lines) can be represented by connections 334, 336, 338, and 340. The types of these links are described below.

The STPs act as routers in the SS7 network, typically being provided as adjuncts to in-place switches. The STPs route messages from originating SSPs to destination SSPs. Architecturally, STPs can and are typically provided in "mated pairs" to provide redundancy in the event of congestion or failure and to share resources (i.e., load sharing is done automatically). As illustrated in FIG. 3, STPs can be arranged in hierarchical levels, to provide hierarchical routing of signaling messages. For example, mated STPs 302, 304 and mated STPs 306, 308 are at a first hierarchical level, while mated STPs 310, 312 are at a second hierarchical level.

SCPs provide database functions. SCPs can be used to provide advanced features in an SS7 network, including routing of special service numbers (e.g., 800 and 900 numbers), storing information regarding subscriber services, providing calling card validation and fraud protection, and offering advanced intelligent network (AIN) services. SCP 314 is connected to mated STPs 310 and 312.

In the SS7 network, there are unique links between the different network elements. Table 4 provides definitions for common SS7 links.

Referring to FIG. 3, mated STP pairs are connected by C links. For example, STPs 302, 304, mated STPs 306, 308, and mated STPs 310, 312 are connected by C links (not labeled). SSPs 316, 318 and SSPs 320, 322 are connected by F links 342 and 344.

Mated STPs 302, 304 and mated STPs 306, 308, which are at the same hierarchical level, are connected by B links 350, 352, 366 and 372. Mated STPs 302, 304 and mated STPs 310, 312, which are at different hierarchical levels, are connected by D links 346, 348, 354 and 356. Similarly, mated STPs 306, 308 and mated STPs 310, 312, which are at different hierarchical levels, are connected by D links 358, 360, 368 and 370.

SSPs 316, 318 and mated STPs 302, 304 are connected by A links 334 and 336. SSPs 320, 322 and mated STPs 306, 308 are connected by A links 338 and 340.

SSPs 316, 318 can also be connected to mated STPs 310, 312 by E links (not shown). Finally, mated STPs 310, 312 are connected to SCP 314 by A links 330 and 332.

For a more elaborate description of SS7 network topology, the reader is referred to Russell, Travis, *Signaling System #7*, McGraw-Hill, New York, N.Y. 10020, ISBN 0-07-054991-5, which is incorporated herein by reference in its entirety.

TABLE 4

| SS7 link terminology | Definitions |
| --- | --- |
| Access (A) links | A links connect SSPs to STPs, or SCPs to STPs, providing network access and database access through the STPs. |
| Bridge (B) links | B links connect mated STPs to other mated STPs. |
| Cross (C) links | C links connect the STPs in a mated pair to one another. During normal conditions, only network management messages are sent over C links. |
| Diagonal (D) links | D links connect the mated STPs at a primary hierarchical level to mated STPs at a secondary hierarchical level. |
| Extended (E) links | E links connect SSPs to remote mated STPs, and are used in the event that the A links to home mated STPs are congested. |
| Fully associated (F) links | F links provide direct connections between local SSPs (bypassing STPs) in the event there is much traffic between SSPs, or if a direct connection to an STP is not available. F links are used only for call setup and call teardown. |

IV. The Present Invention{TC\l1"}

A. Overview of Data Bypass{TC\l2"}

Figure 4:
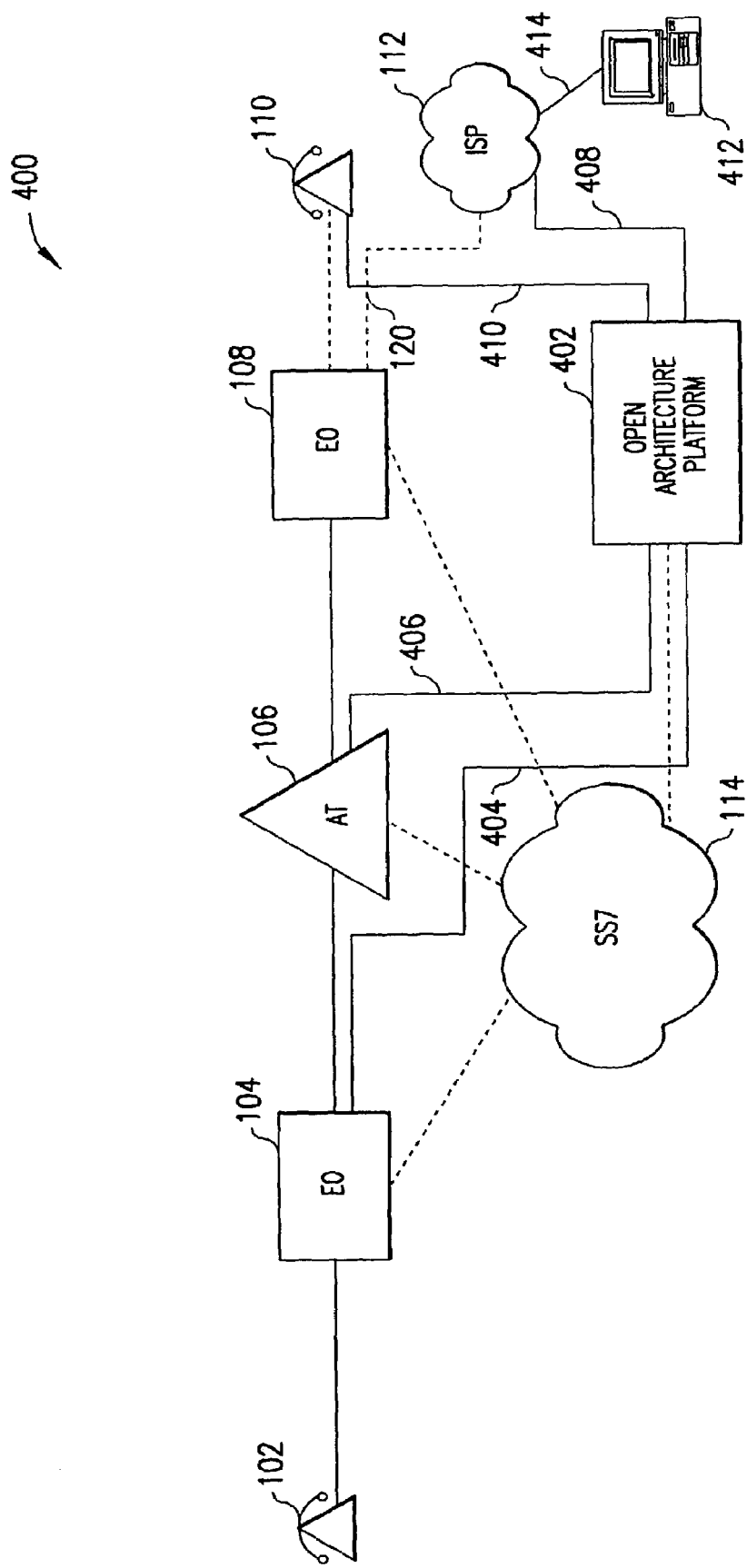
FIG. 4 provides an overview of the present invention in that it provides an enhanced telecommunications network.

FIG. 4 includes an overview of an enhanced telecommunications network 400 according to the present invention. This invention relates to the convergence of two types of networks, i.e., voice and data networks. Telecommunications network 400 provides a bypass connection from the ingress EO 104 (a class 5 switch) or from AT 106 (a class 3/4 switch) to the called party 110 and ISP 112. Alternatively, it would be apparent to a person having ordinary skill in the art that an AT 106 can also be, for example, a CLEC, or other enhanced service provider (ESP), an international gateway or global point-of-presence (GPOP), or an intelligent peripheral. The connection is called a bypass connection because it bypasses the connections from the egress EO 108 to called party 110 and ISP 112. In other words, for example, the facilities of the incumbent LEC (ILEC) terminating the call of originating caller 102 are bypassed.

Telecommunications network 400 includes open architecture platform 402. Telecommunications network 400 also includes trunks 404 and 406, connection 408, and trunk 410, which, for example, respectively connect open architecture platform 402 to EO 104, to AT 106 (i.e., any telecommunications carrier), to ISP 112 (i.e., or a business entity's private data network), and to called party 110. In a preferred embodiment, trunks 404 and 406 can handle both data and voice traffic. However, trunks 404 and 406 must be capable of handling at least data traffic. In a preferred embodiment, connection 408 and trunk 410 can handle data or voice traffic. However, connection 408 must be capable of handling at least data traffic (i.e. including any type of digitized data). It should also be apparent to a person having ordinary skill, that connection 408, for example, is a logical connection that can contain various network devices.

As noted, open architecture platform 402 can receive both voice and data traffic. This traffic can be received from any network node of a telecommunications carrier. A telecommunications carrier can include, for example, a LEC, a CLEC, an IXC, and an Enhanced Service Provider (ESP). In a preferred embodiment, this traffic is received from a network node which is, for example, a class 5 switch, such as EO 104, or from a class 3/4 switch, such as AT 106. Alternatively, the network system can also be, for example, a CLEC, or other enhanced service provider (ESP), an international gateway or global point-of-presence (GPOP), or an intelligent peripheral. Accordingly, open architecture platform 402 integrates both voice and data traffic on a single platform.

Data traffic refers, for example, to a data connection between a calling party 102 (using a modem) and a server 412 in ISP 112. A data connection is established between calling party 102 and EO 104, then over a trunk 404 to open architecture platform 402, then over a connection 408 to ISP 112, and then over a connection 414 to server 412. Alternatively, the connection can be established from calling party 102 to EO 104, then to AT 106, then over trunk 406 to open architecture platform 402, then over connection 408 to ISP 112, and then over connection 414 to server 412.

Voice traffic refers, for example, to a switched voice connection between calling party 102 and called party 110. It is important to note that this is on a point-to-point dedicated path, i.e., that bandwidth is allocated whether it is used or not. A switched voice connection is established between calling party 102 and EO 104, then over trunk 404 to open architecture platform 402, then over trunk 410 to called party 110. Alternatively, the connection can be established from calling party 102 to EO 104 and then to AT 106, then over trunk 406 to open architecture platform 402, then over trunk 410 to called party 110. In another embodiment, AT 106 can also be, for example, a CLEC, or other enhanced service provider (ESP), an international gateway or global point-of-presence (GPOP), or an intelligent peripheral.

Open architecture platform 402, and communications links 404, 406, 408 and 410 comprise the resources of an ILEC or a competitive LEC (CLEC). A CLEC may or may not provide inter-LATA calls, which are traditionally handled by IXCs.

B. Detailed Description of Data Bypass{TC\l2"}

1. The Open Architecture Platform {TC\l3"}

Figure 5:
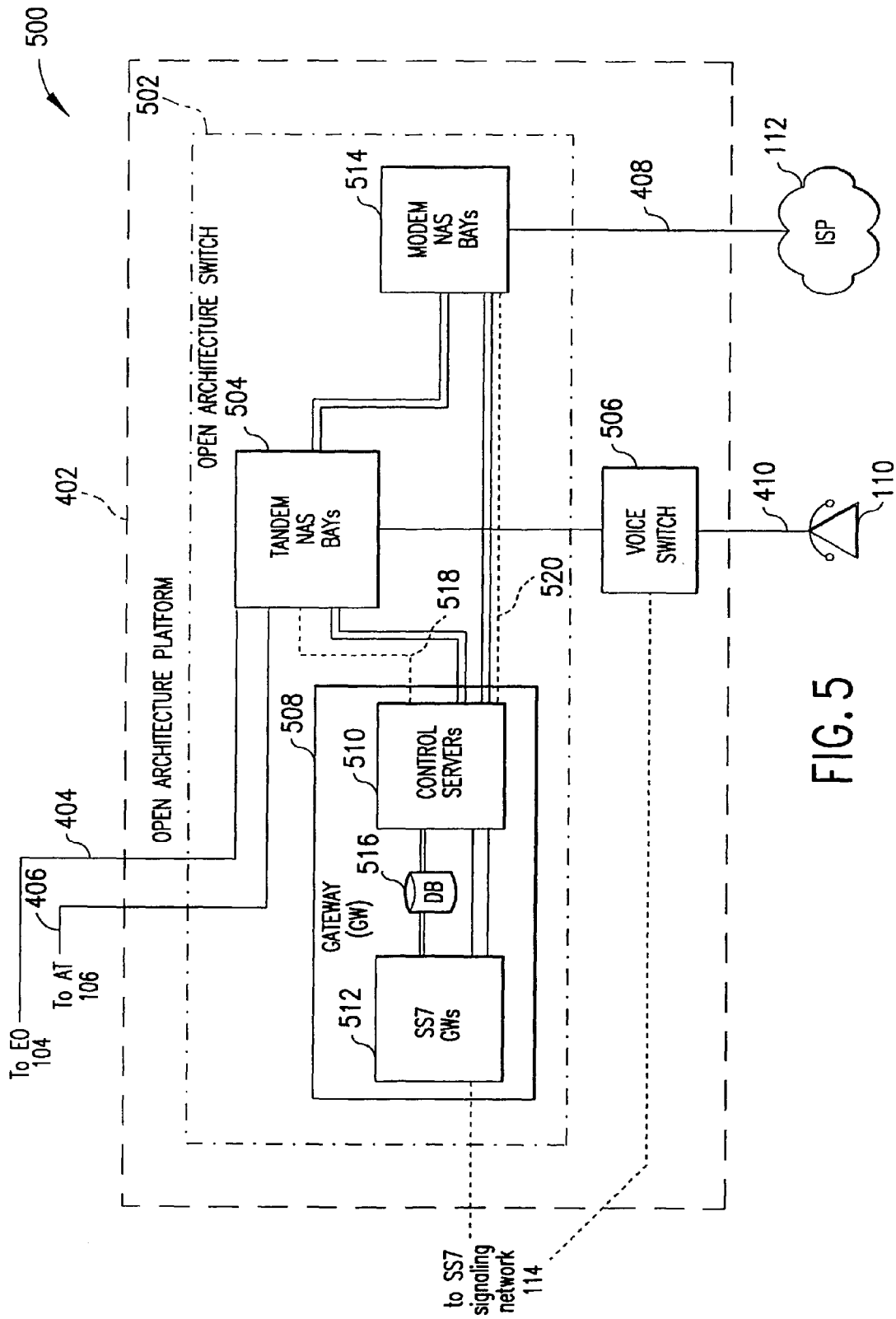
FIG. 5 illustrates an open architecture platform in detail.

FIG. 5 illustrates open architecture platform 402 in detail. Open architecture platform 402 includes an open architecture switch 502 and a voice switch 506. Open architecture platform 402 receives data and voice traffic from the PSTN (over communications links 404 and 406) and separates data traffic from voice traffic. Data traffic is handled by open architecture switch 502, while voice traffic is handled by voice switch 506.

Voice calls switched by voice switch 506 are sent out from the open architecture platform 402. For example, an outbound voice call is sent from voice switch 506 over communications link 410 to called party 110.

On the other hand, outbound data calls are passed onto a modem NAS bay (which can be a resource on open architecture switch 502) for modem termination. For example, a data signal (e.g., in the PPP protocol) can be converted to protocol used by data networks (e.g., into internet protocol (IP) data packets), for transmission over routers to a data network, such as an ISP. Specifically, an outbound data call will be sent to modem NAS bay 514, then to routers (not shown), and then sent to ISP 112 over communications link 408. As another example, a virtual private networking protocol can be used to create a "tunnel" between the remote user and a data network. For example, calling party 102, using a server that supports a tunnel protocol (e.g., PPTP) will have an extended virtual private network connection with a data network, such as ISP 112.

As noted, open architecture platform 402 comprises open architecture switch 502 and voice switch 506. Open architecture switch 502 includes gateway (GW) 508, tandem network access server (NAS) bay 504, and modem NAS bay 514.

GW 508 comprises SS7 gateway (SS7 GW) 512, control server 510, and database 516 communicating with control server 510. GW 508 can include multiple SS7 GWs 512 and multiple control servers 510 (each having one or more databases 516). Database 516 can be internal to GW 508 or alternatively, external to GW 508.

It is important to note that the open architecture platform is defined by the function of the resources comprising it, and how these resources are interrelated. Accordingly, there is no reason that GW 508, tandem NAS bay 504, and modem NAS bay 514 would be required to be collocated, or limited to a particular geographical area, see FIG. 9B, below. Further, the architecture is infinitely scalable over geographic boundaries. As long as any resources match the functions and interoperabilities defined herein, then such resources comprise open architecture platform 402. The same holds true for the subcomponents comprising any platform resources, e.g., the subcomponents of GW 508 (defined below).

Gateway 508 has two functions: interfacing with the CCIS signaling network (e.g., the SS7 signaling network 114) and interfacing with a plurality of control servers to control a plurality of NAS bays. SS7 GW 512 provides the first function of providing an interface to the SS7 signaling network 114. The SS7 signaling information is conveyed to control server 510.

Control server 510 provides the second function of controlling one or more NAS bays which comprise resources of open architecture switch 502. Specifically, control server 510 communicates with tandem NAS bay 504 and modem NAS bay 514. This communication is performed via a protocol understood by the open architecture platform 402 resources, referred to herein as an open architecture protocol.

The open architecture protocol is represented by dotted lines 518 and 520. In one embodiment, the open architecture protocol is the network access server (NAS) messaging interface (NMI) protocol, created by XCom Technologies Inc. This protocol is defined by a series of control messages, which are defined below in table form. Another protocol is called the Internet Protocol Device Control (IPDC), recently released by a Technical Advisory Council (TAC) and Level 3 Communications, Inc. The IPDC specification, which is incorporated herein by reference in its entirety, is available in its current draft on the Level 3 Communications web site http://www.Level3.com. It will be apparent to those skilled in the art that any comparable protocol will suffice, so long as the protocol permits the resources of the open architecture platform 402 to communicate with one another.

Figure 9A:
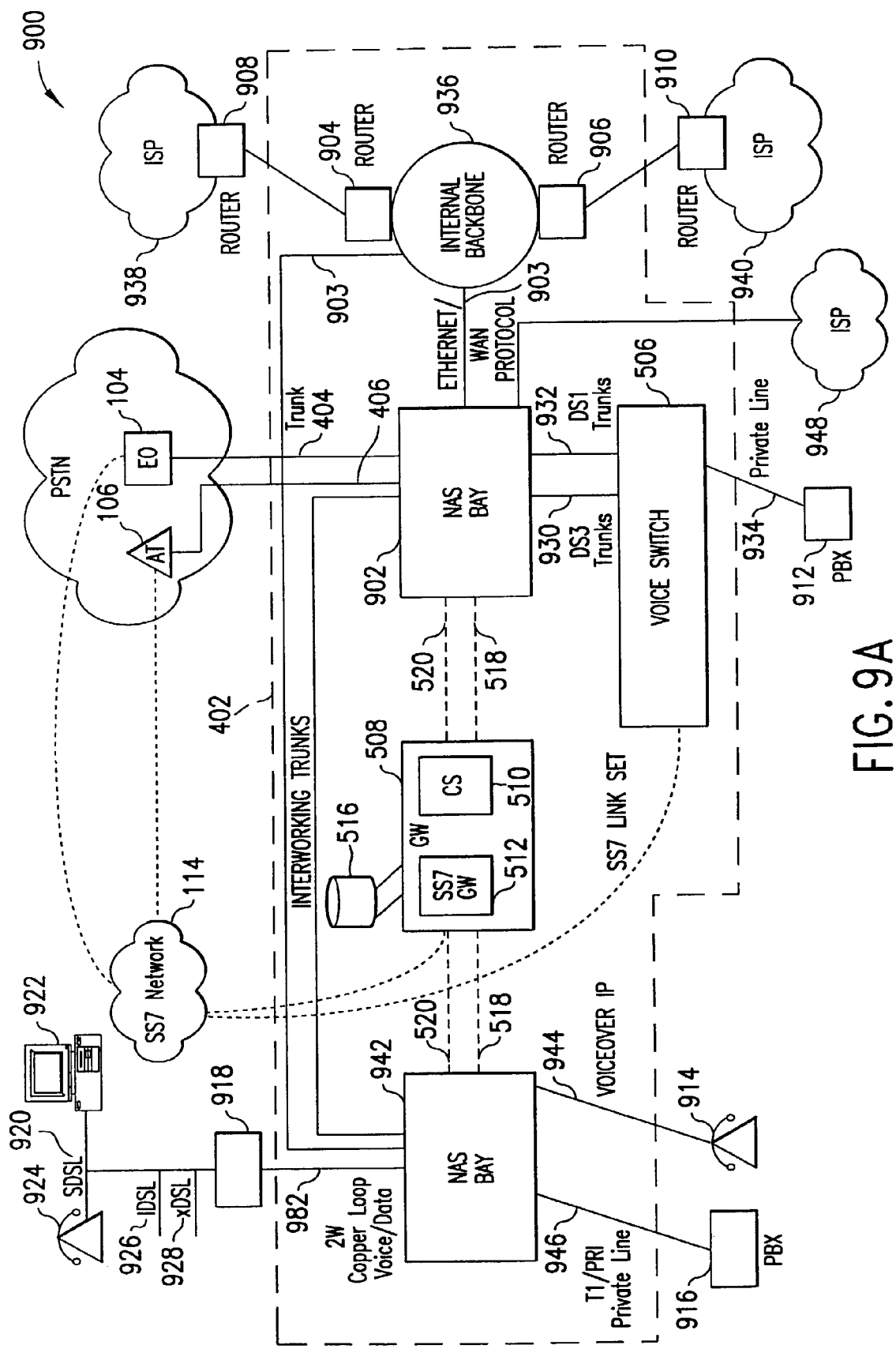
FIG. 9A is a more elaborate view of the present invention.
Figure 9B:
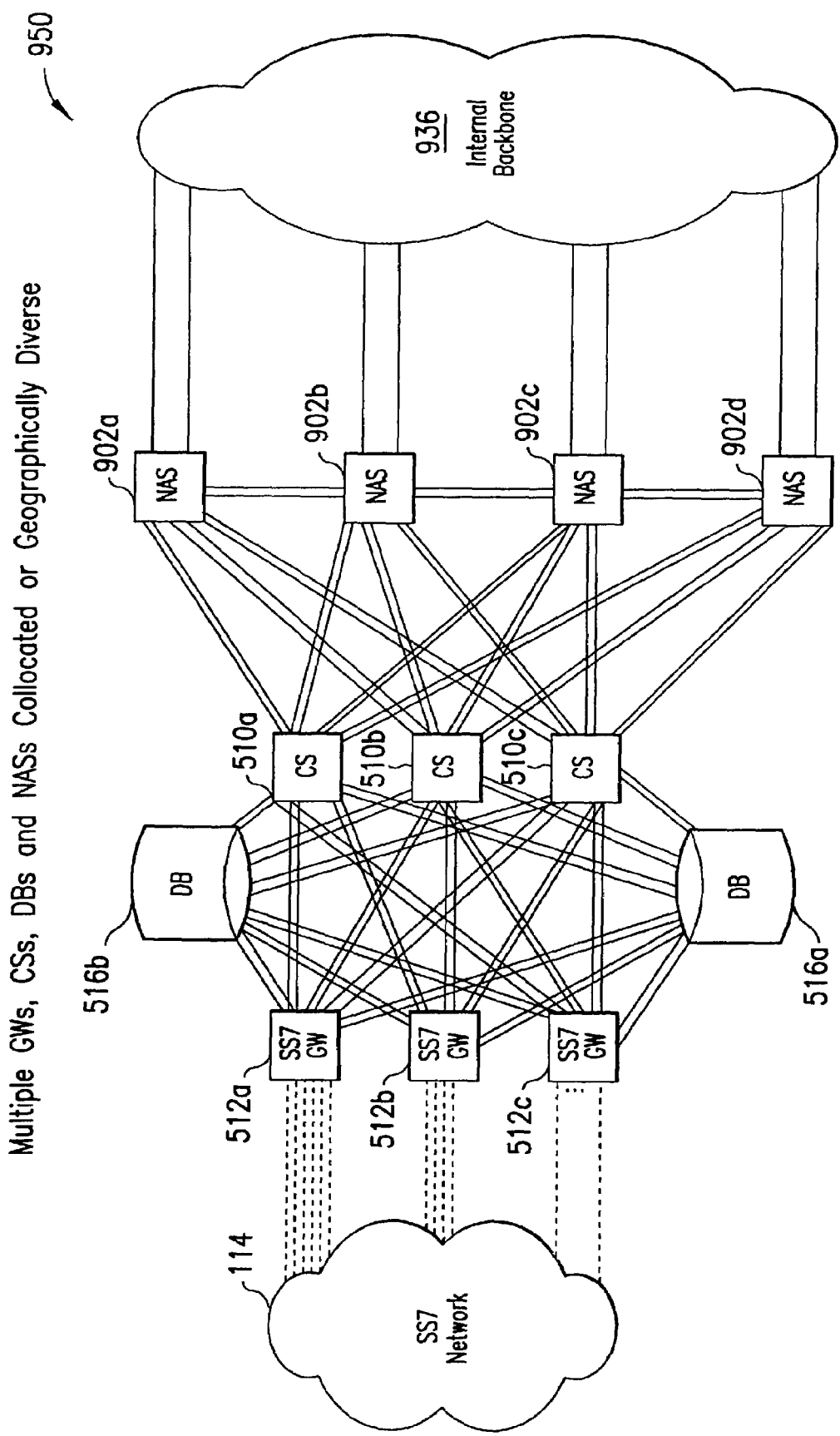
FIG. 9B depicts multiple collocated or geographically diverse SS7 Gateways, Control Servers, Databases and Network Access Servers.

In one embodiment, as depicted in FIG. 9B, below, one or more of SS7 GW 512, control server 510, database 516, and NAS are geographically diverse devices (or applications running on devices). For example, these devices can be connected by communications links using Ethernet, frame relay, asynchronous transfer mode (ATM), or any other conceivable protocols. In another embodiment, one or more of SS7 GW 512, control server 510, database 516, and NAS 902 are collocated devices (or applications running on devices), see FIG. 9B.

Figure 6:
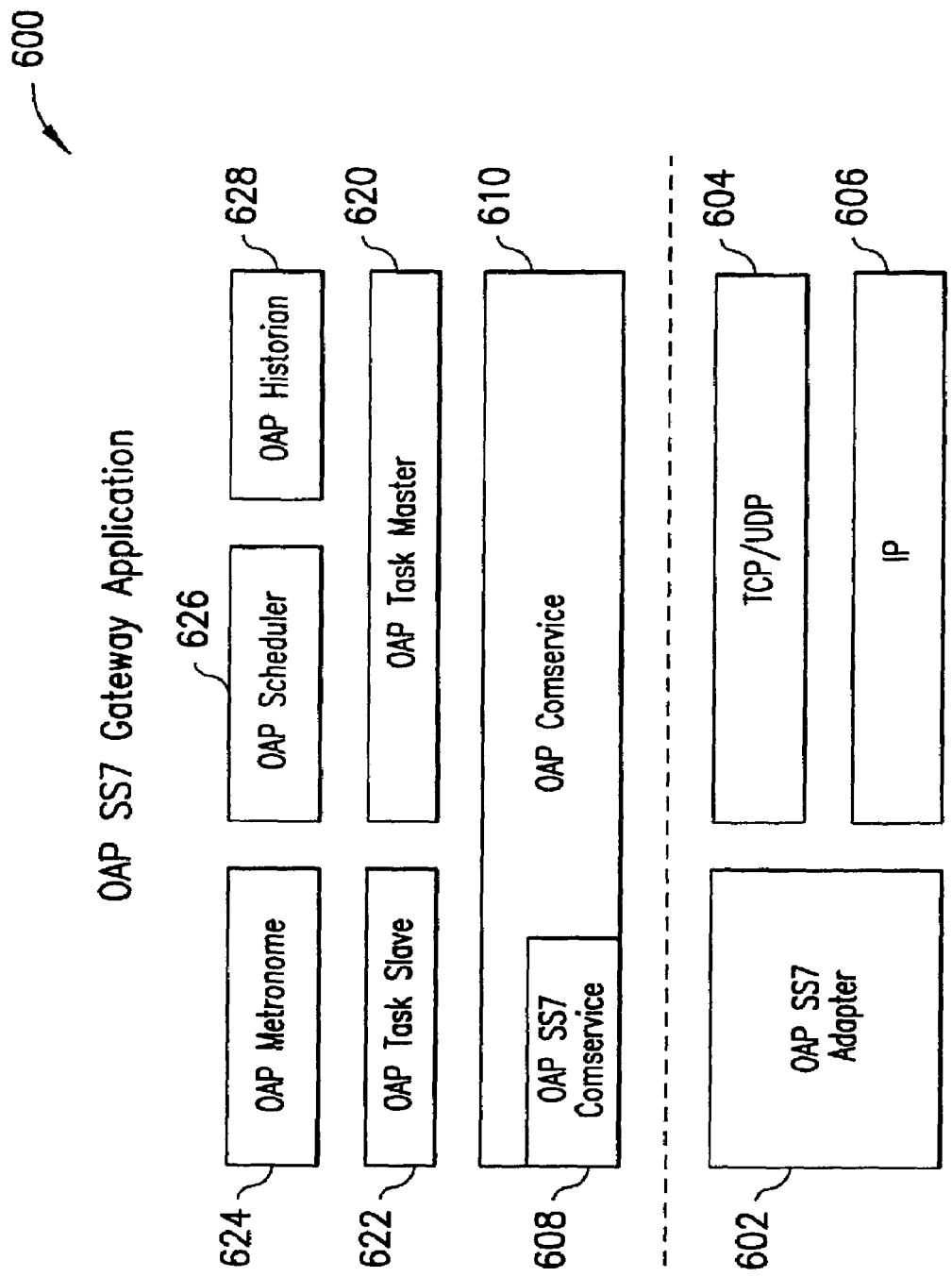
FIG. 6 illustrates an object oriented or wire line protocol format Open Architecture SS7 Gateway application and SS7 adapter communicating directly with lower level libraries.
Figure 7:
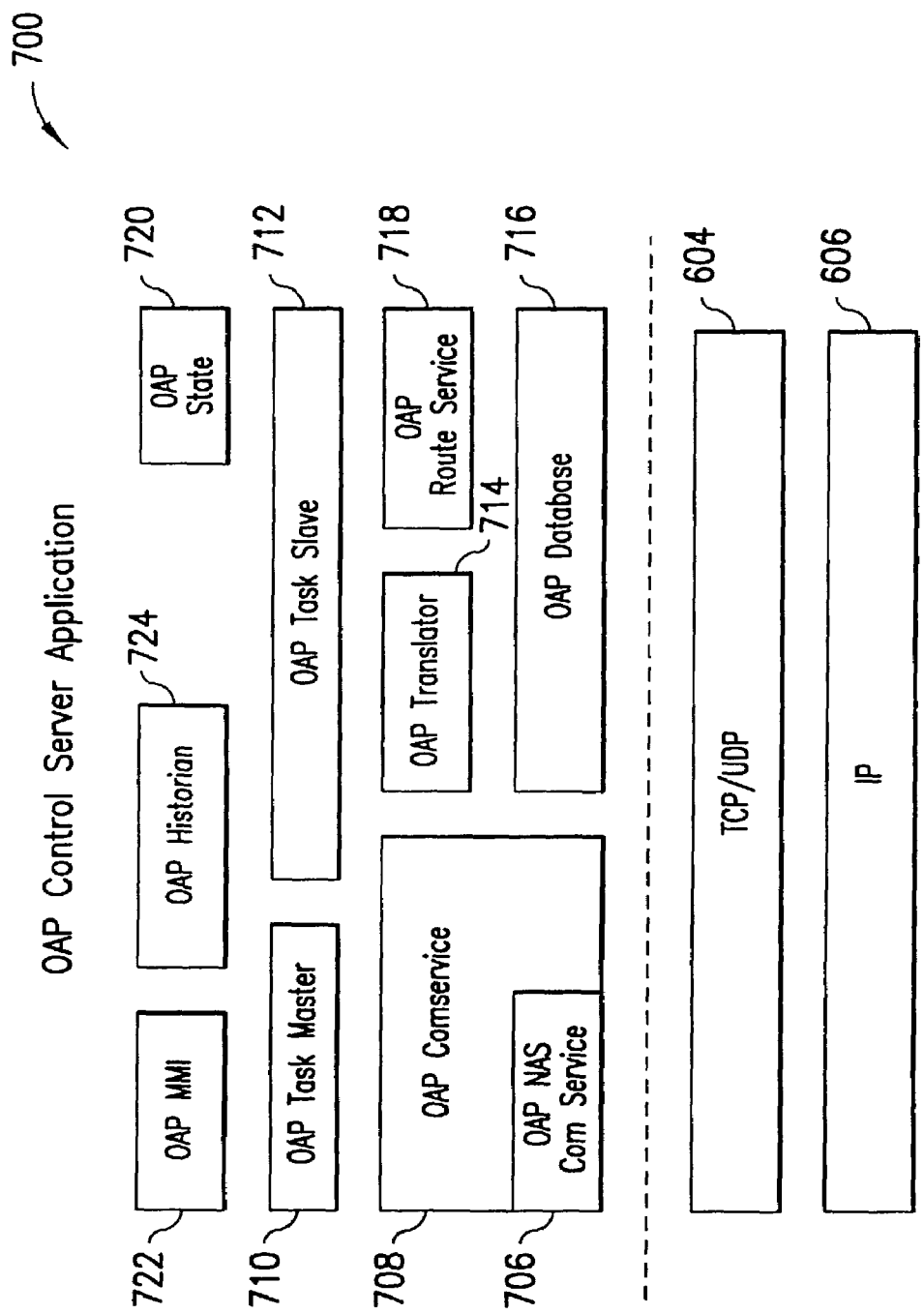
FIG. 7 illustrates an object oriented or wire line protocol format Open Architecture Control Server application.

In a preferred embodiment, SS7 GW 512 and control server 510 are applications running on one or more collocated host computers. Alternatively, the applications can be run on one or more geographically diverse computers. For example, the host computers can be one or more redundantly interconnected SUN workstations, model 450, for example, available from Sun Microsystems. FIGS. 6 and 7 below are representations used to illustrate the intercommunications between SS7 GW 512 and control server 510 in the preferred embodiment.

FIG. 6 symbolically illustrates an example SS7 GW 512 application (as implemented using computer programs). The SS7 GW 512 application, labeled open architecture platform (OAP) SS7 GW application 600, provides communications between SS7 network 114 and open architecture switch 502. The SS7 signaling information is translated into, for example, an object-oriented, or wire line protocol format form for cross-platform compatibility, ease of transport, and parsing.

As illustrated in FIG. 6, OAP SS7 adapter 602 communicates directly with the lower level libraries, such as TCP/UDP 604 and IP 606, provided by manufacturers of SS7 interface cards and by manufacturers of host computers used in particular applications. OAP SS7 comservice 608 of OAP comservice 610 queues messages between OAP SS7 adapter 602 and the remainder of OAP SS7 GW application 600. It is important to note that any number of protocols recognized by those skilled in the art can be used. For example, instead of TCP/IP or UDP/IP, the X.25 protocol can be used instead.

OAP task master 620 maintains a pool of threads that are assigned to one or more OAP task slaves 622. OAP SS7 GW application 600 is cued by an OAP metronome 624 to read tasks from OAP scheduler 626. OAP task slave 622 is an abstract base class from which is derived a number of unique slaves that may initiate SS7 signals in response to messaging from SS7 network 114.

Messages from SS7 network 114 are received through SS7 adapter 602 and passed to OAP comservice 610 and OAP task master 620. OAP task master 620 schedules tasks to respond to each of the messages. Each message is then passed to OAP comservice 610 again to be transferred to an appropriate control server 510.

Messages may also be stored in OAP historian 628. If appropriate, the tasks from OAP scheduler 626 are performed and appropriate messages are passed back to SS7 network 114 through OAP adapter 602.

The processing of messages from control servers 510 operates in a similar manner. The messages come through OAP comservice 610 and are passed to OAP task master 620. OAP task master 620 then determines appropriate tasks, if any, and transfers the messages on to the adapter to be sent on SS7 network 114.

An example control server 510 application (as implemented using computer programs) is illustrated symbolically in FIG. 7. FIG. 7 illustrates the OAP control server application 700, which is a call processing coordinator.

OAP control server application 700 receives SS7 signals in object or wire line protocol form from SS7 GW 512. Based upon the signals, it handles resource allocation, signaling responses and translation services.

OAP comservice 708 is similar to OAP comservice 610 (in SS7 GW 512) because it operates to receive and send messages between itself and SS7 GW application 600. OAP task master 710 determines and schedules tasks to be performed by OAP control server application 700. OAP task slave 712 is an abstract base class from which are derived unique classes for each message.

OAP translator 714 object or wire line protocol format maps telephone numbers onto OAP database 716. OAP database 716 contains the destination of the call, any class functions associated with the call, the type of routing algorithm that should be used, and a status associated with the telephone number. OAP router service 718 is an object or wire line protocol which transports requests for routing paths, including both delivery and receipt of responses.

OAP state 720 is a collection of data on the state of each circuit identifier code (CIC) which exists between a given SS7 GW 512 originating point code (OPC) and a destination point code (DPC). This data includes the current status of the trunk and information on recent messaging. The roles of the CIC, the OPC and the DPC with respect to SS7 network 114 are discussed in greater detail below.

OAP NAS comservice 706 is a communications object or wire line protocol format that is responsible for receipt and delivery of messages from NAS bays 504 and 514. When a message is received from SS7 GW 512, it is handed to OAP task master 710. OAP task master 710 instantiates OAP task slave 712 object or wire line protocol format suitable for the particular type of message. If a call transaction is initiated, OAP task slave 712 requests information concerning the called subscriber from OAP translator 714, and a route to reach the subscriber from OAP router service 718. OAP state 720 is updated to indicate that a call is in progress from the CIC associated with the message. Finally, NAS comservice 706 signals NAS bays 504, 514 to instantiate the route for the call.

When a NAS bay responds with a control message, OAP NAS comservice 706 converts the message into an object or wire line protocol format and passes the object or wire line protocol format to OAP task master 710. OAP task master 710 instantiates a suitable OAP task slave 712. By checking OAP state 720, task slave 720 correlates the message with an earlier received message from OAP SS7 GW application 600, and formulates a response message to be delivered to OAP SS7 GW application 600 through OAP comservice 708.

Maintenance and Monitoring interface (MMI) 722 is a graphical user interface that communicates with either SS7 gateway application 600 or control server application 700 to update the starting configuration or the running state, and to monitor and modify various runtime factors. Such factors may include in-progress calls, circuit supervisory information, circuit deployment and maintenance, and similar activities. OAP router service 718 runs as a query daemon, providing a variety of routing strategies for the distribution of incoming and outgoing calls across the large, redundant network, OAP control server application 700 includes OAP Historian 724.

Figure 8:
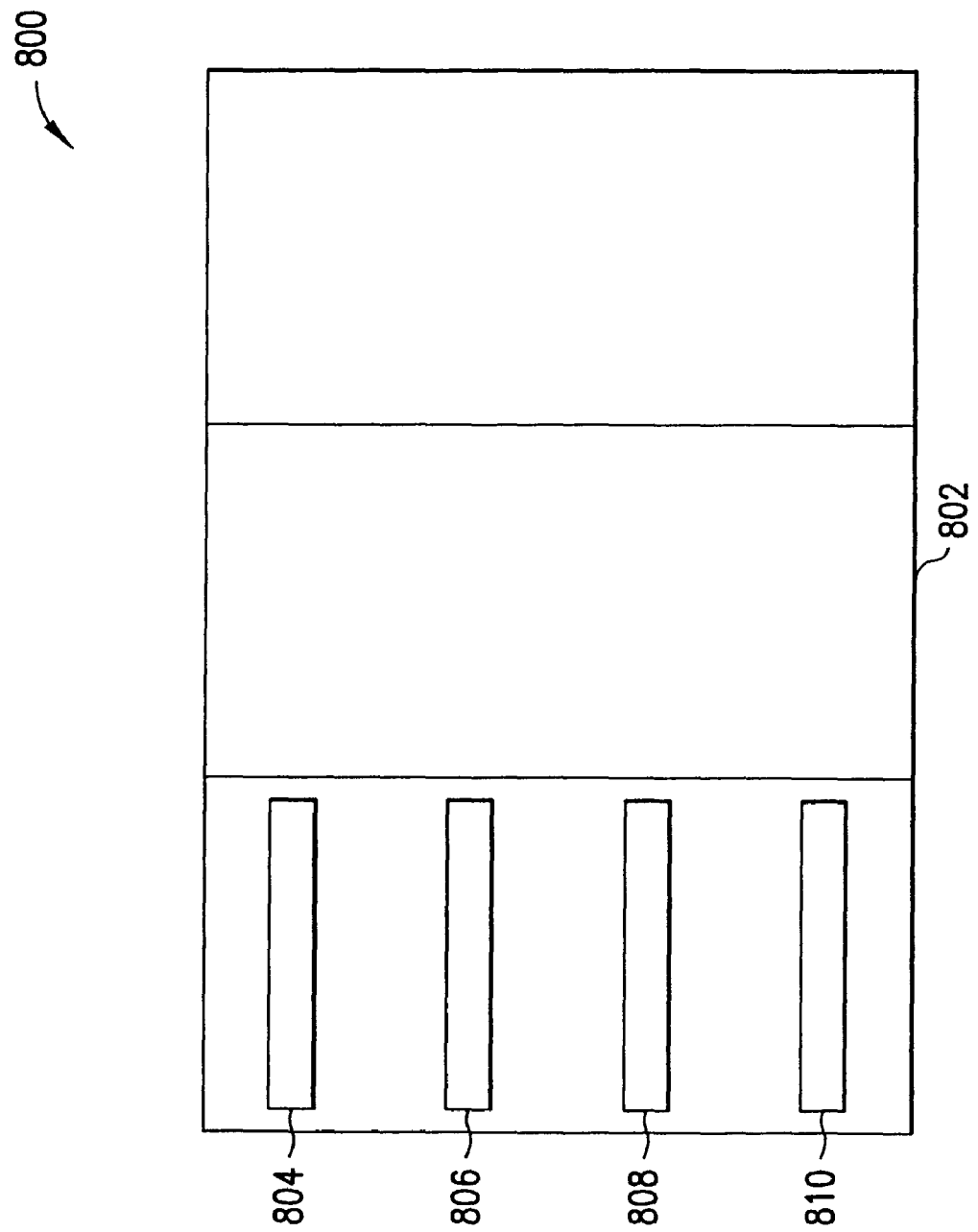
FIG. 8 illustrates an exemplary Network Access Server bay.

FIG. 8 illustrates an exemplary NAS bay 802. NAS bay 802 is a generic view of either tandem NAS bay 504 or modem NAS bay 514. NAS bay 802 includes modules 804, 806, 808, and 810. Each of these modules is a slot card used to implement one or more interfaces with network lines. A line is a set of channels (e.g., a line on a T1 carrier). A channel is a time-slot on a line. Accordingly, each connection established with a NAS bay 802 can be uniquely identified by a module/line/channel identifier. Table 5 provides definitions for NAS bay terms.

TABLE 5

| NAS bay terminology | Definitions |
| --- | --- |
| network access server (NAS) bay | A NAS bay is a facility that houses modules. Lines (having channels) are connected to the modules. Each connection into the bay can be uniquely identified by a module/line/channel identifier. |
| module | Modules are slot cards that receive communication lines, and perform functions on the channels of the lines. Modules can be used to perform time modulation and demodulation, to name a few functions. |
| line | A line is a set of channels (e.g., a line on a T1 carrier) interconnected with modules. |
| channel | A channel is a time-slot on a line. |

Referring back to FIG. 5, tandem NAS bay 504 receives data and voice traffic from the PSTN (i.e., from the EO 104 over connection 404 or from AT 106 over connection 406). Call traffic can also originate from, for example, a CLEC, or other enhanced service provider (ESP), an international gateway or global point-of-presence (GPOP), or an intelligent peripheral. Tandem NAS bay 504 also cross-connects an incoming data call to modem NAS bay 514 through a matrix using time division multiplexing (TDM). This function, of providing pass-through of data, is referred to herein as data bypass.

Modem NAS bay 514 terminates a data call to one of its modems and the modems allow for the device to convert the inbound data call from one protocol to another. In lieu of modem NAS bay 514, any art-recognized devices providing the functions of modulation and demodulation can be used. Examples include a software implementation (an application running on a computer), a modem using a digital signal processor (DSP), or a data service unit/channel service unit (DSU/CSU). In one embodiment, modem NAS bay 514 can provide the modulation/demodulation function, of converting the signal from a first data format used by the telecommunications services provider that provides access to the open architecture platform 402 (e.g., in PPP format) to a second format (e.g., IP data packets) used by a destination data network such as ISP 112. As those skilled in the art will recognize, the particular second format need not be limited to IP data packets, depending primarily on the destination data network. As those skilled in the art will recognize, other protocol formats include a transmission control program, internet protocol (TCP/IP) packet format, a user datagram protocol, internet protocol (UDP/IP) packet format, routing table protocol (RTP) (e.g., Banyan VINES) format, an asynchronous transfer mode (ATM) cell packet format, a serial line interface protocol (SLIP) protocol format, a point-to-point (PPP) protocol format, a point to point tunneling protocol (PPTP) format, a NETBIOS extended user interface (NETBEUI) protocol format, an Appletalk protocol format, a DECNet format, and an internet packet exchange (IPX) protocol format.

In the alternative, a virtual private networking protocol can be used to create a "tunnel" between a remote user (e.g., calling party 102 using a server that supports tunneling) and the destination data network (e.g., ISP 112). One example of a virtual private networking protocol is PPTP.

An exemplary modem NAS bay 514 is an ASCEND access concentrator, model TNT, available from Ascend Communications, Inc., which is analogous to a NAS bay 802 with modems functioning on modules 804, 806, 808, and 810. Those skilled in the art will recognize that the modem function described above is conventionally performed by the destination data networks (e.g., ISP 112), not by an ILEC or a CLEC. In this sense, the present invention simplifies the functions of the destination data network providers, such as ISPs.

It must be noted that it is not necessary to implement the present invention by way of conventional NAS devices. Any network elements providing the dual functions of data bypass (i.e., as provided by tandem NAS bay 504) and conversion of data by means of modem termination into a format usable by a data network (i.e., as provided by modem NAS bay 514) will suffice. Those skilled in the art will recognize that a number of network devices can be combined to provide these functions.

As those skilled in the art will recognize, transmission control protocol (TCP) and internet protocol (IP) (collectively called TCP/IP) form a packet switching protocol comprised of the TCP and IP protocols, which are layers of protocols that act together. IP is a protocol that functions at the network layer of the Open Systems Interconnect (OSI) data network architecture model, and as noted, provides packetizing of data into units also called datagrams, containing address information. TCP is a protocol that functions at the session and transport layers of the OSI data model, providing the separation, transmission, retransmitting, and sequencing of data packets. TCP establishes a connection between two systems intending to exchange data, performing messaging control functions. IP is said to "ride on top of" TCP, i.e., IP is a simpler protocol than TCP in that IP only addresses and sends. TCP breaks a message down into IP packets and uses CHECKSUM error checking logic to guaranty delivery of the message from the first system to the second.

It is important to note that this invention deals with the convergence of voice and data networks. The reader should appreciate that voice networks and data networks were formerly two separate networks. The office classification switching hierarchy discussed above is a voice network architecture and has no correlation to the OSI model which is a data networking architecture.

It is also important to note that open architecture switch 502 can include one or more of gateways 508, one or more tandem network access server (NAS) bays 504 and one or more modem NAS bays 514. Therefore, the number of these elements is not important, so long as their respective functions are met.

FIG. 9A is a more elaborate view of one embodiment of the open architecture platform of the invention. The open architecture platform shown in FIG. 9A is the same as open architecture platform 402 (shown in FIG. 5), except for the additional resources described below.

In FIG. 9A, NAS bay 902 provides both the tandem functions of tandem NAS bay 504 and the modem functions of modem NAS bay 514. In other words, NAS bay 902 will provide the data bypass function of tandem NAS bay 504, as well as the modem termination function of modem NAS bay 514. Voice traffic is transmitted over trunks 930 or 932 to voice switch 506. Voice switch 506 can transmit the voice traffic, for example, over private line 934 to PBX 912.

If the call comprises data traffic, NAS bay 902 will use modems to convert the incoming data call into a form suitable for a destination data network (e.g., PPP data packets) for transmission to other data nodes over open architecture platform 402. For example, the resulting data packets are transmitted over an Ethernet/WAN connection 903 (using an Ethernet/WAN protocol), in conjunction with TCP/IP. It would be apparent to one of skill in the art that alternative network architecture could be used, such as, for example, FDDI, SONET, ATM, etc.

Connection 903 terminates in internal backbone 936. Internal backbone 936 can be any type of data link. Routers 904, 906 route the IP data packets from internal backbone 936 to ISPs 938, 940. Exemplary network routers include network routers from various companies such as, CISCO, 3COM, NETOPIA, and NORTEL, or a host computer running routing software. Specifically, the data packets are transmitted from router 904 to router 908 in ISP 938, and from router 906 to router 910 in ISP 940. Thus, the customers of ISPs 938, 940 can dial into communication servers at the ISP location, which have dedicated routers 908, 910. Thus, ISPs 938, 940 can route data traffic to routers on open architecture platform 402.

In one embodiment, ISP 948 can use a network service provider (NSP) to provide a modem pool for use by the customers of ISP 948. A CLEC implementing open architecture platform 402 can comprise an NSP. Modems in NAS bay 902 can be used by subscribers of ISPs 938, 940 and 948 for interconnectivity, and traffic can also be routed to other network nodes via the routers. Modem pooling at the NSP level reduces capital expenditures by ISPs 938, 940, 948.

The invention enables network access point (NAP) switching which involves exchanging data traffic on the architecture. A NAP switches the call based on routing instructions it receives. Online services can be performed so-called "on the box."

NAS bay 942 can be the same type of device as NAS bay 902, in that it provides both the tandem functions of tandem NAS bay 504, and the modem functions of modem NAS bay 514. NAS bay 942 is used to represent other connections that can be established with open architecture platform 402.

Calling party 914 is another party that can establish a data connection using a modem connected to a host computer. However, calling party 914, via its host computer, has the additional feature of providing voice over IP (VOIP) service over communications link 944.

PBX 916 is a centralized switch providing its collocated customers both switching and access to NAS bay 942. This access is provided over T1/ISDN PRI private line 946.

It is possible to access open architecture platform 402 using any type of digital subscriber line (DSL) connection. Calling party 924 and computer 922 access NAS bay 942 over a high bit rate DSL (HDSL), known as a single pair HDSL (SDSL) 920. HDSL can place a two-way T1 on a normal unshielded, bridged (but not loaded) twisted pair copper wire loop 982. In an embodiment of SDSL, an existing single pair copper wire on the local loop is used to transmit full duplex data at up to 768 Kbps. Transmission at 1.54 Mbps is achieved by using two SDSL lines, i.e., two pairs of wires.

SDSL 920 permits simultaneous voice and data transmission through a DSL device 918 (e.g., a splitter), which can be collocated with calling party 924 and computer 922. Alternatively, access can be obtained without a splitter device. In addition, calling party 924 and computer 922 can access NAS bay 942 over ISDN DSL (IDSL) link 926. In an embodiment of IDSL, an existing local loop, i.e., a single pair of copper wires, is used to transmit full duplex data at 128 Kbps. Alternatively, calling party 924 and computer 922 can access NAS bay 942 over xDSL 928. In an embodiment of xDSL, an existing local loop, i.e., a single pair of copper wires, is used to transmit digital subscriber line communications.

In one embodiment of the invention, a CLEC implementing open architecture platform 402 can accept data traffic from other CLECs or ILECs, providing data bypass for the egress leg of data calls. In such an embodiment, the implementing CLEC can charge back the other CLECs or ILECs an "unbundled element" for providing this service to the egress facilities involved (i.e., the egress EOs belonging to the ILECs or used by the other CLECs'). It is important to note that reciprocal compensation does not exist everywhere and other arrangements do exist. While this is the predominant arrangement, this is not necessarily the only arrangement. This approach, of having an NSP/CLEC charge back an ILEC or other CLEC for offloading of data traffic, can save the offloaded CLEC or ILEC significant capital expenditures related to the switching of data traffic.

Voice traffic is transmitted over trunks 930 or 932 to voice switch 506. Voice switch 506 can transmit the voice traffic, for example, over private line 934 to PBX 912.

2. Data Bypass Operations{TC\l3"}

Figure 10A:
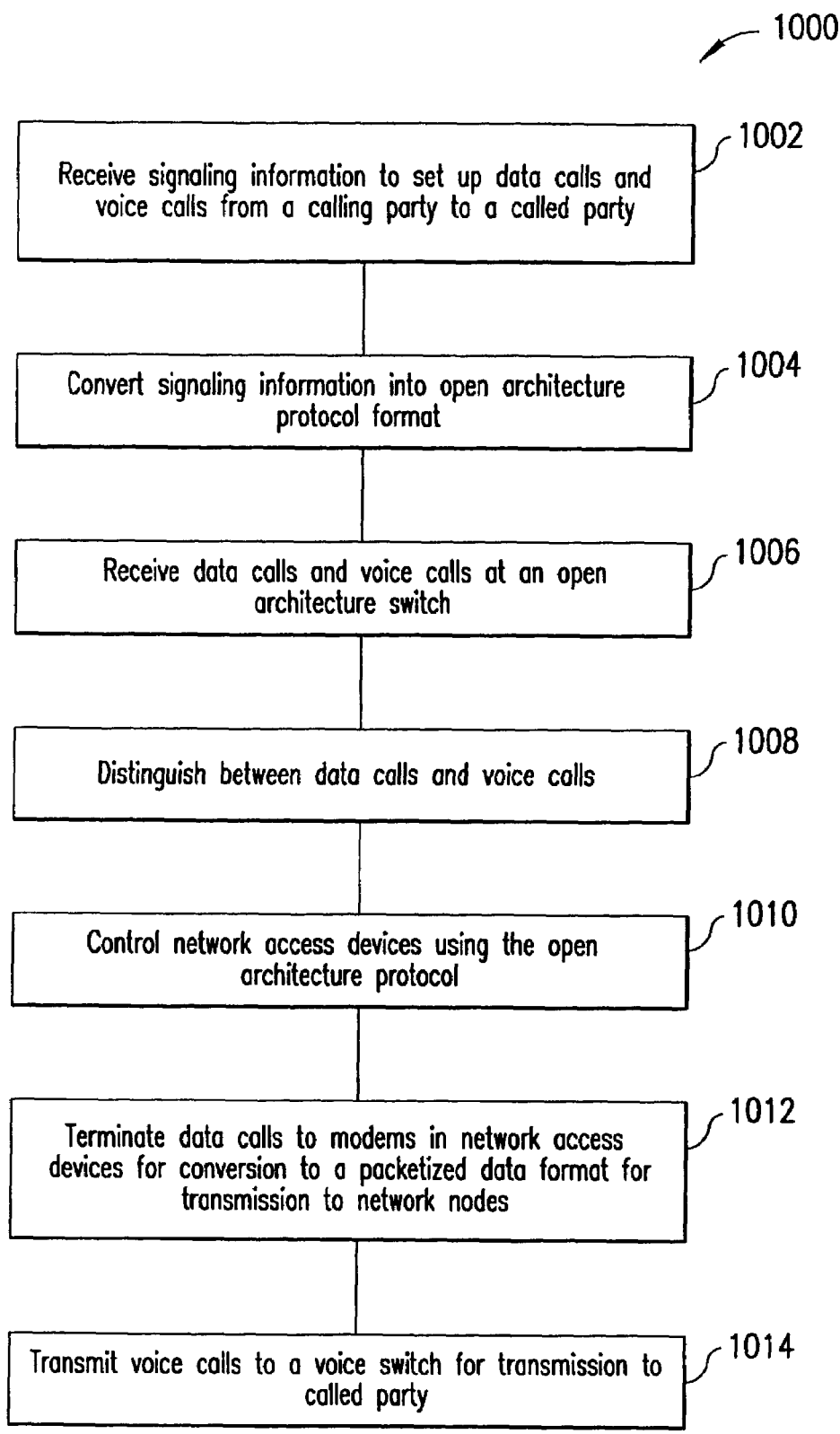
FIGS. 10A, 10B and 10C, are flow charts illustrating how an originating caller gains access to an open architecture platform.
Figure 10B:
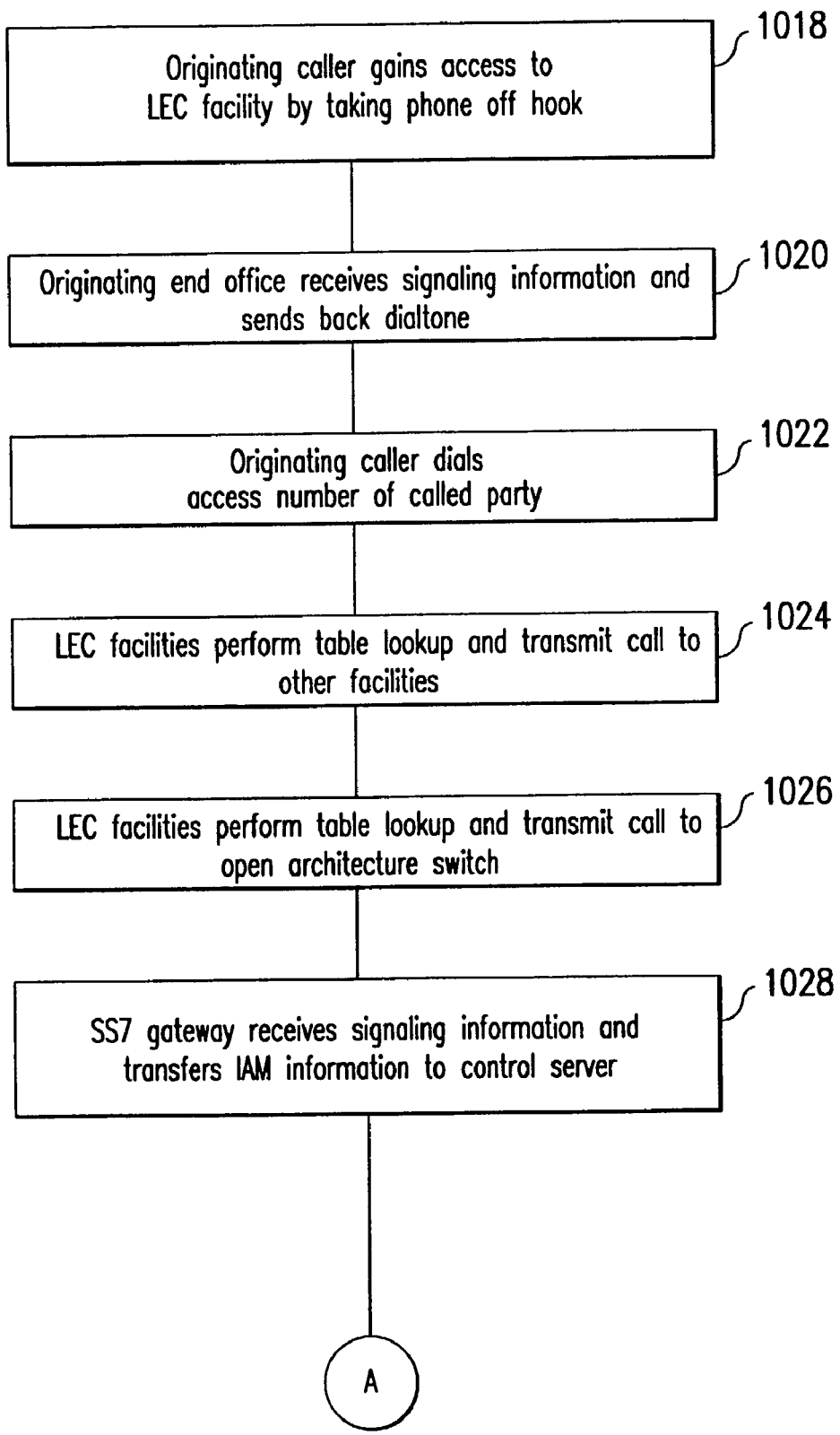

FIGS. 10A–10B depict flow charts illustrating how an originating caller gains access to open architecture platform 402. FIGS. 10A–10B are described with reference to FIGS. 1, 4, 5 and 9.

FIG. 10A depicts a method 1000 for receiving an inbound call which bypasses the facilities of an egress switch according to the present invention. Alternatively, other call flows are possible, including a call requiring a modem calling back for security reasons, using outbound calling from open architecture platform 402.

In step 1002 of FIG. 10A, the technique receives signaling information to set up data calls and voice calls from a calling party to a called party. In step 1004, the technique converts the signaling information into an open architecture protocol format. In step 1006, data calls and voice calls are received at open architecture switch 502. In step 1008, the technique distinguishes between data calls and voice calls. In step 1010, the technique controls NASs, i.e., NAS bays 504 and 514, using the open architecture protocol. In step 1012, the method terminates data calls to modems in a modem NAS bay, e.g., in modem NAS 514, for conversion to a packetized data format for transmission to network nodes. Alternatively, in step 1012, a tunnel is established between the user and the destination data network. In step 1014, the method transmits voice calls to a voice switch for transmission to the called party.

Figure 10C:
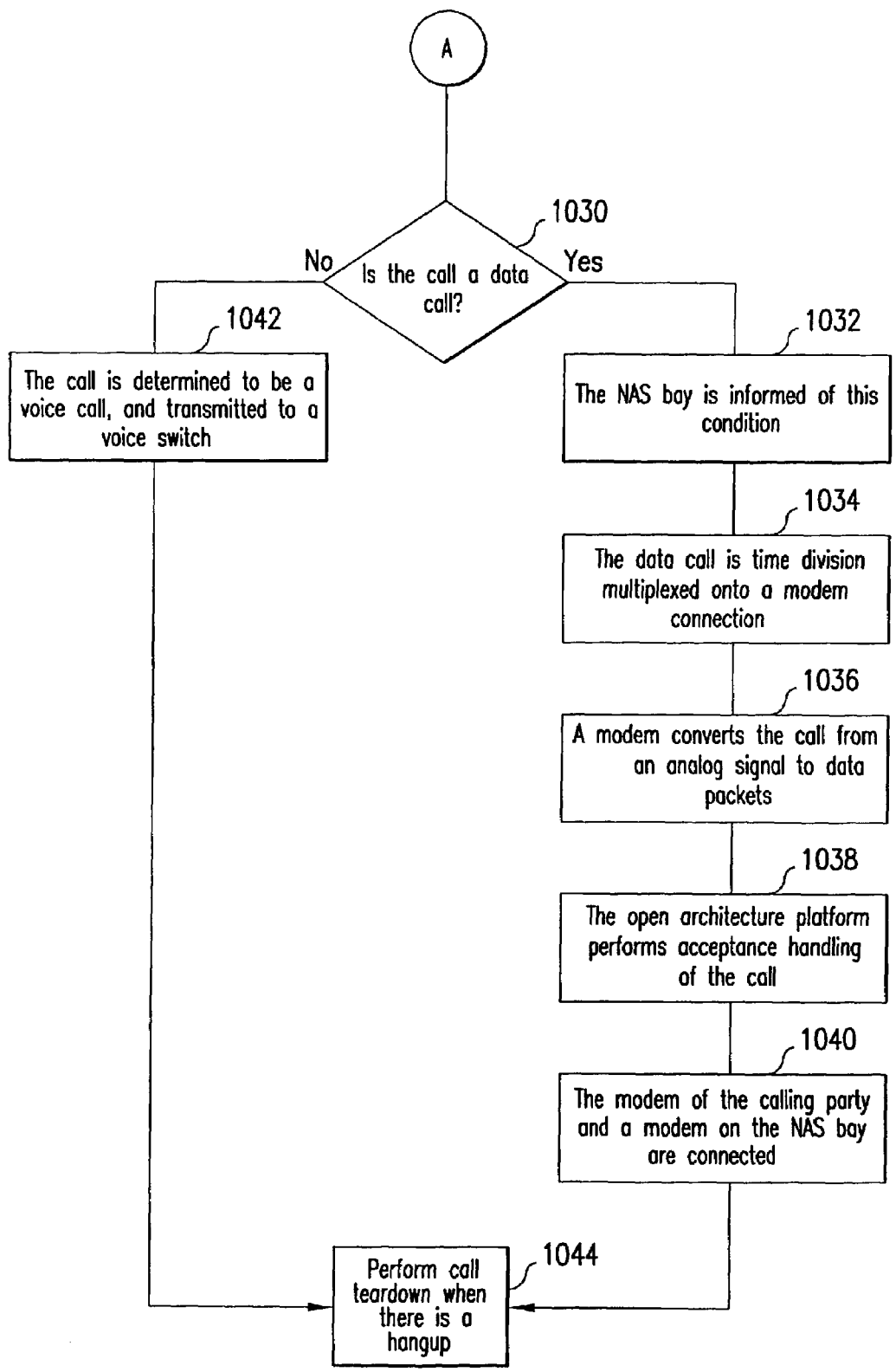

FIGS. 10B and 10C depict more detailed description of the technique outlined in FIG. 10A. Specifically, these figures depict an inbound call flow into open architecture platform 402. An inbound call is where an incoming call (into the open architecture platform) is connected to a called party (for a voice connection) or an ISP (for a data connection).

Referring to FIG. 10B, in step 1018 an originating caller 102 (shown in FIG. 1) gains access to LEC facilities. This is performed according to known methods as described with respect to FIG. 1. As one example, originating caller 102, using a telephone, can go off-hook to place a switched voice call to the LEC facilities. As another example, calling party 102 can use a host computer, in concert with a modem, to establish a data connection with the LEC facilities (i.e., the modem of calling party 102 takes the line off-hook). As those skilled in the art will recognize, any of the access methods described with respect to FIG. 9A, in addition to other known methods, can be used to access the LEC facilities.

In step 1020, signaling information for the call is received by the homed EO, the originating EO, indicating that calling party 102 is attempting to make a call. As noted, the homed EO, often referred to as a central office CO, is the EO having a direct connection with the originating caller. (This is true for voice calls and for data calls.) In FIG. 1, the homed EO is ingress EO 104. Conventionally, for this leg of the call, i.e., between the telephone or modem of calling party 102 and EO 104, the LEC uses in-band signaling implemented with pulse or tone dialing. The homed EO then sends back a dial tone to calling party 102.

In step 1022, the originating caller, calling party 102, hears a dial tone and dials a telephone number to access the open architecture platform 402. The dialed number, for example, in the currently used domestic US 10-digit standard NPA-NXX-XXXX format (i.e., Europe, for example, has a different 32 digit standard), can be the telephone number of called party 110, or a number used to access an ISP which can be virtually mapped to a table of terminating points.

In step 1024, the LEC facilities perform a table lookup and then transmit the call to a facility (e.g., a class 4 AT switch or a class 5 EO switch) that is connected to open architecture platform 402. First, EO 104 will look up the dialed number in translation tables (external to the EO) which will indicate which switch of the LEC facility is to receive the call. Next, EO 104 will transmit appropriate signaling information to transmit the call along a path to that facility.

It should be noted that if the regulatory environment were to change as to permit CLECs or other interconnecting parties to access originating office triggers from ILECs, then it would be possible to route the call traffic differently.

It should be noted that this step is optional, because it is possible that EO 104 (the homed EO) provides a direct connection with open architecture platform 402. It is also possible that calling party 102 will have a connection to a network node or system (e.g. an intelligent peripheral, a GPOP, etc.) that is not an EO or AT switch, which will provide a direct connection to open architecture platform 402. It is also possible that the homed EO will provide a connection to another type of network device (i.e., not an EO or an AT) that will, in turn, provide a direct connection to open architecture platform 402.

The leg of the call described in step 1024 can be connected using in-band signaling or out-of-band signaling. (The same is true for the legs of the call following this leg.) In one embodiment, SS7 signaling is used to terminate the call to the facility providing access to the open architecture platform 402. Referring to FIG. 4 or FIG. 9A, AT 106 and EO 104 are, for example, facilities providing access to open architecture platform 402. Alternatively, these facilities could include, for example, a CLEC, or other enhanced service provider (ESP), an international gateway or global point-of-presence (GPOP), or an intelligent peripheral.

With SS7 signaling, the ISDN User Part (ISUP) protocol can be used. ISUP features numerous messages that are transmitted within the SS7 network, which are used to establish call set up and call teardown. In the present case, an initial address message (IAM) is sent to AT 106 or EO 104. Of course, AT 106 can also be, for example, a CLEC, or other enhanced service provider (ESP), an international gateway or global point-of-presence (GPOP), or an intelligent peripheral. The IAM can include such information as the calling party number (i.e., the telephone number of calling party 102, although the IAM doesn't necessarily contain calling party, especially in local environment), the called party number (i.e., the telephone number dialed by calling party 102), the origination point code (OPC), the destination point code (DPC), and the circuit identification code (CIC). (The OPC, DPC and CIC were discussed above with respect to FIG. 7). The OPC identifies the switch from which the call is to be transmitted on the present leg of the call, which in this case is homed EO 104. The DPC identifies the switch to which the present leg of the call is to be routed. Taking the example of a call that is connected to open architecture platform 402 by AT 106, the SS7 signaling will transmit the call from EO 104 to AT 106. The CIC identifies the bearer channel over which the call is coming in to AT 106 from EO 104. Each AT 106 looks at the called number and then does its own routing, by reviewing the contents of the IAM and determining the next switch to send the call to, by setting the next DPC in order to continue routing the call.

It should be noted that ISUP messages are transmitted from signaling point to signaling point in the SS7 network in the above-noted manner, until the signaling is completed to a destination switch, node or trunk (i.e., at a called party). For example, it is possible that once the call is sent to homed EO 104, it is sent to intermediate switches (i.e., other EOs and ATs) before it arrives at AT 106. In this case, each switch along the path of the call will create an IAM with information reflecting the next leg of the call. For each leg, the OPC and DPC are modified, and the receiving switch looks for the call in the bearer channel specified by the CIC which is included in the IAM.

In step 1026, the LEC facilities perform a table lookup and then transmit the call to open architecture switch 502. AT 106 creates an IAM. This IAM can include the calling party's number (if available), the called party's number, the point code of AT106 as the OPC, the point code of the open architecture switch 502 as the DPC, and the CIC representing the bearer channel over link 406 containing the call. The IAM is sent to the SS7 GW 512, presenting the call on a bearer channel represented by another CIC over link 406 to tandem NAS bay 504 (a bearer channel interface).

In step 1028, SS7 GW 512 receives signaling information in the IAM message from SS7 network 114, and delivers the information to control server 510. SS7 GW 512 has multiple physical A-link interfaces into the SS7 network (i.e. preferably one which supports international as well as US Domestic SS7 signaling) over which signaling data is received. In a preferred embodiment, SS7 GW 512 functionality is implemented as an application executing on a SUN Microsystems workstation model 450, for example, available from Sun Microsystems, Inc. using an SS7 adapter from, for example, DGM&S model Omni 5.0 SignalWare, available from DGM&S Telecom, Mount Laurel, N.J. In this preferred embodiment, SS7 GW 512 and control server 510 are applications in communication with one another, running on one or more such interconnected host computers. As noted, FIGS. 6 and 7 illustrate one example embodiment.

Referring to FIGS. 6 and 7, these applications are symbolically represented as OAP SS7 GW application 600 and OAP control server application 700. The communications between SS7 GW 512 and control server 510, which together comprise GW 508, were specifically described with respect to these figures. SS7 GW 512 parses the IAM message, providing the OPC, DPC, calling party number and called party number, inter alia, to control server 510.

SS7 GW 512 also functions as a protocol state machine for each ISUP SS7 circuit. In this respect, SS7 GW 512 holds a protocol state machine for each call that is in process. If SS7 GW 512 does not get a response from control server 510 within a certain timeout period, then it sends a default response out to the SS7 network, which is in the present case a release (REL) message. The REL message indicates to homed EO 104 (i.e., via its SSP portion) that the call is to be released because a timeout occurred. SS7 GW 512 does not necessarily perform the routing itself, but rather communicates with the control server 510 which controls the routing functions.

Referring to FIG. 10C, in step 1030, the control server must determine whether the call is a data call or a voice call to take appropriate actions. Control server 510 looks up the called party number in internal or external database 516 to determine whether the call is a data call or a voice call. Based on the type of call, control server 510 indicates to control facilities (associated with tandem NAS bay 504) how to route the traffic.

Control server 510 communicates with the control facilities in tandem NAS bay 504 via the open architecture protocol. The control messages comprising the protocol are defined in Table 6 generically and in Tables 7–20 in detail. The flows of the control messages, between GW 508 (primarily referring to control server 510 in GW 508) and tandem NAS bay 504 (primarily referring to control facilities in tandem NAS bay 504) are provided in Tables 22–38. For an even more detailed view of these flows, the reader is referred to FIG. 11, which illustrates the control facilities of tandem NAS bay 504 (including protocol control 1102, call control 1106 and resource management 1104) and GW 508, as well as FIGS. 13–18B, which provide detailed views of the selected flows.

If control server 510 determines the call is a data call, in step 1032, it sends a message to the control facilities of tandem NAS bay 504 indicating this condition. The tandem NAS bay sends back an acknowledgment. Table 27 illustrates an example message flow for this step.

In step 1034, a data call over a given bearer channel (e.g., a DS0channel) is time division multiplexed by tandem NAS bay 504 for termination at particular modems. The data call arriving over a given bearer channel on connection 406 (from AT 106) is assigned to a module on modem NAS bay 514. In other words, the incoming bearer channel is assigned to a given bay/module/line/channel (BMLC) going into modem NAS bay 514 to a terminating point. Table 32 illustrates an example message flow for this step.

In step 1036, a modem performs the conversion (i.e., a modem in modem NAS bay 514 converts the call from one form into a form suitable for a destination data network.) For example, the call can be converted from one type of data signal (e.g., a PPP data signal) into another form of data, such as packets (e.g., IP data packets) for routing to another point such as an ISP. As noted, alternatively, a tunnel can be established between the originating caller and the destination data network. Here, a virtual private network, to which the originating caller 102 is connected, is extended to the data network.

Step 1038 is the acceptance of the data call by the platform. As illustrated in Table 26, a message is sent from the control facilities of tandem NAS bay 504 to control server 510, indicating the inbound call is accepted by open architecture platform 402. Control server 510 then indicates an accepted data connection to SS7 GW 512, which in turn sends an address complete (ACM) message out over SS7 network 114. When homed EO 104 is made aware of this condition, it plays a ringing signal for calling party 102, or more specifically, to the modem used by calling party 102. This indicates a connection is about to be established with a modem.

In step 1040, the call is connected between a modem on modem NAS bay 514 and the modem of calling party 102. As illustrated in Table 27, a message is sent from the control facilities of tandem NAS bay 504 to control server 510, indicating that the inbound call is connected. Control server 510 then indicates a connection indication to SS7 GW 512, which in turn sends an answer (ANM) message over SS7 network 114. The modem of called party 102 then negotiates with a modem of modem NAS bay 514. Here, the name and password of the calling party are verified by the modem of modem NAS bay 514 via a radius server. The radius server authenticates the call, and assigns an IP address from the modem NAS bay 514, using the dialed number. The call is routed between calling party 102 and another point, such as, an ISP as described with respect to FIG. 9A.

If in step 1030 it is determined that the call is a voice call, the call is transmitted to a voice switch in step 1042. In this case, control server 510 will communicate to tandem NAS bay 504 to transmit the call to voice switch 506. Voice switch 506 will, in turn, use SS7 signaling (via SS7 signaling network 114) to place the call to a called party 110. Voice traffic is handled in a conventional manner. In a preferred embodiment, a NORTEL DMS switch, model DMS 500, available from NORTEL, Richardson, Tex., is used for switching of voice traffic.

In step 1044, call teardown occurs. For voice traffic effected between calling party 102 and called party 110, teardown occurs using SS7 signaling in a known manner.

For teardown of a data call, in a typical scenario, calling party 102 initiates the procedure by disconnecting the modem connection. Homed EO 104 sends a release (REL) message, which is transmitted over the SS7 signaling network 114 to SS7 GW 512. SS7 GW 512 informs control server 510 of the condition. As illustrated in Table 34, control server 510 sends a message to the control facilities of tandem NAS bay 504 to release the call, which sends back an acknowledgment once the call is released.

It should be noted that the functions of SS7 GW 512, control server 510 and the NAS bays can all be contained in one collocated system. Many advantages can be achieved, however, by placing this functionality in several devices which can be collocated or placed in geographically diverse locations. For example, FIG. 9B depicts SS7 GWs 512*a*, 512*b*, and 512*c*, connected by multiple links (e.g., A–F links) to SS7 network 114. SS7 GWs 512*a*–512*c* and CSs 510*a*, 510*b*, and 510*c*, databases 516*a*, and 516*b*, NASs 902*a*, 902*b*, 902*c*, and 902*d*, and internal backbone 936, can be collocated or geographically diverse. In a preferred embodiment, for high availability, multiple redundant connections can connect redundant platform resources.

It should also be noted that the above-noted steps need not be performed in sequential order. Those skilled in the art will recognize this fact.

It would be apparent to a person having skill in the art that the above is only one implementation of the technology and that multiple implementations are possible. The reader is referred to the following tables and FIGS. 11–18B for a more detailed perspective.

3. NAS Bay to GW Communications{TC\l3"}

Figure 11:
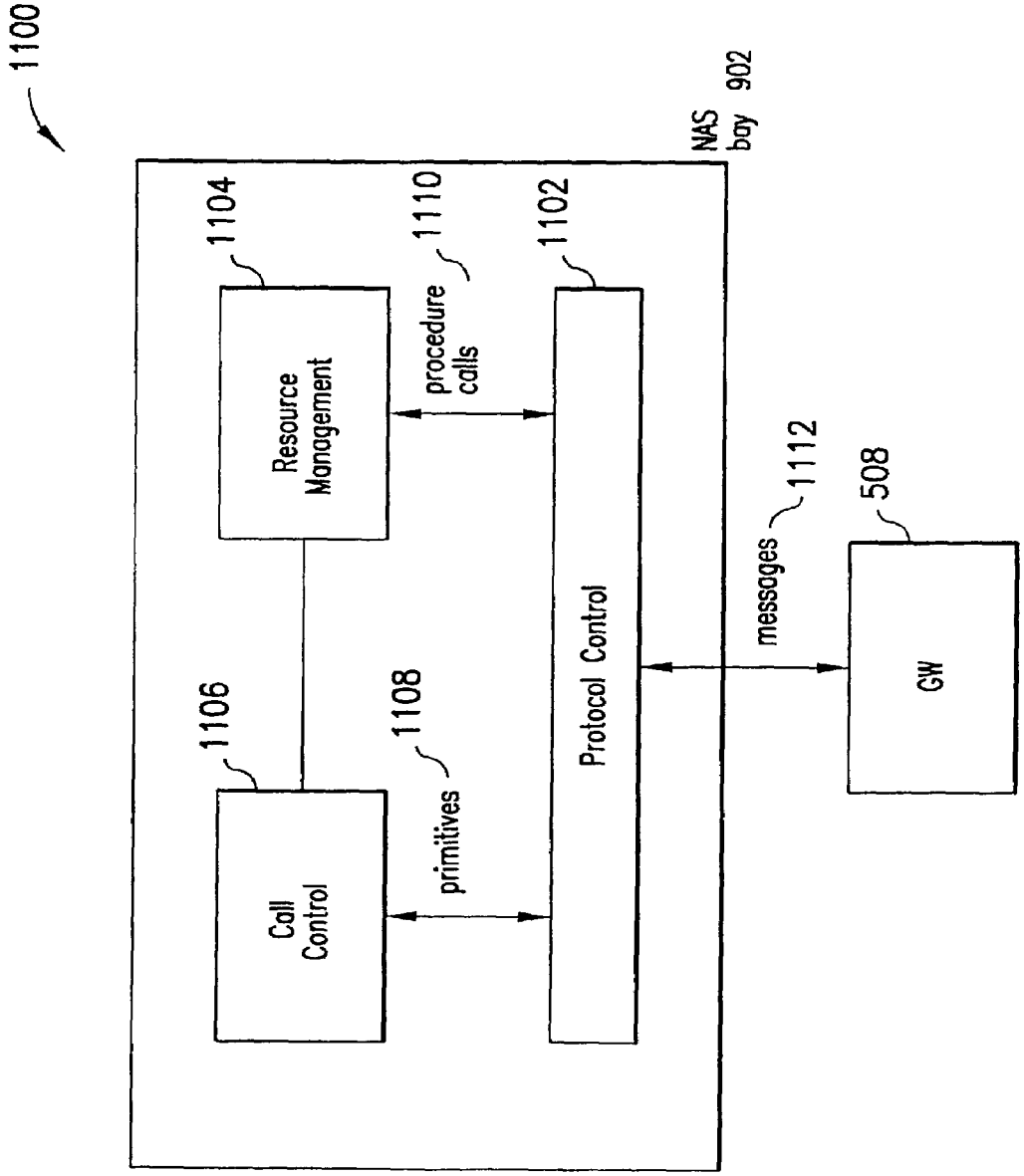
FIG. 11 is a flow chart describing how the open architecture platform handles an inbound call.

FIG. 11 is a block diagram illustrating the functional components of NAS bay 902, and how these components communicate with GW 508. In this more detailed view, NAS bay 902 includes protocol control application 1102, call control application 1106 and resource management application 1104. Protocol control application 1102 communicates with call control application 1106 by transmission of primitives. Protocol control application 1102 communicates with resource management application 1104 by the execution of procedure calls. GW 508 communicates with NAS bay 902 by the transmission of control messages. These control messages, implemented using the open architecture platform protocol, are described in detail in the sections below.

Figure 12:
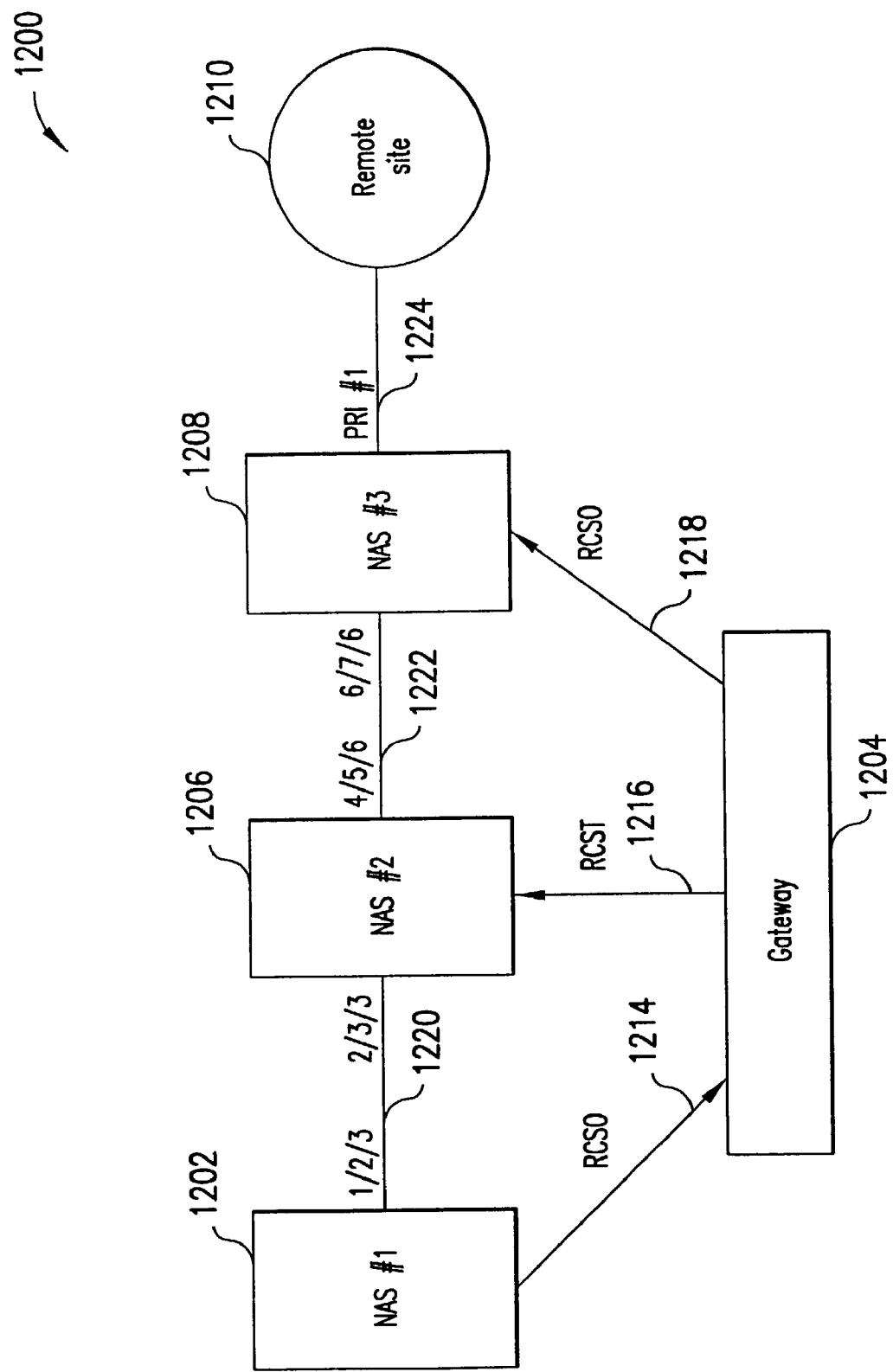
FIG. 12 is a block diagram illustrating a complex outbound call.

FIG. 12 illustrates a diagram used to show how complex outbound calls are handled. In these calls, a plurality of NAS bays are involved. Table 35 provides a description that is to be used in concert with FIG. 12.

FIGS. 13–18 provide a series of detailed flow charts (i.e., state diagrams) describing the communications flows between the subcomponents of NAS bay 902 (including protocol control application 1102, call control application 1106 and resource management application 1104) and GW 508. The state diagrams represent the state of protocol control application 1102 through several processes. The flow charts are exemplary and not exhaustive.

Figure 13:
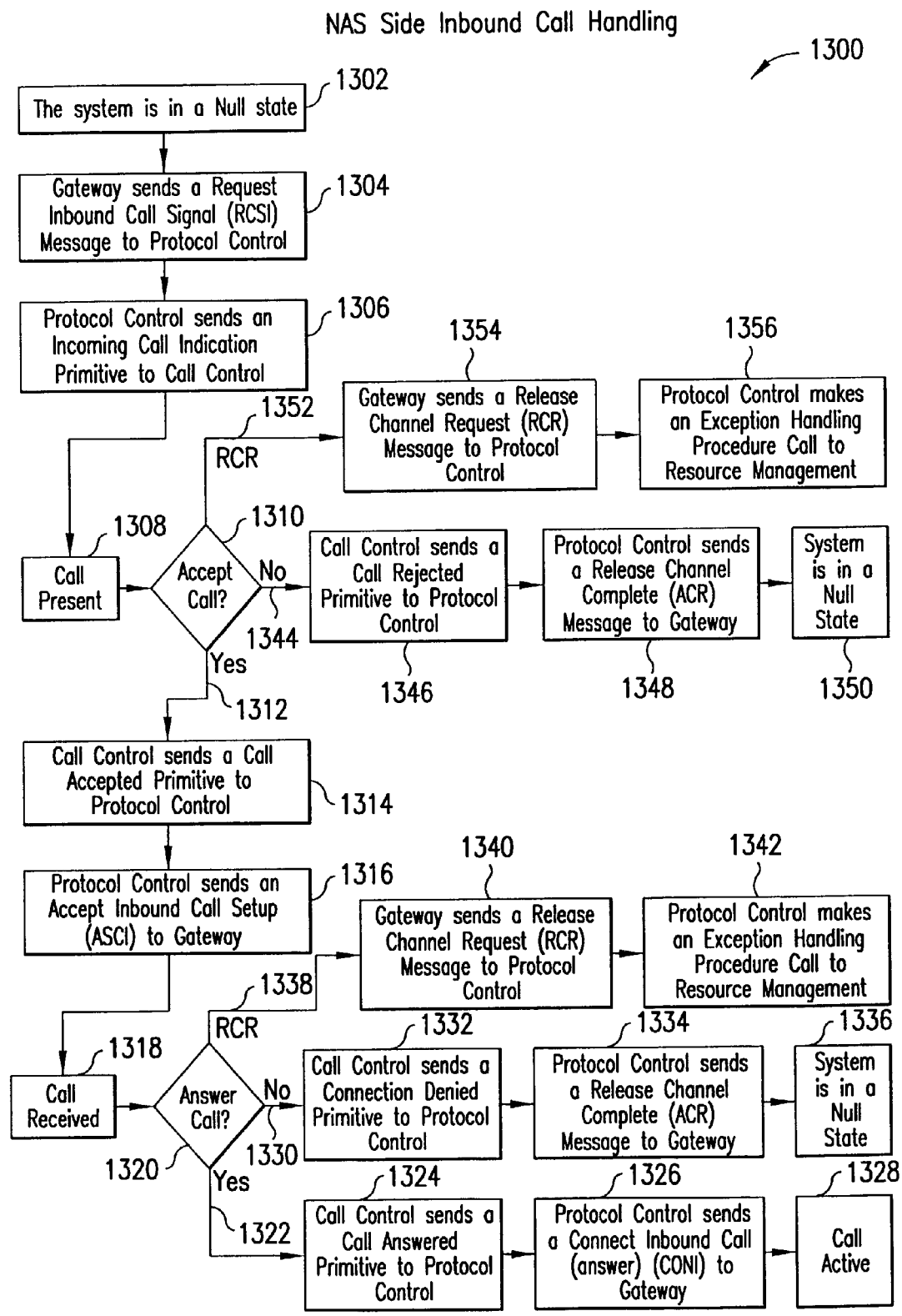
FIG. 13 is a state diagram illustrating NAS side inbound call handling on the open architecture platform of the present invention.

FIG. 13 depicts an inbound call handling (NAS Side) 1300 state diagram detailing the states of protocol control 1102 during receipt of an inbound call. Steps 1302 through 1356 outline in detail the state flow of protocol control 1102 during the call.

Figure 14A:
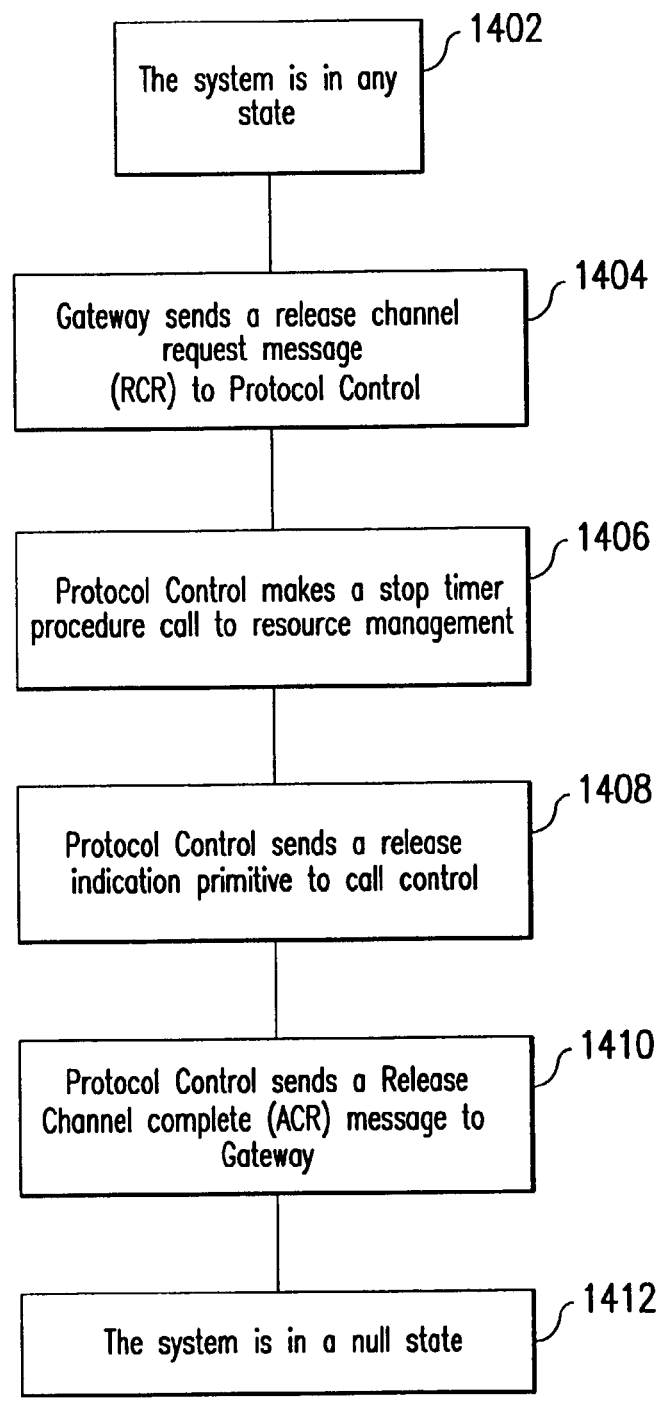
FIGS. 14A and 14B are flow charts illustrating a state diagram of NAS side exception handling.
Figure 14B:
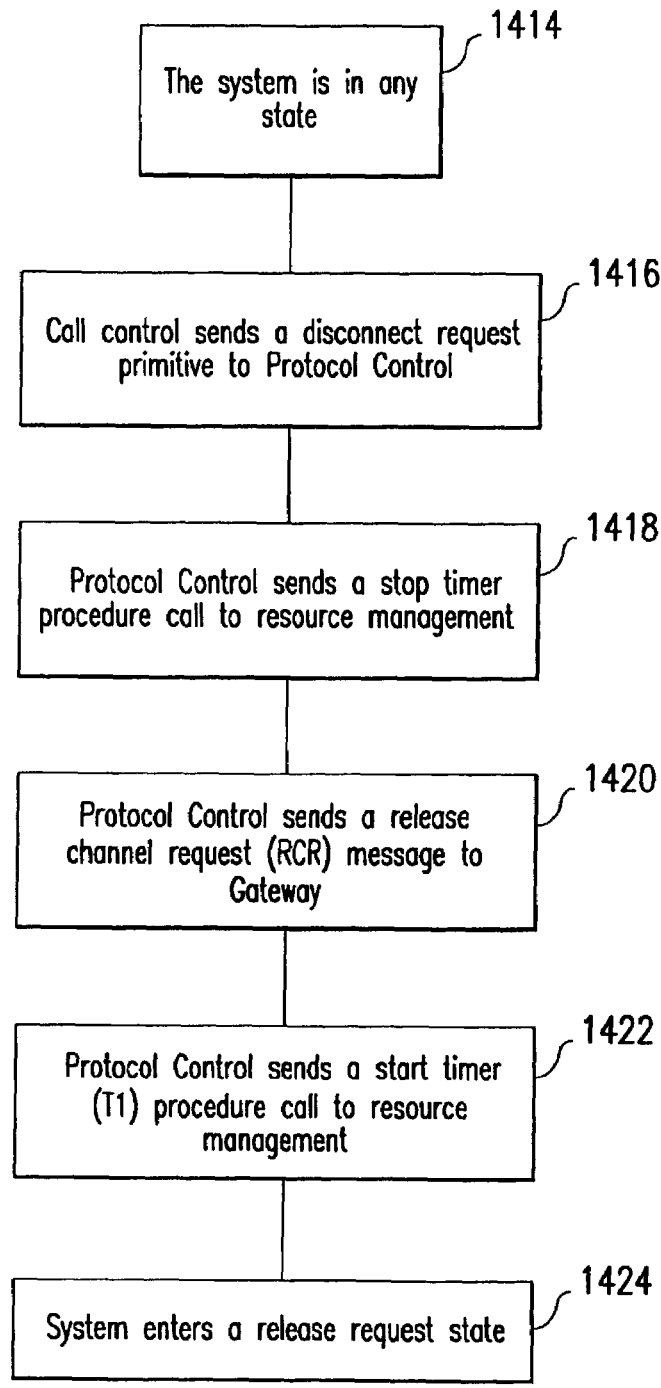

FIGS. 14A and 14B depict NAS side exception handling 1400 state diagrams detailing the states of protocol control 1102 during exception handling. Steps 1402 through 1424 outline in detail the state flow of protocol control 1102 during exception handling.

Figure 15:
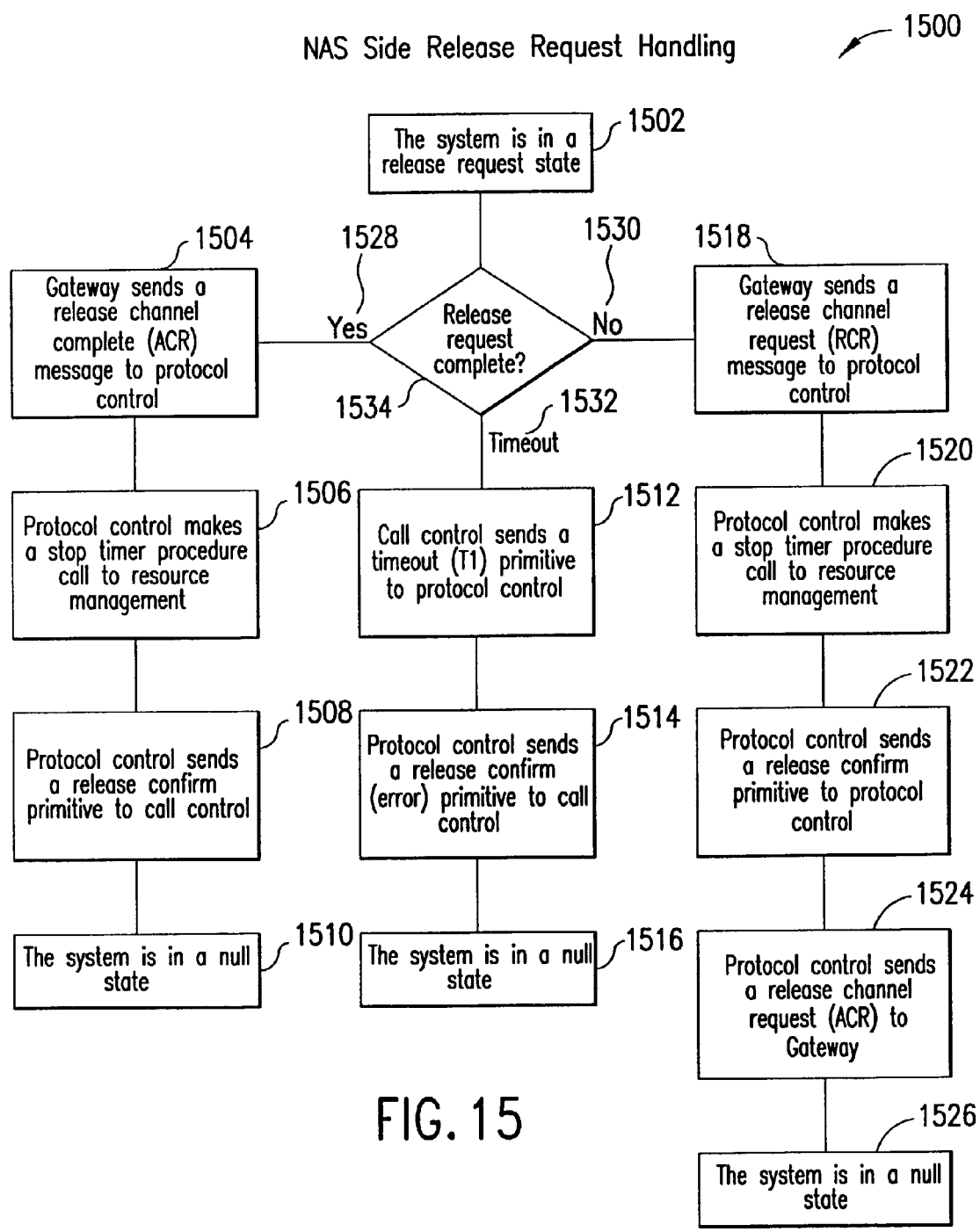
FIG. 15 is a state diagram illustrating NAS side release request handling.

FIG. 15 depicts a NAS side release request handling 1500 state diagram detailing the states of protocol control 1102 during the process of a release request. Steps 1502 through 1526 outline in detail the state flow of protocol control 1102 during the release request.

Figure 16:
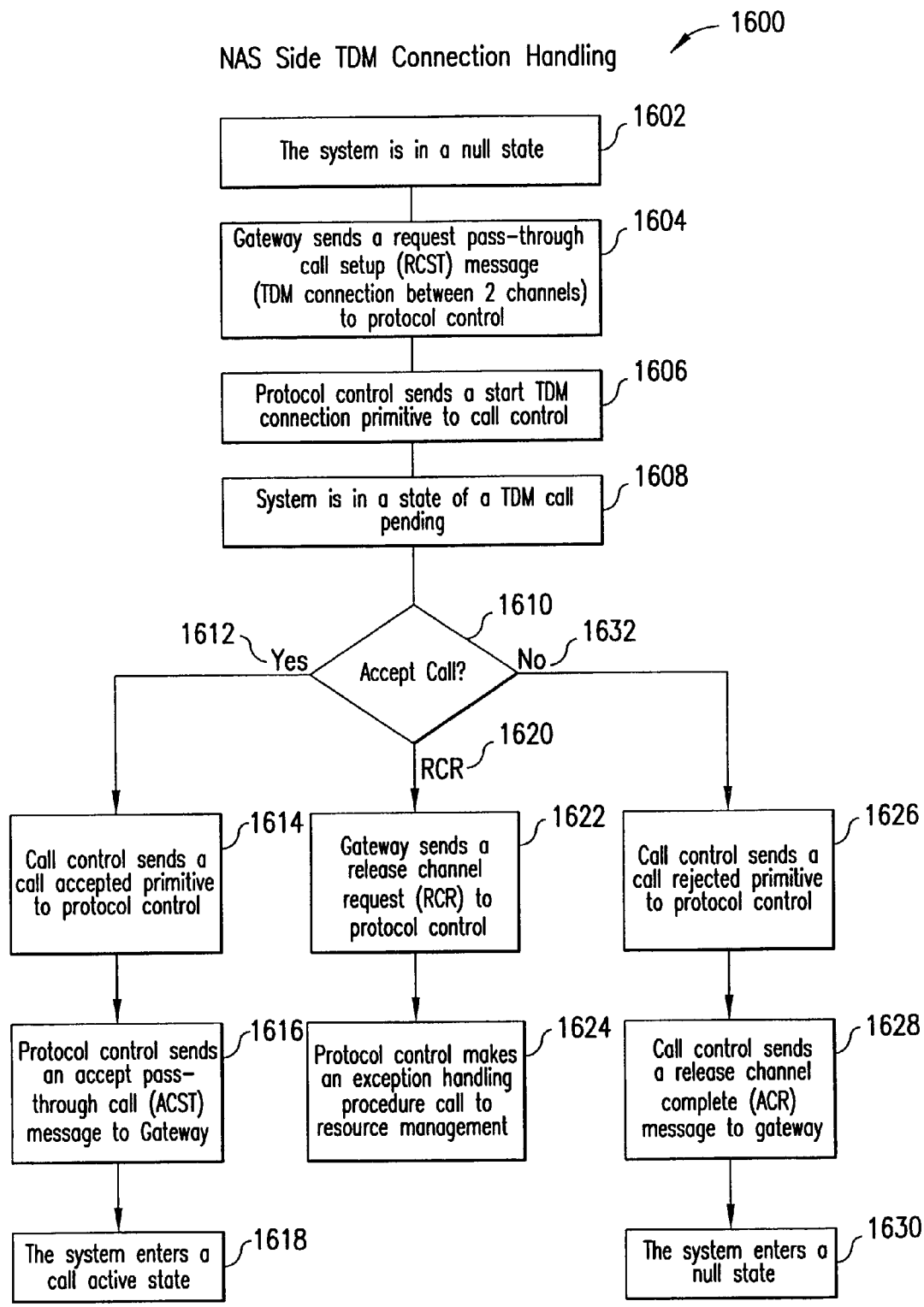
FIG. 16 is a state diagram illustrating NAS side release TDM connection handling.

FIG. 16 depicts a NAS Side TDM connection handling 1600 state diagram detailing the states of protocol control 1102 during the receipt of a TDM call. Steps 1602 through 1630 outline in detail the state flow of protocol control 1102 during the TDM call.

Figure 17A:
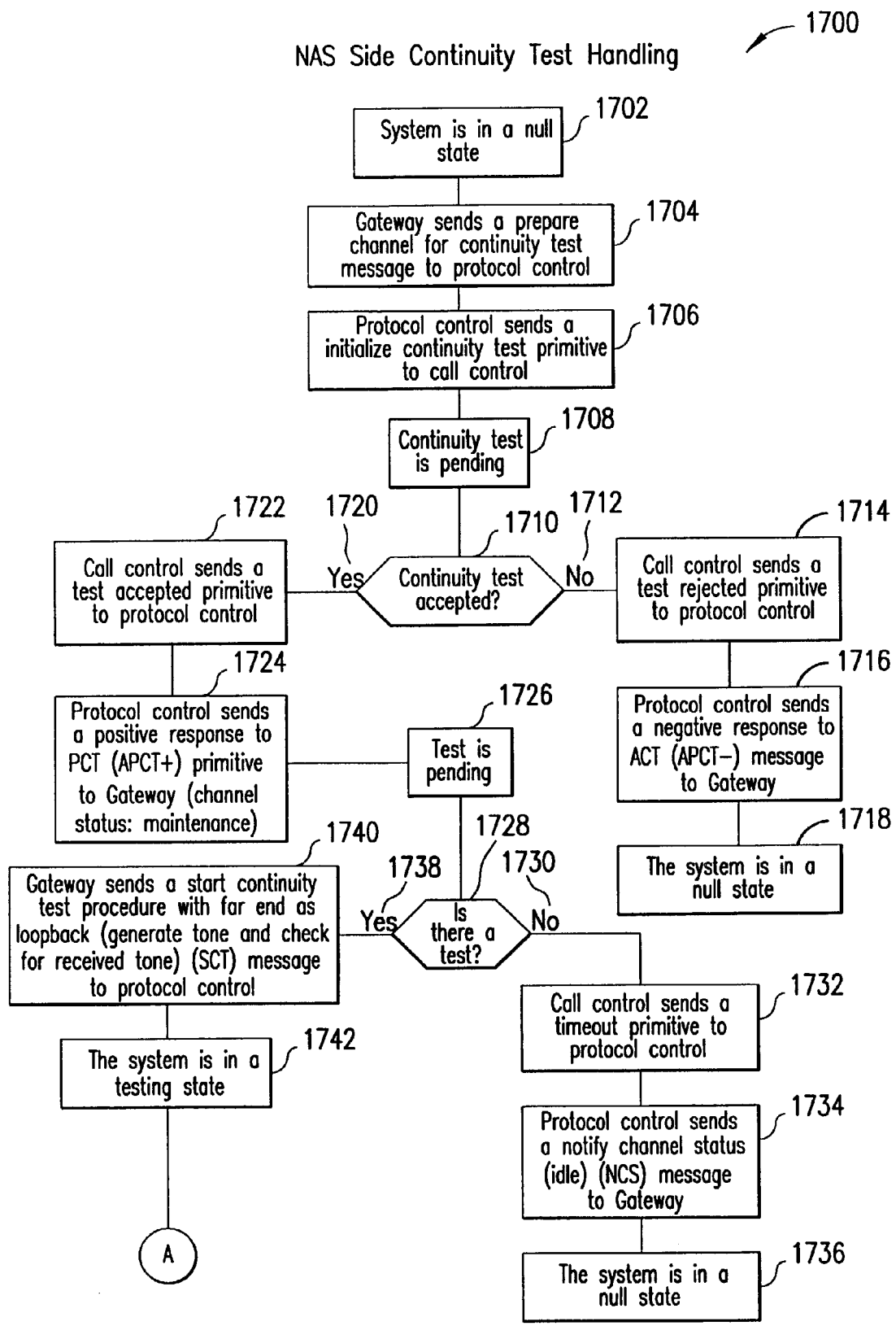
FIGS. 17A and 17B are state diagrams illustrating NAS side continuity test handling.
Figure 17B:
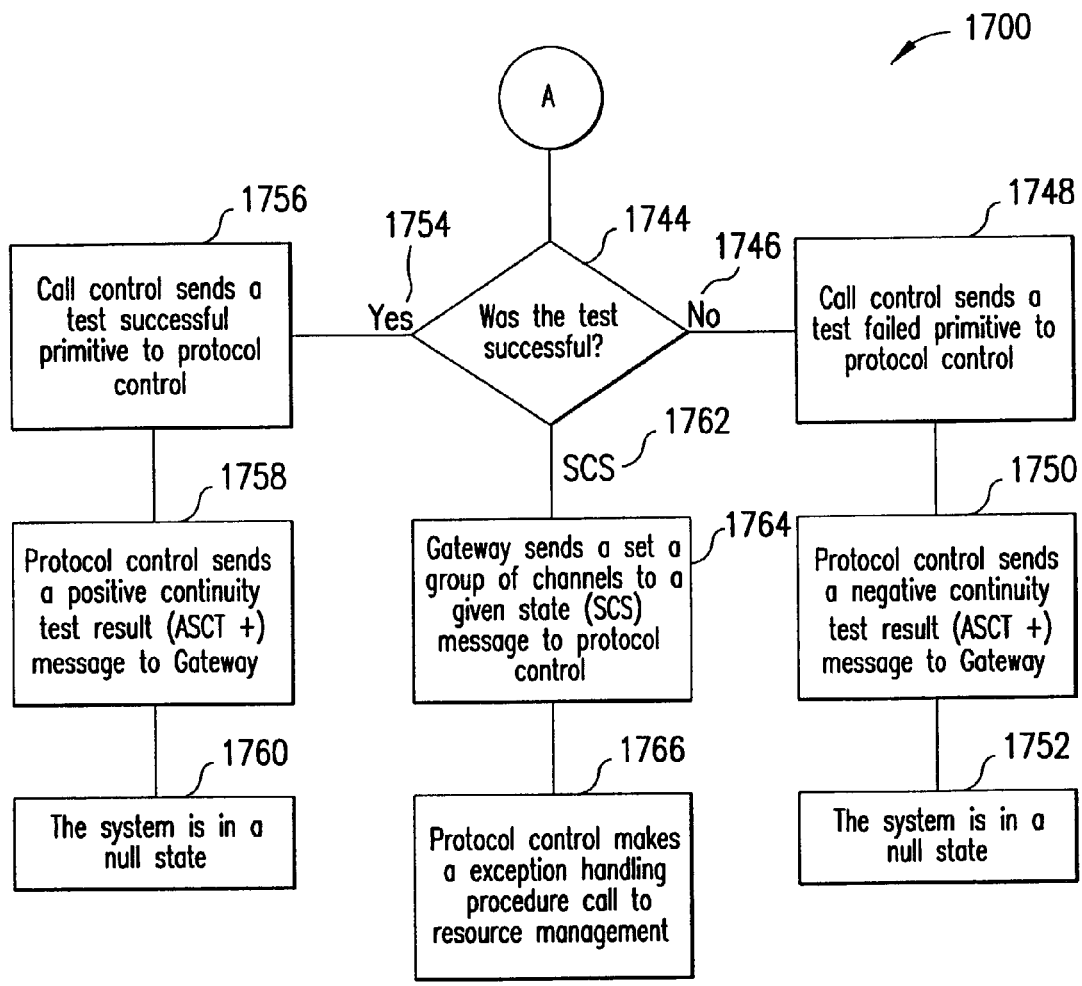

FIGS. 17A and 17B depict a NAS side continuity test handling 1700 state diagram detailing the states of protocol control 1102 during initiation of a continuity test. Steps 1702 through 1766 outline in detail the state flow of protocol control 1102 during the test.

Figure 18A:
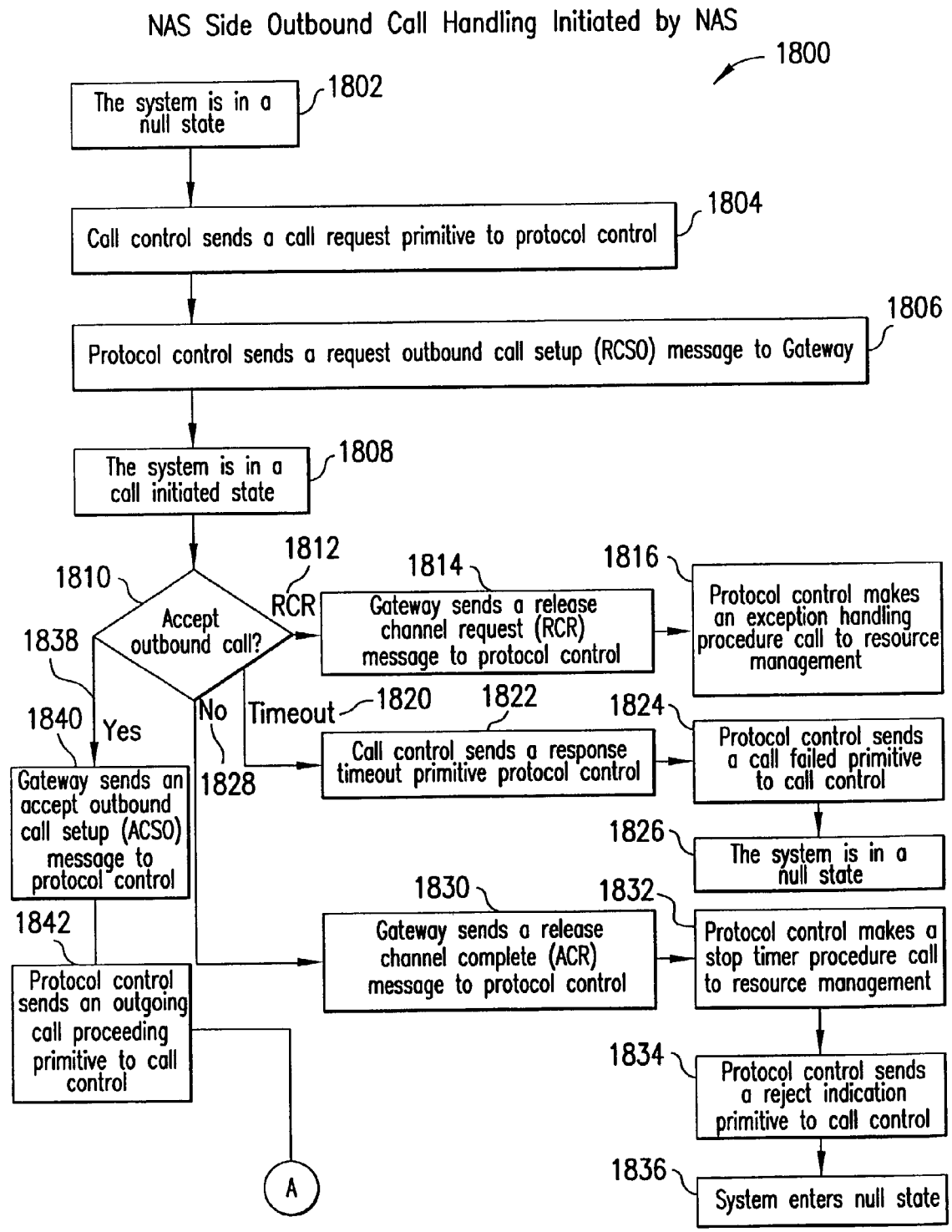
FIGS. 18A and 18B are state diagrams illustrating NAS side outbound call handling initiated by a NAS for use in callback.
Figure 18B:
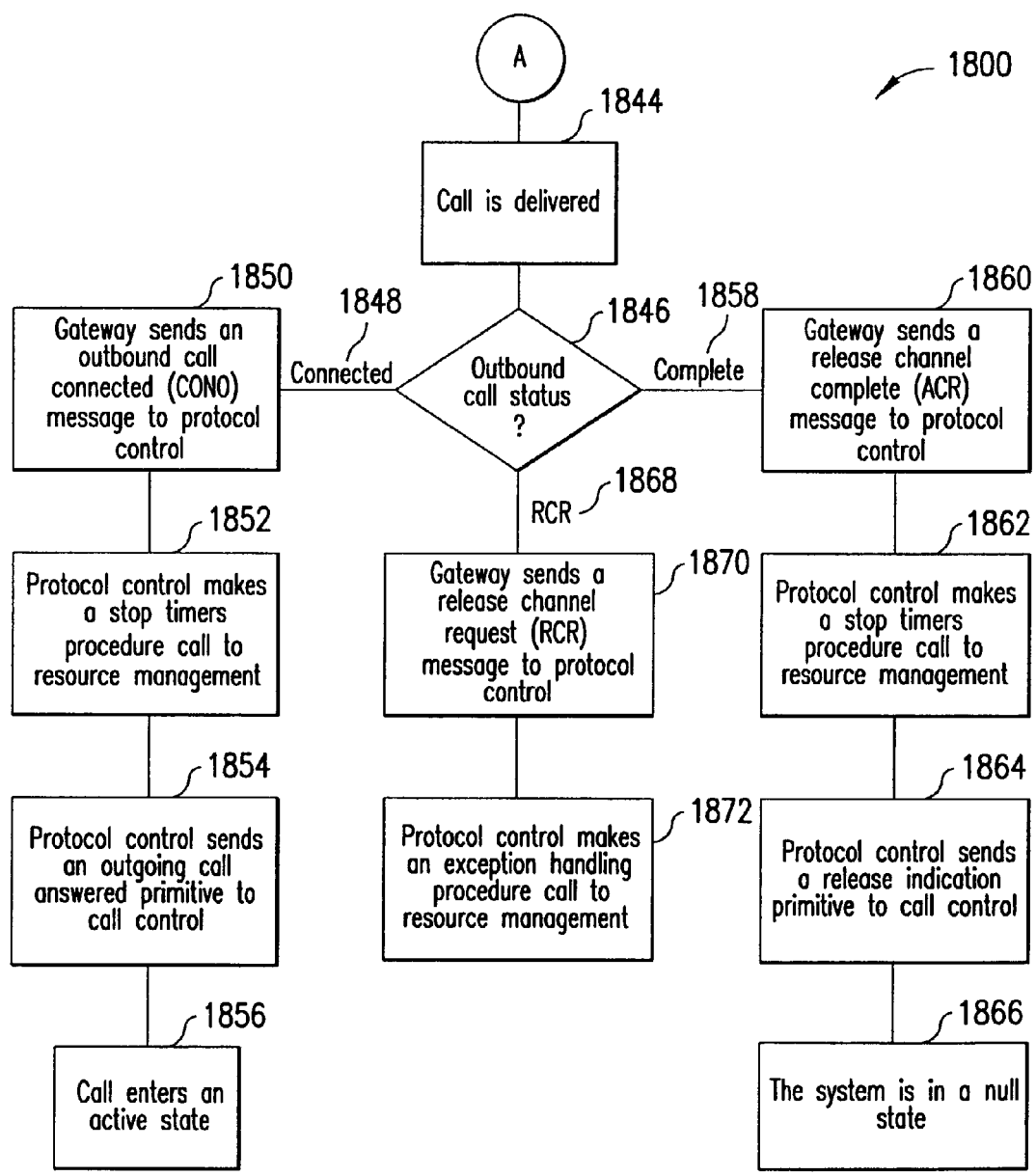

FIGS. 18A and 18B depict a NAS side outbound call handling (initiated by NAS) 1800 state diagram detailing the states of protocol control 1102 during initiation of an outbound call. Steps 1802 through 1872 outline in detail the state flow of protocol control 1102 during the call. An outbound call is a call initiated from the open architecture platform, for security reasons. In response to a call from a calling party, the platform initiates a call to the calling party, and performs password validation for the call.

4. Control Messages {TC\l3"}

Table 6 below provides a listing of the names and corresponding codes for control messages transmitted between GW 508 and NAS bay 902. Also included are the source of each message and the description for each message. For example, the NSUP message is transmitted from NAS bay 902 to GW 508, informing GW 508 that NAS bay 902 is coming up.

TABLE 6

| Name | Code | Source | Description |
|---|---|---|---|
| NSUP | 0x0081 | NAS | Notify NAS coming up |
| ASUP | 0x0082 | GW | Acknowledgment to NSUP |
| NSDN | 0x0083 | NAS | Notify NAS is about to reboot |
| RST1 | 0x0085 | GW | Request system reset - Drop all channels |
| ARST1 | 0x0086 | NAS | Reset in progress - awaiting Reboot command |
| RST2 | 0x0087 | GW | Request system reset (Reboot command) |
| ARST2 | 0x0088 | NAS | Reboot acknowledgment |
| MRJ | 0x00FF | GW or NAS | Message reject |
| RSI | 0x0091 | GW | Request system information |
| NSI | 0x0092 | NAS | Response to RSI |
| RBN | 0x0093 | GW | Request bay number |
| NBN | 0x0094 | NAS | Response to RBN |
| SBN | 0x0095 | GW | Set bay number |
| ABN | 0x0096 | NAS | Acknowledgment to BEN |
| RMI | 0x0097 | GW | Request module information |
| NMI | 0x0098 | NAS | Notify module information |
| RLI | 0x0099 | GW | Request line information |
| NLI | 0x009A | NAS | Notify line information |

TABLE 6-continued

| Name | Code | Source | Description |
|---|---|---|---|
| RCI | 0x009B | GW | Request channel information |
| NCI | 0x009C | NAS | Notify channel information |
| SLI | 0x009D | GW | Set line information |
| ASLI | 0x009E | NAS | Acknowledgment to SLI |
| RGWI | 0x00A1 | GW | Request Gateway information |
| NGWI | 0x00A2 | NAS | Notify Gateway information |
| SGWI | 0x00A3 | GW | Set Gateway information |
| ASGWI | 0x00A4 | NAS | Acknowledgment to SGWI |
| RGWS | 0x00A5 | GW | Request Gateway status |
| NGWS | 0x00A6 | NAS | Notify Gateway status |
| RMS | 0x0041 | GW | Request module status |
| RLS | 0x0043 | GW | Request line status |
| RCS | 0x0045 | GW | Request channel status |
| NMS | 0x0042 | NAS | Notify module status |
| NLS | 0x0044 | NAS | Notify line status |
| NCS | 0x0046 | NAS | Notify channel status |
| SMS | 0x0051 | GW | Set a module to a given state |
| SLS | 0x0053 | GW | Set a line to a given state |
| SCS | 0x0055 | GW | Set a group of channels to a given state |
| NSCS | 0x0056 | NAS | Response to SCS |
| PCT | 0x0061 | GW | Prepare channel for continuity test |
| APCT | 0x0062 | NAS | Response to PCT |
| SCT | 0x0063 | GW | Start continuity test procedure with far end as loopback (Generate tone and check for received tone) |
| ASCT | 0x0064 | NAS | Continuity test result |
| RTE | 0x007D | GW or NAS | Request test echo |
| ARTE | 0x007E | NAS or GW | Response to RTE |
| RTP | 0x007B | GW | Request test ping to given IP address |
| ATP | 0x007C | NAS | Response to RTP |
| LTN | 0x0071 | GW | Listen for DTMF tones |
| ALTN | 0x0072 | NAS | Response to listen for DTMF tones |
| STN | 0x0073 | GW | Send DTMF tones |
| ASTN | 0x0074 | NAS | Completion result of STN command |
| RCSI | 0x0001 | GW | Request inbound call setup |
| ACSI | 0x0002 | NAS | Accept inbound call setup |
| CONI | 0x0003 | NAS | Connect inbound call (answer) |
| RCSO | 0x0005 | NAS or GW | Request outbound call setup |
| ACSO | 0x0006 | GW or NAS | Accept outbound call setup |
| CONO | 0x0007 | GW or NAS | Outbound call connected |
| RCST | 0x0009 | GW | Request pass-through call setup (TDM connection between two channels) |
| ACST | 0x000A | NAS | Accept pass-through call |
| RCR | 0x0011 | GW or NAS | Release channel request |
| ACR | 0x0012 | NAS or GW | Release channel complete |

5. A Detailed View of the Control Messages{TC\l3"}

The following section provides a more detailed view of the control messages transmitted between GW 508 and NAS bay 902.

a. Startup Messages{TC\l4"}

Table 7 below provides the Startup messages, the parameter tags and the parameter descriptions (associated with these messages).

TABLE 7

Startup (registration and de-registration)

| Message | Parameter Tag | Parameter Description |
|---|---|---|
| NSUP - Notify NAS coming up | 0x01 | Protocol version implemented (initially, set to 0). |
|  | 0x02 | System ID |
|  | 0x03 | System type |
|  | 0x04 | Maximum number of modules (cards) on the system (whether present or not). |
|  | 0x05 | Bay number. |
| ASUP - Acknowledgement to NSUP | 0x02 | System ID |
| NSDN - Notify NAS coming down (about to reboot) | 0x02 | System ID |
| RST1 - Request system reset - Drop all channels | 0x02 | System ID |
| ARST1 - Reset in progress - awaiting Reboot command | 0x02 | System ID |
| RST2 - Request system reset (Reboot command) | 0x02 | System ID |
| ARST2 - Reboot acknowledgment | 0x02 | System ID |
|  | 0x06 | Result code: 0x00 Request accepted. NAS will reboot now. 0x01 Request denied. NAS will not reboot. | b. Protocol Error Messages{TC\l4"}

Table 8 below provides the Protocol error messages, the parameter tags and the parameter descriptions (associated with these messages).

TABLE 8

Protocol error handling

| Message | Parameter Tag | Parameter Description |
|---|---|---|
| MRJ - Message reject | 0xFE | ISDN cause code |

This message is generated by the NAS or GW when a message is received with an error, such as an invalid message code, etc. The ISDN cause code indicates the main reason why the message was rejected.

c. System Configuration Messages{TC\l4"}

Table 9 below provides the System configuration messages, the parameter tags and the parameter descriptions (associated with these messages).

TABLE 9

System configuration

| Message | Parameter Tag | Parameter Description |
|---|---|---|
| RSI - Request system information | | |
| NSI - Notify system information (response to RSI) | 0x01 | Protocol version implemented (initially, set to 0). |
| | 0x02 | System ID |
| | 0x03 | System type |
| | 0x04 | Maximum number of modules (cards) on the system (whether present or not). |
| | 0x05 | Bay number This message is sent as a response to a RSI request. |
| RBN - Request bay number | | |
| NBN - Response to RBN | 0x05 | Bay number This message is sent as a response to a RBN request. |
| SBN - Set bay number | 0x05 | Bay number |
| ASBN - Acknowledgment to SBN | 0x05 | Bay number This message is sent as a response to a SBN request. | d. Telco Interface Configuration Messages{TC \l4"}

Table 10 below provides the Telco interface configuration messages, the parameter tags and the parameter descriptions (associated with these messages).

TABLE 10

Telco interface configuration

| Message | Parameter Tag | Parameter Description |
|---|---|---|
| RMI-Request module information | 0x07 | Module number |
| NMI-Notify module information (response to RMI) | 0x07 | Module number |
| | 0x0A | Module type: |
| | 0x00 | not present |
| | 0x01 | unknown |
| | 0x03 | router card |
| | 0x04 | 8-line channelized T1 |
| | 0x06 | 48-modem card |
| | 0x07 | HDLC card |
| | 0x08 | Ethernet card |
| | 0x09 | Serial WAN card |
| | 0x0A | HSSI card |
| | 0x0B | 10-line unchannelized T1 |
| | 0x0D | T3 |
| | 0x0E | 48-modem 56K card |
| | 0x10 | SDSL |
| | 0x11 | ADSL CAP |
| | 0x12 | ADSL DMT |
| | 0x13 | standalone modem controller |
| | 0x14 | 32-line IDSL |
| | | Many other values are reserved. |
| | 0x0B | Capabilities/features: logical OR of any of the following flags: |
| | 0x01 | Capable of continuity testing |
| | 0x02 | Network interface module |
| | 0x08 | Number of lines (or items, depending on card type). |
| | 0x09 | External name (i.e., "8t1-card", etc.) In ASCII format. |
| RLI-Request line information | 0x07 | Module number |
| | 0x0D | Line number |
| NLI-Notify line information (response to RLI) | 0x07 | Module number |
| | 0x0D | Line number |
| | 0x0E | Number of channels |
| | 0x0F | External name in ASCII format |
| | 0x10 | Line coding: |
| | 0x00 | Unknown |
| | 0x01 | AMI D4 AMI |
| | 0x02 | B8ZS ESF - B8ZS |
| | 0x11 | Framing: |
| | 0x00 | Unknown |
| | 0x01 | D4 |
| | 0x02 | ESF |
| | 0x12 | Signaling type: |
| | 0x00 | Unknown |
| | 0x01 | In-band |
| | 0x02 | ISDN PRI |
| | 0x03 | NFAS |
| | 0x04 | SS7 gateway |
| | 0x13 | In-band signaling details: |
| | 0x00 | Unknown |
| | 0x01 | Wink start |
| | 0x02 | Idle start |
| | 0x03 | wink-wink with 200 msec wink |
| | 0x04 | wink-wink with 400 msec wink |
| | 0x05 | loop start CPE |
| | 0x06 | ground start CPE |
| | 0x41 | T1 front-end type: |
| | 0x00 | Unknown |
| | 0x01 | CSU (T1 long haul) |
| | 0x02 | DSX-1 (T1 short haul) |
| | 0x42 | T1 CSU build-out: |
| | 0x00 | 0 db |
| | 0x01 | 7.5 db |
| | 0x02 | 15 db |
| | 0x03 | 22.5 db |
| | 0x43 | T1 DSX-1 line length: |
| | 0x00 | 1–133 ft |
| | 0x01 | 134–266 ft |

TABLE 10-continued

Telco interface configuration

| Message | Parameter Tag | Parameter Description | | |
|---|---|---|---|---|
| | | 0x02 | 267–399 ft | |
| | | 0x03 | 400–533 ft | |
| | | 0x04 | 534–655 ft | |
| RCI-Request Channel information | 0x07 | Module number | | |
| | 0x0D | Line number | | |
| | 0x15 | Channel number | | |
| NCI-Notify channel information (response to RCI) | 0x07 | Module number | | |
| | 0x0D | Line number | | |
| | 0x15 | Channel number | | |
| | 0x16 | Channel status | | |
| | 0x17 | Bearer Capability of the Channel (BCC) or type of the active call, when a call is present. | | |
| | 0x18 | Calling Party number | | |
| | 0x19 | Dialed Phone number | | |
| | 0x1A | Timestamp of the last channel status transition | | |
| SLI-Set line information | 0x07 | Module number | | |
| | 0x0D | Line number | | |
| | 0x0F | External name in ASCII format | | |
| | 0x10 | Line coding: | | |
| | | 0x01 | AMI | |
| | | 0x02 | B8ZS | |
| | 0x11 | Framing: | | |
| | | 0x01 | D4 | |
| | | 0x02 | ESF | |
| | 0x12 | Signaling type: | | |
| | | 0x01 | In-band | |
| | | 0x02 | ISDN PRI | |
| | | 0x03 | NFAS | |
| | | 0x04 | SS7 gateway | |
| | 0x13 | In-band signaling details: | | |
| | | 0x01 | Wink start | |
| | | 0x02 | Idle start | |
| | | 0x03 | wink-wink with 200 msec wink | |
| | | 0x04 | wink-wink with 400 msec wink | |
| | | 0x05 | loop start CPE | |
| | | 0x06 | ground start CPE | |
| | 0x41 | T1 front-end type: | | |
| | | 0x01 | CSU (T1 long haul) | |
| | | 0x02 | DSX-1 (T1 short haul) | |
| | 0x42 | T1 CSU build-out: | | |
| | | 0x00 | 0 db | |
| | | 0x01 | 7.5 db | |
| | | 0x02 | 15 db | |
| | | 0x03 | 22.5 db | |
| | 0x43 | T1 DSX-1 line length: | | |
| | | 0x00 | 1–133 ft | |
| | | 0x01 | 134–266 ft | |
| | | 0x02 | 267–399 ft | |
| | | 0x03 | 400–533 ft | |
| | | 0x04 | 534–655 ft | |
| ASLI-New line information ACK | 0x07 | Module number | | |
| | 0x0D | Line number | | |

This message is sent as a response to a SLI request.

e. Gateway Configuration Messages{TC\l4"}

Table 11 below provides the Gateway configuration messages, the parameter tags and the parameter descriptions (associated with these messages).

TABLE 11

Gateway configuration

| Message | Parameter Tag | Parameter Description |
|---|---|---|
| RGWI-Request Gateway information | | |
| NGWI-Notify Gateway information | 0x1B | IP Address for Primary gateway |
| | 0x1C | TCP port for Primary gateway |
| | 0x1D | IP Address for Secondary gateway |
| | 0x1E | TCP port for Secondary gateway |
| | | This message is sent as a response to a RGWI request, or when the local NAS configuration is changed by other means. |
| SGWI-Set Gateway information | 0x02 | Serial Number of Remote Unit |
| | 0x1B | New IP Address of Primary gateway |
| | 0x1C | TCP port for Primary gateway |
| | 0x1D | New IP Address of Secondary gateway |
| | 0x1E | TCP port for Secondary gateway |
| ASGWI-Acknowledge to SGWI | | This message is sent as a response to a SGWI request. |
| RGWS-Request Gateway status | 0x02 | Serial Number of Remote Unit |
| NGWS-Notify Gateway status | 0x02 | Serial Number of Remote Unit |
| | 0x1B | New IP Address of Primary Host |
| | 0x1C | TCP port for Primary |
| | 0x1D | New IP Address of Secondary Host |
| | 0x1E | TCP port for Secondary |
| | 0x1F | Gateway in use (Primary/Secondary) |
| | | This message is sent as a response to a RGWS request. | f. Maintenance-Status (State) Messages{TC\l4"}

Table 12 below provides the Maintenance-Status (State) messages, the parameter tags and the parameter descriptions (associated with these messages).

TABLE 12

Maintenance - Status (State)

| Message | Parameter Tag | Parameter Description |
|---|---|---|
| RMS-Request module status | 0x07 | Module number |
| | | This message will force an immediate NMS. |
| RLS-Request line status | 0x07 | Module number |
| | 0x0D | Line number |
| | | This message will force an immediate NLS. |
| RCS-Request channel status | 0x07 | Module number |
| | 0x0D | Line number |
| | 0x15 | Channel number |
| | | This message will force an immediate NCS. |
| NMS-Notify module status | 0x07 | Module number |
| | 0x0A | Module type (see NMI above) |
| | 0x0C | Module status |
| | 0x20 | Number of lines (for network interface modules only) |
| | 0x21 | Line status: one entry per line (for network interface modules only) |
| | | This message should be issued by the NAS any time that the module status changes or if a RMS command was received. |
| NLS-Notify line status | 0x07 | Module number |
| | 0x0D | Line number |
| | 0x14 | Line status |
| | 0x22 | Number of channels |
| | 0x23 | Channel status: one entry per channel |
| | | This message should be issued by the NAS any time that the line status changes or if a RLS command was received. |
| NCS-Notify channel status | 0x07 | Module number |
| | 0x0D | Line number |
| | 0x15 | Channel number |
| | 0x16 | Channel status |
| | | This message should be issued by the NAS if an RCS command was received. |
| SMS-Set a module to a given status | 0x07 | Module number |
| | 0x24 | Requested state: |
| | |     0x00    out of service |
| | |     0x01    initialize (bring up) |
| | | As the Module changes status, the NAS will notify the GW with NMS messages. The correlator in those NMS messages will not be the same as the correlator in the SMS message. |
| SLS-Set a line to a given status | 0x07 | Module number |
| | 0x0D | Line number |
| | 0x25 | Requested state: |
| | |     0x00    Disable |
| | |     0x01    Enable |
| | |     0x02    Start loopback |
| | |     0x03    Terminate loopback |
| | | As the line changes status, the NAS will notify the GW with NLS messages. The correlator in those NLS messages will not be the same as the correlator in the SLS message. |
| SCS-Set a group of channels to a given status | 0x07 | Module number |
| | 0x0D | Line number |
| | 0x28 | Start Channel number |
| | 0x29 | End Channel number |
| | 0x26 | Action: |
| | |     0x00    Reset to idle |
| | |     0x01    Reset to out of service |
| | |     0x02    Start loopback |

TABLE 12-continued

Maintenance - Status (State)

| Message | Parameter Tag | Parameter Description | |
|---|---|---|---|
| | | 0x03 | Terminate loopback |
| | | 0x04 | Block |
| | | 0x05 | Unblock |
| | 0x27 | Option: | |
| | | 0x00 | Do not perform the indicated action if any of the channels is not in the valid initial state. |
| | | 0x01 | Perform the indicated action on channels which are on the valid initial state. Other channels are not affected. |
| Action | Valid initial state | Final state | |
| Reset to idle | maintenance, blocked, loopback, idle, in use, conected | idle | |
| Reset to out of service | maintenance, blocked, loopback, idle, in use, connected | out of service | |
| Start loopback | idle | loopback | |
| End loopback | loopback | idle | |
| Block | idle | blocked | |
| Unblock | blocked | idle | |
| NSCS-Response to SCS | 0x07 | Module number | |
| | 0x0D | Line number | |
| | 0x28 | Start Channel number | |
| | 0x29 | End Channel number | |
| | 0x2A | Response code: | |
| | | 0x00 | action successfully performed in all channels |
| | | 0x01 | at least one channel failed |
| | 0x22 | Number of channels | |
| | 0x23 | Channel status: one entry per channel | | g. Continuity Test Messages{TC\l4"}

Table 13 below provides the Continuity test messages, the parameter tags and the parameter descriptions (associated with these messages).

TABLE 13

Continuity test

| Message | Parameter Tag | Parameter Description | |
|---|---|---|---|
| PCT-Prepare channel for continuity test | 0x07 | Module number | |
| | 0x0D | Line number | |
| | 0x15 | Channel number | |
| APCT-Response to PCT request | 0x07 | Module number | |
| | 0x0D | Line number | |
| | 0x15 | Channel number | |
| | 0x2B | Result: | |
| | | 0x00 | Resources reserved successfully |
| | | 0x01 | Resource not available |
| SCT-Start continuity test procedure with far end as loopback | 0x07 | Module number | |
| | 0x0D | Line number | |
| | 0x15 | Channel number | |
| | 0x2C | Timeout in milliseconds. Default is 2 seconds. | |

The SCT command must be received less than 3 seconds after the APCT was sent. The continuity test performed by the NAS is as follows:
1. Start tone detection
2. Generate a check tone
3. Start timer
4. When tone is detected (minimum of 60 ms):
4.1. Stop timer.
4.2. Stop generator
4.2.1. TEST SUCCESSFUL

TABLE 13-continued

Continuity test

| Message | Parameter Tag | Parameter Description |
|---|---|---|
| 5. If timer expires: | | |
| 5.1. Stop generator | | |
| 5.2. TEST FAILED | | |
| | | After continuity testing, a channel is always left in the idle state. |
| ASCT-Continuity test result | 0x07 | Module number |
| | 0x0D | Line Number |
| | 0x15 | Channel Number |
| | 0x2D | Result: |
| | 0x00 | Test completed successfully |
| | 0x01 | Test failed | h. Keepalive Test Messages{TC\l4"}

Table 14 below provides the Keepalive test messages, the parameter tags and the parameter descriptions (associated with these messages).

TABLE 14

Keepalive test

| Message | Parameter Tag | Parameter Description |
|---|---|---|
| RTE-Request test echo | 0x2E | Random characters |
| ARTE-Response to RTE | 0x2E | Same random characters from RTE | i. LAN Test Messages{TC\l4"}

Table 15 below provides the LAN test messages, the parameter tags and the parameter descriptions (associated with these messages).

TABLE 15

LAN test

| Message | Parameter Tag | Parameter Description |
|---|---|---|
| RTP-Request a test ping | 0x02 | System ID |
| | 0x2F | IP Address to Ping |
| | 0x30 | Number of pings to send |
| ATP-Response to RTP | 0x02 | System ID |
| | 0x2F | IP Address to Ping |
| | 0x30 | Number of successful pings | j. DTMF Function Messages{TC\l4"}

Table 16 below provides the DTMF function messages, the parameter tags and the parameter descriptions (associated with these messages).

TABLE 16

DTMF functions

| Message | Parameter Tag | Parameter Description |
|---|---|---|
| LTN-Listen | 0x07 | Module number |
| | 0x0D | Line number |

TABLE 16-continued

DTMF functions

| Message | Parameter Tag | Parameter Description |
|---|---|---|
| for DTMF tones | 0x15 | Channel number |
| | 0x31 | Time to wait for a tone (since either last tone heard or start of command) - in milliseconds |
| | 0x32 | Maximum number of tones to recognize |
| | 0x34 | Tone to cancel the wait |
| If resources are available, the NAS starts listening for DTMF tones on the given channel. The procedure is as follows: | | |
| 1. Starts timer. | | |
| 2. When a tone is recognized: | | |
| 2.1. Restart timer. | | |
| 2.2. If the recognized tone is the 'tone to cancel', the operation is concluded and a response is generated (cancel tone received). | | |
| 2.3. Add the tone to the response string. If the number of tones on the string exceeds the maximum allowed, the operation is concluded and a response is generated (max tones received). | | |
| 2.4. When the tone is removed, restart the timer and continue from step 2. | | |
| 2.5. If the timer expires, the operation is concluded and a response is generated (tone too long). | | |
| 3. If the timer expires, the operation is concluded and a response is generated (timeout). | | |
| ALTN-Response to LTN | 0x07 | Module number |
| | 0x0D | Line number |
| | 0x15 | Channel number |
| | 0x35 | Completion status: |
| | 0x00 | Timeout |
| | 0x01 | No resources available for this operation |
| | 0x02 | Operation was interrupted |
| | 0x03 | Cancel tone received |
| | 0x04 | Maximum tones received |
| | 0x05 | Tone too long |
| | 0x32 | Number of tones received |
| | 0x33 | String of tones received (ASCII characters '0'–'9', '*', '#') |
| STN-Send DTMF tones | 0x07 | Module number |
| | 0x0D | Line number |
| | 0x15 | Channel number |
| | 0x32 | Number of tones to send |
| | 0x33 | String of Tones to send (ASCII characters '0'–'9', '*', '#', 'd' - contiguous dialtone, 'b' - contiguous |

TABLE 16-continued

DTMF functions

| Message | Parameter Tag | Parameter Description |
|---|---|---|
| | | user busy, 'n' - contiguous network busy, 's' - short pause, 'r' - contiguous ringback) |
| ASTN-Completion result of STN command | 0x07 0x0D 0x15 0x36 | Module number Line number Channel number Completion status: |
| | 0x00 | Operation succeeded |
| | 0x01 | Operation failed |
| | 0x02 | Operation was interrupted | k. Inbound Call Handling Messages{TC\l4"}

Table 17 below provides the Inbound call handling messages, the parameter tags and the parameter descriptions (associated with these messages).

TABLE 17

Inbound call handling

| Message | Parameter Tag | Parameter Description |
|---|---|---|
| RCSI-Request inbound call setup | 0x07 0x0D 0x15 0x17 0x19 0x18 | Module number Line number Channel number Bearer Capability of the Channel (BCC) required for the call. Called Phone number Calling Party number |

This message is a notification from the GW to the NAS that an inbound call is pending. The NAS should respond with an ACSI message indicating if it accepts or with an ACR if it rejects the call.
The valid channel states for this command are idle or loopback. If the channel is in loopback state, loopback mode is ended and the call proceeds.

| ACSI-Accept inbound call setup | 0x07 0x0D 0x15 | Module number Line number Channel number |

This message is a notification from the NAS to the GW that an inbound call has been accepted. Appropriate resources have been reserved at the NAS for this call.

| CONI-Connect inbound call (answer) | 0x07 0x0D 0x15 0x40 | Module number Line number Channel number Call identifier assigned by the NAS |

This message is an indication from the NAS to the GW to answer an inbound call.

l. Outbound Call Handling Messages{TC\l4"}

Table 18 below provides the Outbound call handling messages, the parameter tags and the parameter descriptions (associated with these messages).

Outbound call handling

| Message | Parameter Tag | Parameter Description |
|---|---|---|
| RCSO-Request outbound | 0x07 0x0D 0x15 | Module number Line number Channel number |

-continued

Outbound call handling

| Message | Parameter Tag | Parameter Description |
|---|---|---|
| call setup | 0x17 | Bearer Capability of the Channel (BCC) required for the call. |
| | 0x19 | Called Phone number[1] |
| | 0x18 | Calling Party number[1] |
| | 0x37 | Destination module[2] |
| | 0x38 | Destination line[2] |
| | 0x39 | Destination channel[2] |
| | 0x40 | Call identifier assigned by the NAS[3] |

If the call is initiated by the NAS, the Module, Line and Channel numbers are set to 0, because it is up to the GW to assign an appropriate channel for the outgoing call.
If the call is initiated by the GW, the Module, Line and Channel numbers indicate the channel that should be connected to the outbound call. The NAS will place a call in one of its regular trunks (such as an ISDN PRI line).
The GW or the NAS will respond with a ACSO (if the call was accepted) or with a RCR (if the call was rejected). When the outbound call is established, it will be connected to the channel specified by the tags 0x07/0x0D/0x15.

| ACSO-Accept outbound call setup | 0x07 0x0D 0x15 | Module number Line number Channel number |

If the call was initiated by the NAS, this is a notification from the GW that an outbound call was accepted and it is pending. The Gateway should send an RCR message if it wants to reject a call.
If the call was initiated by the GW, this is a notification from the NAS that an outbound call was accepted and it is pending. The NAS would have sent an RCR message if it wanted to reject a call.

TABLE 18

Outbound call handling

| Message | Parameter Tag | Parameter Description |
|---|---|---|
| CONO-Outbound call connected | 0x07 0x0D 0x15 0x40 | Module number Line number Channel number Call identifier assigned by the NAS.[4] |

This message is a notification from the GW to the NAS that an outbound call has been connected.

m. Pass-through Call Handling Messages{TC\l4"}

Table 19 below provides the Pass-through call handling messages, the parameter tags and the parameter descriptions (associated with these messages).

TABLE 19

Pass-through call handling

| Message | Parameter Tag | Parameter Description |
|---|---|---|
| RCST-Request pass-through call setup (TDM connection between two channels) | 0x07 0x0D 0x15 0x17 | From Module number From Line number From Channel number Bearer Capability of the Channel (BCC) required for the call. |

TABLE 19-continued

Pass-through call handling

| Message | Parameter Tag | Parameter Description |
|---------|---------------|----------------------|
|  | 0x37 | To Module number |
|  | 0x38 | To Line number |
|  | 0x39 | To Channel number |
| This message is a request from the GW to the NAS to link two channels. The NAS should respond with an ACST if it accepts the connection or with a RCR if it rejects the connection. The indicated channels are interconnected at the time slot level. The NAS will not perform any rate adaptation. It is the Gateway's responsibility to specify compatible channels. | | |
| ACST-Accept pass-through call | 0x07 | From Module number |
|  | 0x0D | From Line number |
|  | 0x15 | From Channel number |
|  | 0x37 | To Module number |
|  | 0x38 | To Line number |
|  | 0x39 | To Channel number |

TABLE 19-continued

Pass-through call handling

| Message | Parameter Tag | Parameter Description |
|---------|---------------|----------------------|
| This message is a notification from the NAS to the GW that a TDM connection has been accepted and connected. The two indicated channels are now connected. | | | n. Call Clearing Messages{TC\l4"}

Table 20 below provides the Call clearing messages, the parameter tags and the parameter descriptions (associated with these messages).

TABLE 20

Call clearing

| Message | Parameter Tag | Parameter Description |
|---------|---------------|----------------------|
| RCR-Release channel request | 0x07 | Module number |
|  | 0x0D | Line number |
|  | 0x15 | Channel number |
|  | 0xFE | ISDN cause code |
| In the case of a pass-through call (TDM connection), the channel identified should be the 'from' side. | | |
| ACR-Release channel completed | 0x07 | Module number |
|  | 0x0D | Line number |
|  | 0x15 | Channel number |
|  | 0xFE | ISDN cause code |

6. Control Message Parameters{TC\l3"}

Table 21 below provides a listing of the control message parameters, and the control messages which use these message parameters. More specifically, Table 21 provides the tags associated with the parameters, the size (in bytes) of the parameters, the type of the parameters (e.g., ASCII), the parameter descriptions, and the control messages which use the parameters.

TABLE 21

| Tag | Size (bytes) | Type | Parameter description | Usage |
|-----|--------------|------|----------------------|-------|
| 0x00 | 0 |  | End marker | All messages. |
| 0x01 | 1 | UINT | Protocol version | NSUP |
| 0x02 | 1 to 24 | ASCII | System ID/Serial Number | NUSP, ASUP, NSDN, RST1, ARST1, RST2, ARST2, NSI, SGWI, ROWS, NGWS |
| 0x03 | 9 | ASCII | System type | NSUP, NSI |
| 0x04 | 2 | UINT | Max. number of modules (slot cards) supported | NSUP, NSI |
| 0x05 | 8 |  | Bay number | NSUP, NSI, NBN |
| 0x06 | 1 |  | Reboot acknowledgment | ARST2 |
| 0x07 | 2 | UINT | Module number | RMI, NMI, RLI, NLI, RCI, NCI, SLI, ASLI, RMS, RLS, RCS, NMS, NLS, NCS, SMS, SLS, SCS, NSCS, PCT, APCT, SCT, ASCT, LTN, ALTN, STN, ASTN, RCSI, ACSI, CONI, RCSO, |

TABLE 21-continued

| Tag | Size (bytes) | Type | Parameter description | Usage |
|---|---|---|---|---|
| | | | | ACSO, CONO, RCST, ACST, RCR, ACR |
| 0x08 | 2 | UINT | Number of lines on this module | NMI, NMS |
| 0x09 | 16 | ASCII | Module name | NMI |
| 0x0A | 1 | | Module type | NMI |
| 0x0B | 1 | | Module capabilities | NMI |
| 0x0C | 1 | Module Status | Module status | NMS |
| 0x0D | 2 | UINT | Line number | RLI, NLI, RCI, NCI, SLI, ASLI, RLS, RCS, NLS, NCS, SLS, SCS, NSCS, PCT, APCT, SCT, ASCT, LTN, ALTN, STN, ASTN, RCSI, ACSI, CONI, RCSO, ACSO, CONO, RCST, ACST, RCR, ACR |
| 0x0E | 2 | UINT | Number of channels on this line | NLI, NLS |
| 0x0F | 16 | ASCII | Line name | NLI, SLI |
| 0x10 | 1 | | Line coding | NLI, SLI |
| 0x11 | 1 | | Line framing | NLI, SLI |
| 0x12 | 1 | | Line signaling details | NLI, SLI |
| 0x13 | 1 | | Line in-band signaling details | NLI, SLI |
| 0x14 | 1 | Line Status | Line status | NLS |
| 0x15 | 2 | UINT | Channel number | RCI, NCI, RCS, NCS, SCS, NSCS, PCT, APCT, SCT, ASCT, LTN, ALTN, STN, ASTN, RCSI, ACSI, CONI, RCSO, ACSO, CONO, RCST, ACST, RCR, ACR |
| 0x16 | 1 | Channel Status | Channel status | NCS |
| 0x17 | 1 | | Bearer capability | NCI, RCSI, RCSO, RCST |
| 0x18 | 24 | ASCII | Calling party number | NCI, RCSI, RCSO |
| 0x19 | 24 | ASCII | Dialed number | NCI, RCSI, RCSO |
| 0x1A | 4 | TIME | Channel status change timestamp | NCI |
| 0x1B | 4 | Ipaddr | Primary Gateway IP | NGWI, SGWI, NGWS |
| 0x1C | 2 | UINT | Primary Gateway TCP port | NGWI, SGWI, NGWS |
| 0x1D | 4 | Ipaddr | Secondary Gateway IP | NGWI, SGWI, NGWS |
| 0x1E | 2 | UINT | Secondary Gateway TCP port | NGWI, SGWI, NGWS |
| 0x1F | 1 | | Gateway selector | NGWS |
| 0x20 | 2 | UINT | Number of lines in the Line status array | NMS |
| 0x21 | Variable | Line Status | Line status array | NMS |
| 0x22 | 2 | UINT | Number of channels in the Channel status array | NLS |
| 0x23 | Variable | Channel Status | Channel status array | NLS |
| 0x24 | 1 | | Requested module state | SMS |
| 0x25 | 1 | | Requested line state | SLS |
| 0x26 | 1 | | Requested channel status | SCS |
| 0x27 | 1 | | Set channel status option | SCS |
| 0x28 | 2 | UINT | Channel number first (for grouping) | SCS, NSCS |
| 0x29 | 2 | UINT | Channel number last (for grouping) | SCS, NSCS |
| 0x2A | 1 | | "Set channel status" result | NSCS |
| 0x2B | 1 | | "Prepare for continuity check" result | APCT |
| 0x2C | 2 | UINT | Continuity timeout | SCT |
| 0x2D | 1 | | Continuity test result | ASCT |
| 0x2E | 0 to 16 | | Test echo | RTE, ARTE |
| 0x2F | 4 | Ipaddr | Test ping address | RTF, ATP |
| 0x30 | 2 | UINT | Test ping: Number of packets | RTF, ATP |
| 0x31 | 2 | UINT | DTMF listen time | LTN |
| 0x32 | 1 | UINT | DTMF number of tones | LTN, ALTN, STN |
| 0x33 | Variable | ASCII | DTMF string ('0'–'9', 'A'–'D', '*', '#') | ALTN, STN |

TABLE 21-continued

| Tag | Size (bytes) | Type | Parameter description | Usage |
|---|---|---|---|---|
| 0x34 | 1 | BYTE | DTMF tone to cancel the waiting | LTN |
| 0x35 | 1 | | DTMF listen completion status | ALTN |
| 0x36 | 1 | | DTMF send completion status | STN |
| 0x37 | 2 | UINT | TDM destination Module | RCST, ACST, RCSO (gw) |
| 0x38 | 2 | UINT | TDM destination Line | RCST, ACST, RCSO (gw) |
| 0x39 | 2 | UINT | TDM destination channel | RCST, ACST, RCSO (gw) |
| 0x40 | 2 | UINT | Call identifier (RAS's Route ID) | CONI, CONO, RCSO (nas) |
| 0x41 | 1 | BYTE | T1 front-end type | SLI, NLI |
| 0x42 | 1 | BYTE | T1 CSU build-out | SLI, NLI |
| 0x43 | 1 | BYTE | T1 DSX line length | SLI, NLI |
| 0xFE | 1 | UINT | ISDN cause code | RCR, ACR, others |

7. A Detailed View of the Control Messages{TC\l3"}

The following section provides a detailed view of the flow of control messages between GW 508 and NAS bay 902. Included are the source (either GW 508 or NAS bay 902) and relevant comments describing the message flow.

a. Startup Flow {TC\l4"}

Table 22 below provides the Startup flow, including the step, the control message source (either GW 508 or NAS bay 902) and relevant comments.

TABLE 22

| Step | Gateway | NAS | Comments |
|---|---|---|---|
| 1 | | NSUP | NAS coming up. The message contains server information, including number of modules in the system. |
| 2 | ASUP | | | b. Module Status Notification {TC\l4"}

Table 23 below provides the Module status notification flow, including the step, the control message source (either GW 508 or NAS bay 902) and relevant comments.

TABLE 23

| Step | Gateway | NAS | Comments |
|---|---|---|---|
| 1 | | NMS | Notify module status. |
| 2 | | | If the module is in the UP state: |
| 3 | RMI | | Request module information |
| 4 | | NMI | Notify module information (including number of lines in this module). | c. Line Status Notification Flow{TC\l4"}

Table 24 below provides the Line status notification flow, including the step, the control message source (either GW 508 or NAS bay 902) and relevant comments.

TABLE 24

| Step | Gateway | NAS | Comments |
|---|---|---|---|
| 1 | | NLS | Notify line status. |
| 2 | | | If the line is in the UP state: |
| 3 | RLI | | Request line information |

TABLE 24-continued

| Step | Gateway | NAS | Comments |
|---|---|---|---|
| 4 | | NLI | Notify line information (including number of channels). |

Note: Channels will remain in the our-of-service state until the line becomes available. At that time, the channels will be set to the idle state. The Gateway must then explicitly disable or block channels that should not be in the idle state.

d. Blocking of Channels Flow{TC\l4"}

Table 25 below provides the Blocking of channels flow, including the step, the control message source (either GW 508 or NAS bay 902) and relevant comments.

TABLE 25

| Step | Gateway | NAS | Comments |
|---|---|---|---|
| 1 | SCS | | Set a group of channels to be blocked state. |
| 2 | | RSCS | Message indicates if the operation was successful or if it failed. | e. Unblocking of Channels Flow{TC\l4"}

Table 26 below provides the Unblocking of channels flow, including the step, the control message source (either GW 508 or NAS bay 902) and relevant comments.

TABLE 26

| Step | Gateway | NAS | Comments |
|---|---|---|---|
| 1 | SCS | | Set a group of channels to be unblocked state. |
| 2 | | RSCS | Message indicates if the operation was successful or if it failed. | f. Inbound Call Flow (Without Loopback Continuity Testing){TC\l4"}

Table 27 below provides the Inbound call flow (without loopback continuity testing), including the step, the control message source (either GW 508 or NAS bay 902) and relevant comments.

TABLE 27

| Step | Gateway | NAS | Comments |
|---|---|---|---|
| 1 | RCSI | | Setup for inbound call on given module/line/channel |
| 2 | | ACSI | Accept inbound call. At this time, the NAS may start any Radius lookup, etc. |
| 3 | | CONI | Connect (answer) inbound call. | g. Inbound Call Flow (With Loopback Continuity Testing) {TC\l4"}

Table 28 below provides the Inbound call flow (without loopback continuity testing), including the step, the control message source (either GW 508 or NAS bay 902) and relevant comments.

TABLE 28

| Step | Gateway | NAS | Comments |
|---|---|---|---|
| 1 | SCS | | Set a channel to the loopback state. |
| 2 | | RSCS | Message indicates if the operation was successful or if it failed. |
| 3 | If the gateway determines that the test was successful: | | |
| 3.1 | RCSI | | Setup for inbound call on given module/line/channel. |
| 3.2 | | ACSI | Accept/Reject inbound call. At this time, the NAS may start any Radius lookup, etc. |
| 3.3 | | CONI | Connect (answer) inbound call. |
| 4 | If the gateway determines that the test was not successful: | | |
| 4.1 | SCS | | Release a channel from the loopback state (back to idle state) |
| 4.2 | | RSCS | Message indicates if the operation was successful or if it failed. | h. Outbound Call Flow (Starting from the NAS){TC\l4"}

Table 29 below provides the Outbound call flow (starting from the NAS), including the step, the control message source (either GW 508 or NAS bay 902) and relevant comments.

TABLE 29

| Step | Gateway | NAS | Comments |
|---|---|---|---|
| 1 | | RCSO | Request outbound call. Note that the NAS doesn't know yet what module/line/channel will be used for the call and so, they are set to 0. |
| 2 | ACSO | | Accept/Reject outbound call on module/line/channel. This message is used by the Gateway to notify the NAS which module/line/channel will be used for the call. If the NAS can't process the call on that channel, it should issue a Release command. |
| 3 | CONO | | Outbound call answered by called party. | i. Outbound Call Flow (Starting from the GW){TC\l4"}

Table 30 below provides the Outbound call flow (starting from the GW), including the step, the control message source (either GW 508 or NAS bay 902) and relevant comments.

TABLE 30

| Step | Gateway | NAS | Comments |
|---|---|---|---|
| 1 | RCSO | | Request outbound call. The Gateway indicates the channel that should be connected to the outbound call. |
| 2 | | ACSO | Accept/Reject outbound call on module/line/channel. The NAS will place the call using one of the interfaces (such as an ISDN PRI line). |
| 3 | | CONO | Outbound call answered by called party. The pass-through connection is established. | j. Outbound Call Flow (Starting from the NAS, with Continuity Testing){TC\l4"}

Table 31 below provides the Outbound call flow (starting from the NAS, with continuity testing), including the step, the control message source (either GW 508 or NAS bay 902) and relevant comments.

TABLE 31

| Step | Gateway | NAS | Comments |
|---|---|---|---|
| 1 | | RCSO | Request outbound call. Note that the NAS doesn't know yet what module/line/channel will be used for the call and so, they are set to 0. |
| 2 | | | The Gateway requests a continuity test: |
| 2.1 | RPCT | | Prepare for Continuity test |
| 2.2 | | APCT | Accept continuity test |
| 2.3 | SCT | | Start continuity test. If the NAS doesn't receive this command within 3 seconds of sending an APCT, the continuity test will be canceled and all reserved resources will be released. |
| 2.4 | | ASCT | Continuity test result. |
| 3 | ACSO | | Accept outbound call on module/line/channel. This message is used by the Gateway to notify the NAS which module, line and channel will be used for the call. If the NAS can't process the call on that channel, it should issue a Release command. |
| 4 | CONO | | Outbound call answered by called party. | k. TDM Pass-through Call Request Flow (Interswitch Connection){TC\l4"}

Table 32 below provides the TDM pass-through call request flow (inter-switch connection), including the step, the control message source (either GW 508 or NAS bay 902) and relevant comments.

TABLE 32

| Step | Gateway | NAS | Comments |
|---|---|---|---|
| 1 | RCST | | Gateway requests a given pair of module/line/channel to be interconnected for inter-trunk switching. |
| 2 | | ACST | Accept/Reject inter-trunk switch connection. | l. Call Releasing Flow (from NAS){TC\l4"}

Table 33 below provides the Call releasing flow (from NAS), including the step, the control message source (either GW 508 or NAS bay 902) and relevant comments.

TABLE 33

| Step | Gateway | NAS | Comments |
|---|---|---|---|
| 1 | | RCR | NAS needs to release a call (for example, it received an LCP TRMREQ). |
| 2 | ACR | | When Gateway completes the release, it notifies the NAS. | m. Call Releasing Flow (from GW){TC\l4"}

Table 34 below provides the call releasing flow (from GW), including the step, the control message source (either GW 508 or NAS bay 902) and relevant comments.

TABLE 34

| Step | Gateway | NAS | Comments |
|---|---|---|---|
| 1 | RCR | | Gateway requests to release a call (for example, the remote end hung up). |
| 2 | | ACR | When the NAS completes the release, it notifies the Gateway. | n. Complex Outbound Call Request Flow Example{TC\l4"}

Table 35 below provides an Complex outbound call request flow example, including the step, the control message source (either GW 508 or NAS bay 902) and relevant comments. The reader is referred to FIG. 12 for an illustration and state flow diagrams 18A and 18B.

TABLE 35

| Step | From | To | Message | Comments |
|---|---|---|---|---|
| | NAS#1 | GW | RCSO | NAS#1 requests an outbound call. Gateway determines that the best route to destination is through a PRI line on NAS#3. To get there, it will use NAS#2 as a switch point. The Gateway selects channel 1/2/3 on NAS#1 for this call. |
| | GW | NAS#2 | RCST | Gateway asks NAS#2 to establish a TDM connection between channel 2/3/3 and channel 4/5/6. |
| | NAS#2 | GW | ACST | NAS#2 accepts and connects the connection. |
| | GW | NAS#3 | RCSO | Gateway asks NAS#3 to place a call to the destination and connect it to the channel 6/7/6. |
| | NAS#3 | GW | ACSO | NAS#3 accepts the outbound connection and starts setting up the outbound call on PRI #1. |
| | GW | NAS#1 | ACSO | Gateway tells NAS#1 that the call is proceeding. |
| | NAS#3 | GW | CONO | NAS#3 reports the outbound call has been connected. |
| | GW | NAS#1 | CONO | The call has been connected. | o. Continuity Test Flow{TC\l4"}

Table 36 below provides the Continuity test flow, including the step, the control message source (either GW 508 or NAS bay 902) and relevant comments.

TABLE 36

| Step | Gateway | NAS | Comments |
|---|---|---|---|
| 1 | RPCT | | Prepare for continuity test. |
| 2 | | APCT | Accept continuity test. |
| 3 | SCT | | Start continuity test. If the NAS doesn't receive this command within 3 seconds of sending an APCT, the continuity test will be canceled and all reserved resources will be released. |
| 4 | | ASCT | Continuity test result. | p. Keep-alive Test Flow{TC\l4"}

Table 37 below provides the Keep-alive test flow, including the step, the control message source (either GW 508 or NAS bay 902) and relevant comments.

TABLE 37

| Step | Gateway | NAS | Comments |
|---|---|---|---|
| 1 | | RTE | Response test echo is sent. |
| 2 | ARTE | | A response to test echo is sent. | q. Reset Request Flow{TC\l4"}

Table 38 below provides the Reset request flow, including the step, the control message source (either GW 508 or NAS bay 902) and relevant comments.

TABLE 38

| Step | Gateway | NAS | Comments |
|---|---|---|---|
| 1 | RST1 | | First step. |
| 2 | | ARST1 | |
| 3 | RST2 | | Second step. If the NAS doesn't receive this command within 5 seconds of sending an ARST1, it will not reboot. |
| 4 | | ARST2 | The NAS starts the reboot procedure. |
| 5 | | NSDN | NAS is now rebooting. |

V. Conclusion{TC\l1"}

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for bypassing the egress facilities of a telecommunications system, the system comprising:
   (i) a gateway for communicating with a telecommunications carrier by receiving and transmitting signaling messages, wherein said gateway comprises a first application program running on a host computer;
   (ii) a network access server for terminating data calls and for termination and reorigination processing of said data calls; and
   (iii) a control server for communicating with said gateway, for distinguishing between voice calls and said data calls received from said telecommunications carrier, and for sending said data calls to said network access server, wherein said control server comprises a second application program running on said host computer or on a second host computer, and said first application program and said second application program intercommunicate.

2. The system according to claim 1, wherein said signaling messages are SS7 signaling messages, and wherein said gateway further comprises an SS7 gateway device.

3. The system according to claim 1, wherein said gateway communicates with a switch facility in said telecommunications carrier via said signaling messages.

4. The system according to claim 3, wherein said switch facility is one of: a class 3/4 access tandem switch; and a class 5 end office switch.

5. The system according to claim 1, wherein said control server further comprises a communications portion for communicating with said gateway.

6. The system according to claim 5, wherein said communications portion of said control server and said gateway communicate via one of:
X.25 protocol format;
transmission control program, internet protocol (TCP/IP) packet format; and
user datagram protocol, internet protocol (UDP/IP) packet format.

7. The system according to claim 1, wherein said control server further comprises a communications portion for communicating with a communications portion of said network access server.

8. The system according to claim 7, wherein said data calls have a digitized data format, said digitized format contains one of: a cell, a packet, and a frame.

9. The system according to claim 1, wherein said network access server comprises a second device which can be used to time division multiplex switch said data calls to another network access server.

10. The system according to claim 9, wherein said second device comprises a tandem network access server bay.

11. The system according to claim 1, said control server further comprises:
a database for distinguishing between said voice calls and said data calls; and
said database includes a table comprising called party numbers and terminating points associated with said called party numbers.

12. The system according to claim 11, wherein said control server determines that if said called party number is associated with a data modem, then a call received is one of said data calls.

13. The system according to claim 1, further comprising:
a voice switch for switching said voice calls and for transmitting said voice calls from the system.

14. The system according to claim 1, wherein the system is an open architecture platform.

15. The system according to claim 14, wherein said open architecture platform is integrated into facilities of: an incumbent local exchange carrier (ILEC), an interexchange carrier (IXC), a competitive local exchange carrier (CLEC), and an enhanced services provider.

16. The system according to claim 1, wherein any combination of said gateway, said control server and said network access server are collocated.

17. The system according to claim 13, wherein any combination of said gateway, said control server and said network access server are located geographically apart from one another.

18. The system according to claim 13, wherein any combination of said gateway, said control server, said network access server and said voice switch are collocated.

19. The system according to claim 13, wherein any combination of said gateway, said control server, said network access server and said voice switch are located geographically apart from one another.

20. A system for bypassing the egress facilities of a telecommunications system, the system comprising:
a voice switch transmitting voice calls to a called party; and
an open architecture switch receiving data calls and said voice calls from a telecommunications carrier, said open architecture switch including
(i) a modem network access server terminating said data calls to a modem;
(ii) a tandem network access server receiving said data calls and said voice calls; and
(iii) a gateway including
a first application program running on a host computer;
a gateway signalling system managing signaling information for said open architecture switch, and
a control server capable of controlling said modem network access server and said tandem network access server, wherein the control server includes a second application program running on said host computer or on a second host computer, said first application program and said second application program intercommunicate, and
wherein said control server is capable of distinguishing between said data calls and said voice calls, transmitting said voice calls to said voice switch, and transmitting said data calls to said modem network access server.

21. A method for bypassing data from the facilities of a telecommunications carrier comprising the steps of:
receiving signaling information for transmitting a call;
converting said signaling information into a format used by an open architecture platform,
wherein said receiving signaling information and converting said signaling information are performed by a first application program running on a first host computer;
receiving said call on said platform;
determining whether said call is a voice call or a data call;
controlling at least one network access server;
terminating said call in said at least one network access server, if said call is a data call,
wherein said determining whether said call is a voice call or a data call, controlling at least one network access server, and terminating said call are performed by a second application program running on the first host computer or on a second host computer, wherein said first application program and said second application program intercommunicate; and
transmitting said call to a voice switch, if said call is a voice call.

22. The method according to claim 21, wherein step (f) comprises one of:
(i) terminating said call to a modem; and
(ii) establishing a tunnel to a virtual private data network.

23. The method according to claim 22, wherein step (ii) comprises:
uses a point-to-point tunneling protocol (PPTP) to extend a virtual private network to a second network.

24. A bypass system receiving telecommunications traffic including voice traffic and data traffic from a telecommunications carrier and bypassing the data traffic around egress facilities of the telecommunications carrier, said bypass system comprising:

one or more network access servers receiving said telecommunications traffic and separately routing the voice traffic and data traffic;

one or more gateways exchanging messages with the telecommunications carrier and providing signaling information to one or more control servers, wherein one of the one or more gateways includes a first application program running on a host computer;

said one or more control servers responsive to said signaling information and detecting whether data traffic or voice traffic is being received by a network access server associated with the signaling information, and sending routing control information to the network access server receiving the telecommunications traffic associated with the signaling information, wherein one of the one or more control servers includes a second application program running on said host computer or on a second host computer, and said first application program and said second application program intercommunicate; and said network access server associated with the signaling information transmitting voice traffic to a voice switch if the telecommunications traffic is voice traffic and converting the telecommunications traffic to a form suitable for a destination data network if the telecommunications traffic is data traffic.

25. The bypass system of claim 24 where there are plurality of network access servers shared by one or more control servers.

26. The bypass system of claim 25 where said network access servers are located at geographically diverse locations remote from said one or more control servers and are connected to said one or more control servers through communication links.

27. The bypass system of claim 25 where the transmitting and converting functions of said network access servers are distributed across a plurality of network access servers at locations remote from said one or more control servers connected to said network access servers through a communication network.

28. The bypass system of claim 24 where there are a plurality of control servers shared by a plurality of gateways.

* * * * *